(12) United States Patent
Yamaga et al.

(10) Patent No.: US 10,720,181 B1
(45) Date of Patent: Jul. 21, 2020

(54) MAGNETIC RECORDING CARTRIDGE

(71) Applicant: Sony Corporation, Tokyo (JP)

(72) Inventors: Minoru Yamaga, Miyagi (JP); Noboru Sekiguchi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/696,394

(22) Filed: Nov. 26, 2019

Related U.S. Application Data

(63) Continuation of application No. 16/502,418, filed on Jul. 3, 2019.

(30) Foreign Application Priority Data

Apr. 26, 2019 (JP) .................................. 2019-086717

(51) Int. Cl.
| | |
|---|---|
| *G11B 23/107* | (2006.01) |
| *G11B 5/714* | (2006.01) |
| *G11B 5/73* | (2006.01) |
| *G11B 5/584* | (2006.01) |
| *G11B 5/706* | (2006.01) |
| *G11B 5/66* | (2006.01) |

(Continued)

(52) U.S. Cl.
CPC ............ *G11B 23/107* (2013.01); *G11B 5/584* (2013.01); *G11B 5/66* (2013.01); *G11B 5/70678* (2013.01); *G11B 5/714* (2013.01); *G11B 5/716* (2013.01); *G11B 5/73* (2013.01); *G11B 5/78* (2013.01)

(58) Field of Classification Search
None
See application file for complete search history.

(56) References Cited

U.S. PATENT DOCUMENTS

| | | | |
|---|---|---|---|
| 6,190,753 B1 | 2/2001 | Koseki et al. | |
| 7,158,339 B2 * | 1/2007 | Kuse ..................... | G11B 15/26 242/334 |

(Continued)

FOREIGN PATENT DOCUMENTS

| | | |
|---|---|---|
| JP | 03185623 | 8/1991 |
| JP | 04255910 | 9/1992 |

(Continued)

OTHER PUBLICATIONS

Decision to Grant dated Aug. 20, 2019 in corresponding Japanese Application No. 2019-086717.

*Primary Examiner* — Tan X Dinh

(74) *Attorney, Agent, or Firm* — K&L Gates LLP

(57) ABSTRACT

A magnetic recording cartridge is provided and including a magnetic recording medium, wherein an average thickness of the magnetic recording medium $t_T$ is 3.5 $\mu m \leq t_T \leq 5.6$ $\mu m$, a dimensional change amount $\Delta w$ in a width direction of the magnetic recording medium with respect to a tension change in a longitudinal direction of the magnetic recording medium is 700 ppm/N$\leq \Delta w \leq$20000 ppm, and the magnetic recording medium is accommodated in a state of being wound around the reel in the cartridge case and (a servo track width on an inner side of winding of the magnetic recording medium)−(a servo track width on an outer side of winding of the magnetic recording medium)>0 is satisfied.

30 Claims, 9 Drawing Sheets

(51) Int. Cl.
*G11B 5/716* (2006.01)
*G11B 5/78* (2006.01)

(56) References Cited

U.S. PATENT DOCUMENTS

| | | | | |
|---|---|---|---|---|
| 7,494,728 | B2* | 2/2009 | Kuse | G11B 5/70 |
| | | | | 428/840.2 |
| 9,299,378 | B2* | 3/2016 | Sekiguchi | G11B 5/73 |
| 2005/0260458 | A1* | 11/2005 | Hirai | G11B 5/584 |
| | | | | 428/845.6 |
| 2006/0087767 | A1* | 4/2006 | Hirai | G11B 5/7305 |
| | | | | 360/134 |
| 2006/0092547 | A1* | 5/2006 | Kawakami | G11B 5/584 |
| | | | | 360/71 |
| 2007/0009768 | A1* | 1/2007 | Takeda | G11B 5/70 |
| | | | | 428/842 |
| 2007/0159722 | A1* | 7/2007 | Kuse | B82Y 25/00 |
| | | | | 360/134 |
| 2007/0230054 | A1* | 10/2007 | Takeda | G11B 5/7305 |
| | | | | 360/134 |
| 2015/0111066 | A1* | 4/2015 | Terakawa | G11B 5/70642 |
| | | | | 428/836.2 |
| 2017/0221513 | A1* | 8/2017 | Hiroi | G11B 5/725 |
| 2018/0137887 | A1* | 5/2018 | Sekiguchi | G11B 5/66 |
| 2019/0295584 | A1* | 9/2019 | Terakawa | G11B 5/70605 |
| 2019/0362753 | A1* | 11/2019 | Terakawa | G11B 5/70647 |
| 2019/0378540 | A1* | 12/2019 | Sekiguchi | G11B 5/667 |

FOREIGN PATENT DOCUMENTS

| | | |
|---|---|---|
| JP | 2002-210820 | 7/2002 |
| JP | 2004-005898 | 1/2004 |
| JP | 2004-030809 | 1/2004 |
| JP | 2005199724 | 7/2005 |
| JP | 2005-276258 | 10/2005 |
| JP | 2005-285268 | 10/2005 |
| JP | 2005-332510 | 12/2005 |
| JP | 2005-346865 | 12/2005 |
| JP | 2006-099919 | 4/2006 |
| JP | 2006-107597 | 4/2006 |
| JP | 2006-216195 | 8/2006 |
| JP | 2007250078 | 9/2007 |
| JP | 2007-294079 | 11/2007 |
| JP | 2007-305197 | 11/2007 |
| JP | 2007287215 | 11/2007 |
| JP | 2008159259 | 7/2008 |
| JP | 2009-087471 | 4/2009 |
| JP | 2009-223923 | 10/2009 |
| JP | 2011-150744 | 8/2011 |
| JP | 2011-181121 | 9/2011 |
| JP | 2011170944 | 9/2011 |
| JP | 2015-135717 | 7/2015 |
| JP | 2017139038 | 8/2017 |
| JP | 2017-191633 | 10/2017 |
| WO | 99/29488 | 6/1999 |
| WO | 2015198514 | 4/2017 |
| WO | 2017/085931 | 5/2017 |

* cited by examiner

MAGNETIC RECORDING CARTRIDGE

CROSS REFERENCES TO RELATED APPLICATIONS

This application is a continuation of U.S. patent application Ser. No. 16/502,418, filed on Jul. 3, 2019, which application claims the benefit of Japanese Priority Patent Application JP 2019-086717 filed on Apr. 26, 2019, the entire contents of which are incorporated herein by reference.

BACKGROUND

Technical Field

The present technology relates to a magnetic recording cartridge.

Background Art

In recent years, in magnetic tapes (magnetic recording mediums) used as data storage for computers, a track width and a distance between adjacent tracks have become very narrow in order to improve a recording density of data. Thus, when the track width and the distance between the tracks are narrow as described above, a maximum allowable change amount as a dimensional change amount of a tape itself due to environmental factors such as, for example, a change or the like in temperature and humidity becomes small.

Several technologies for reducing the dimensional change amount have been proposed so far. For example, in the magnetic tape medium disclosed in PTL 1 below, in a case where a Young's modulus of a nonmagnetic support in a width direction is X and a Young's modulus of a back layer in the width direction is Y, X×Y is 6×10$^5$ or more if X is 850 kg/mm$^2$ or greater or less than 850 kg/mm$^2$ and Y/Z is 6.0 or less when a Young's modulus of a layer in the width direction including a magnetic layer is Z.

CITATION LIST

Patent Literature

PTL 1

JP 2005-332510A

SUMMARY

Technical Problem

It is desirable to provide a magnetic recording cartridge including a magnetic recording medium capable of suppressing a dimensional change in a width direction by adjusting tension applied in a longitudinal direction of a tape.

Solution to Problem

According to an embodiment of the present technology, there is provided a magnetic recording cartridge including a magnetic recording medium of which
an average thickness $t_T$ is $t_T \leq 5.6$ µm,
a dimensional change amount Δw in a width direction with respect to a tension change in a longitudinal direction is 660 ppm/N≤Δw, and
a squareness ratio in a vertical direction is 65% or more,
in which the magnetic recording medium is accommodated in a state of being wound around a reel and (a servo track width on an inner side of winding of the magnetic recording medium)−(a servo track width on an outer side of winding of the magnetic recording medium)>0 is satisfied.

The magnetic recording medium may have a servo track width larger than a servo read head width of a magnetic recording and reproducing apparatus in which the magnetic recording cartridge is loaded.

The magnetic recording and reproducing apparatus may be a timing servo type magnetic recording and reproducing apparatus.

The dimensional change amount Δw may be 700 ppm/N≤Δw.

The dimensional change amount Δw may be 750 ppm/N≤Δw.

The dimensional change amount Δw may be 800 ppm/N≤Δw.

The magnetic recording medium may include a back layer, and a surface roughness $R_{ab}$ of the back layer may be 3.0 nm≤$R_{ab}$≤7.5 nm.

The magnetic recording medium may include a magnetic layer and a back layer, and a friction coefficient µ between a surface on a side of the magnetic layer and a surface on a side of the back layer may be 0.20≤µ≤0.80.

A thermal expansion coefficient α of the magnetic recording medium may be 5.5 ppm/° C.≤α≤9 ppm/° C. and a humidity expansion coefficient β of the magnetic recording medium may be β≤5.5 ppm/% RH.

A Poisson's ratio ρ of the magnetic recording medium may be 0.25≤ρ.

An elastic limit value $\sigma_{MD}$ of the magnetic recording medium in the longitudinal direction may be 0.7 N≤$\sigma_{MD}$.

The elastic limit value amp may not depend on a speed V when elastic limit is measured.

The magnetic recording medium may include a magnetic layer, and the magnetic layer may be vertically aligned.

The magnetic recording medium may include a back layer and an average thickness $t_b$ of the back layer may be $t_b$≤0.6 µm.

According to another embodiment of the present technology, the magnetic recording medium may include a magnetic layer, and the magnetic layer may be a sputtered layer.

In a case where the magnetic layer is a sputtered layer, an average thickness $t_m$ of the magnetic layer may be 9 nm≤$t_m$≤90 nm.

According to still another embodiment of the present technology, the magnetic recording medium may include a magnetic layer, and the magnetic layer may contain magnetic powder.

In a case where the magnetic layer contains magnetic powder, the average thickness $t_m$ of the magnetic layer may be 35 nm≤$t_m$≤90 nm.

The magnetic powder may include ϵ iron oxide magnetic powder, barium ferrite magnetic powder, cobalt ferrite magnetic powder, or strontium ferrite magnetic powder.

Furthermore, according to further embodiment of the present technology, there is provided a magnetic recording cartridge including a magnetic recording medium of which
an average thickness $t_T$ is $t_T \leq 5.6$ µm,
a dimensional change amount Δw in a width direction with respect to a change in tension in a longitudinal direction is 660 ppm/N≤Δw, and a squareness ratio in a vertical direction is 65% or more,
in which the magnetic recording medium has a servo track width larger than a servo read head width of a magnetic recording and reproducing apparatus in which the magnetic recording cartridge is loaded.

DETAILED DESCRIPTION

Figure 1A:
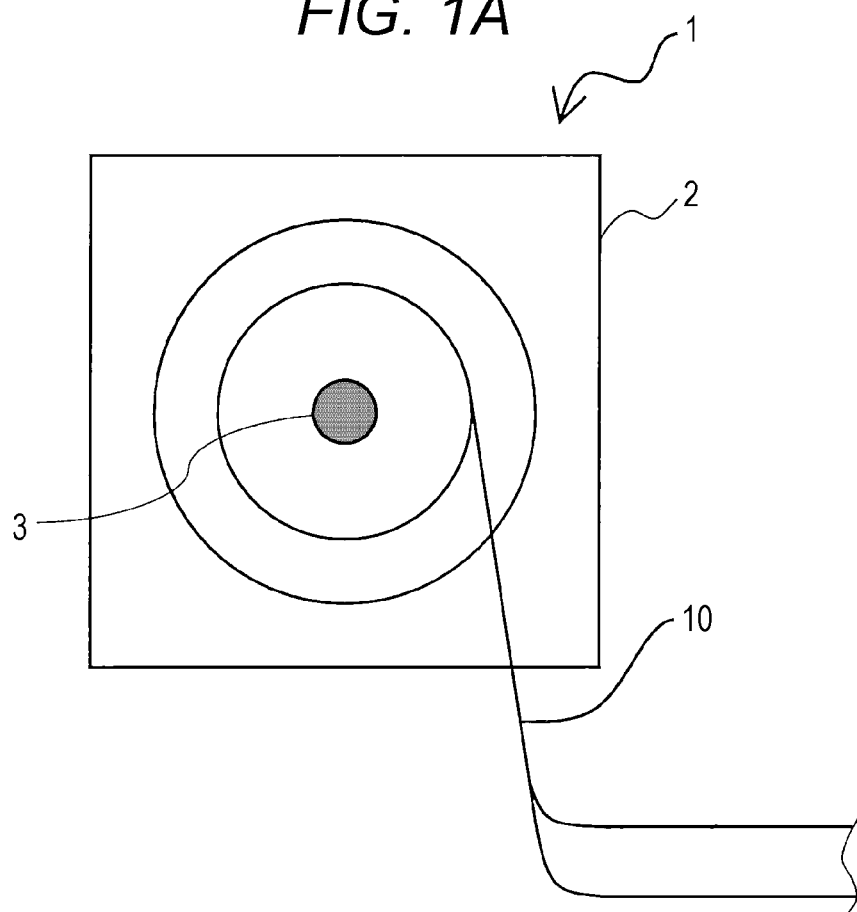
FIG. 1A is a schematic view of an example of a magnetic recording cartridge according to an embodiment of the present technology.

Hereinafter, preferred embodiments for implementing the present technology will be described. Note that the embodiments described below show representative embodiments of the present technology, and the scope of the present technology is not limited to only these embodiments.

The present technology will be described in the following order.

1. Description of the present technology
2. First embodiment (example of magnetic recording cartridge Including coating type magnetic recording medium)
  (1) Configuration of magnetic recording cartridge
  (2) Description of each layer
  (3) Physical properties and structure
  (4) Method of manufacturing magnetic recording medium
  (5) Recording and reproducing apparatus
  (6) Effect
  (7) Modification
3. Second embodiment (example of magnetic recording cartridge including vacuum thin film type magnetic recording medium)
  (1) Configuration of magnetic recording cartridge
  (2) Description of each layer
  (3) Physical properties and structure
  (4) Configuration of sputtering apparatus
  (5) Method of manufacturing magnetic recording medium
  (6) Effect
  (7) Modification
  (8) Other examples of magnetic recording media
4. Example

1. DESCRIPTION OF THE PRESENT TECHNOLOGY

There is a need to further increase a recording capacity per magnetic recording cartridge. For example, in order to increase the recording capacity, it is conceivable to increase a tape length per magnetic recording cartridge by reducing a thickness of a magnetic recording medium (e.g., a magnetic recording tape) included in the magnetic recording cartridge (reducing an overall thickness).

However, as the magnetic recording medium becomes thinner, a dimensional change may occur in a track width direction. The dimensional change in the width direction may cause an undesirable phenomenon for magnetic recording, such as, for example, an off-track phenomenon, etc. The off-track phenomenon refers to a situation in which a target track is not present at a track position for a magnetic head to read or a situation in which the magnetic head reads a wrong track position.

In the past, in order to suppress the dimensional change of the magnetic recording medium, for example, a method of adding a layer for suppressing the dimensional change of the magnetic recording medium or the like is performed.

However, the addition of the layer may increase a thickness of the magnetic recording tape and does not increase a tape length per cartridge product.

The inventors of the present technology are examining a magnetic recording medium suitable for use in a recording and reproducing apparatus, whose width may be kept constant or substantially constant by adjusting tension of the long-shaped magnetic recording medium in a longitudinal direction. The recording and reproducing apparatus detects, for example, dimensions or a dimensional change in the width direction of the magnetic recording medium, and adjusts tension in the longitudinal direction on the basis of a detection result.

However, in the magnetic recording medium suppressed in the dimensional change, the dimensional change amount in the width direction based on the change in tension in the longitudinal direction is small. Therefore, it is difficult to keep the width of the magnetic recording medium constant or substantially constant even though tension is adjusted in the longitudinal direction by the recording and reproducing apparatus.

In consideration of the above circumferences, the present inventors examined a magnetic recording cartridge having a high recording capacity per cartridge. As a result, the present inventors have found that a magnetic recording cartridge having a specific configuration has a high recording capacity and is suitable for use in a recording and reproducing apparatus which adjusts tension in the longitudinal direction.

Furthermore, the tension adjustment may cause a phenomenon peculiar to the tension adjustment, such as wrinkles when the magnetic recording medium is wound around a reel. The phenomenon may occur especially in a case where the tension loosens. The present inventors have also found that the occurrence of the phenomenon may be prevented by a magnetic recording cartridge having a specific configuration.

In other words, the present technology provides a magnetic recording cartridge including a magnetic recording medium in which an average thickness $t_T$ is $t_T \leq 5.6$ μm, a dimensional change amount Δw in a width direction with respect to a change in tension in a longitudinal direction is 660 ppm/N≤Δw, and a squareness ratio in a vertical direction is 65% or more. The magnetic recording medium is accommodated in the magnetic recording cartridge in a state where the magnetic recording medium is wound around a reel, and (servo track width on inner side of winding of magnetic recording medium)−(servo track width on outer side of winding of magnetic recording medium)>0 is satisfied.

An average thickness $t_T$ of the magnetic recording medium included in the magnetic recording cartridge according to the embodiment of the present technology may be 5.6 μm or less, preferably 5.5 μm or less, more preferably 5.3 μm or less, and still more preferably 5.2 μm or less, 5.0 μm or less, or 4.6 μm or less. Because the magnetic recording medium is so thin, for example, the length of the tape wound up in one magnetic recording cartridge can be longer, thereby increasing a recording capacity per magnetic recording cartridge.

In the magnetic recording medium included in the magnetic recording cartridge according to the embodiment of the present technology, the dimensional change amount Δw in the width direction with respect to the change in tension in the longitudinal direction is 660 ppm/N or more, more preferably 670 ppm/N or more, and still more preferably 700 ppm/N or more, 710 ppm/N or more, 730 ppm/N or more, 750 ppm/N or more, 780 ppm/N or more, or 800 ppm/N or more. The fact that the magnetic recording medium has the dimensional change amount Δw within the above numerical range contributes to making it possible to maintain the width of the magnetic recording medium at a constant level by adjusting tension of the magnetic recording medium in the longitudinal direction.

Furthermore, an upper limit of the dimensional change amount Δw is not particularly limited, and may be, for example, 1700000 ppm/N or less, preferably 20000 ppm/N or less, more preferably 8000 ppm/N or less, still more preferably 5000 ppm/N or less, 4000 ppm/N or less, 3000 ppm/N or less, or 2000 ppm/N or less. In a case where the dimensional change amount Δw is too large, it may be difficult to stably run in the manufacturing process.

A method of measuring the dimensional change amount Δw will be described in (3) of 2. below.

The magnetic recording medium included in the magnetic recording cartridge according to the embodiment of the present technology has a squareness ratio in the vertical direction of 65% or more, preferably 70% or more, more preferably 73% or more, and still more preferably 80% or more. Because the magnetic recording medium has a squareness ratio S2 within the above numerical range, more excellent electromagnetic conversion characteristic may be obtained. Furthermore, a servo signal shape is improved, making it easier to control a drive side.

A method of measuring a squareness ratio in the vertical direction will be described in (3) of 2. below.

As described above, the magnetic recording medium included in the magnetic recording cartridge according to the embodiment of the present technology is thin, suitable for a recording and reproducing apparatus that adjusts tension in the longitudinal direction, and is excellent in electromagnetic conversion characteristic, and thus, a recording capacity per magnetic recording cartridge may be significantly increased.

Moreover, the magnetic recording cartridge according to the embodiment of the present technology includes the magnetic recording medium in a state of being wound around a reel, and (servo track width on inner side of winding of magnetic recording medium)−(servo track width on outer side of winding of magnetic recording medium)>0 μm is satisfied. Hereinafter, in the present specification, (servo track width on inner side of winding of magnetic recording medium)−(servo track width on outer side of winding of magnetic recording medium) is also referred to as "difference between servo track widths of the inner side and the outer side of the winding". The difference between the servo track widths on the inner side of the winding and the outer side of the winding is preferably 0.01 μm or more, more preferably 0.02 μm or more, and still more preferably 0.05 μm or more. The difference between servo track widths on the inner side of the winding and the outer side of the winding may be, for example, 0.10 μm or more, 0.15 μm or more, or 0.20 μm or more. When the difference between the servo track widths of the inner side of the winding and the outer side of the winding is within the above numerical range, the occurrence of wrinkles in the magnetic recording medium (in particular, a portion of the magnetic recording medium closer to the reel) wound around the reel in the cartridge can be prevented. The wrinkles may cause, for example, winding deviation, track deviation, or the like, during running, and the occurrence of these phenomena due to the wrinkles can also be prevented by the present technology. A method of measuring the difference and a method of measuring a deviation amount of the servo track width used to calculate the difference will be described in (3) of 2. below.

Suppression of the occurrence of wrinkles will be described in more detail below.

The recording and reproducing apparatus capable of keeping the width of the magnetic recording medium constant or substantially constant by adjusting tension of the long-shaped magnetic recording medium in the longitudinal direction adjusts the tension in the longitudinal direction according to, for example, servo track widths. For example, in a case where the servo track width is wider than a predetermined width, the apparatus increases tension in the longitudinal direction to keep the servo track width constant, and in a case where the servo track width is narrower than the predetermined width, the apparatus decreases the tension in the longitudinal tension to keep the servo track width constant. In this manner, the width of the magnetic recording medium is kept constant.

When a difference between the servo track widths of the inner and outer sides of winding is a negative value, it means that the servo track width of the inner side of the winding is narrower than that of the outer side of the winding. In a case where the difference is a negative value, for example, a servo track width having the narrowest portion is present within a half region of an end portion (hereinafter, also referred to as a "reel-connected end portion") of the magnetic recording medium connected to a reel of the magnetic recording cartridge, that is, the servo track width of a region near the reel-connected end portion is narrower than a servo track width of a region near the opposite end portion (hereinafter, also referred to as an "outer end portion"). Therefore, in a case where the magnetic recording medium is wound around the reel in the magnetic recording cartridge, a longitudinal tension applied to winding in the region near the reel-connected end portion is weaker and a longitudinal tension applied to winding in the region near the outer end portion is stronger to keep the servo track width constant. As a result, the region of the magnetic recording medium near the reel-connected end portion is wound around the reel with a weaker tension than the region thereof near the outer end portion. When the magnetic recording medium is wound in this manner, a phenomenon in which wrinkles occur in the region near the reel-connected end portion may occur. The wrinkles may cause, for example, winding deviation, track deviation, or the like, during running. The phenomenon in which the wrinkles occur may not occur in a case where the wound state lasts for a short time, but is prone to occur in a case where the above state lasts for a long time. For example, the magnetic recording medium may be wound around the reel in the magnetic recording and reproducing apparatus but this state in which the magnetic recording medium is wound around the reel in the apparatus generally lasts only for a short time so the above phenomenon does not occur. Meanwhile, the state in which the magnetic recording medium is wound around the reel in the magnetic recording cartridge lasts particularly for a long time in a case where the cartridge is stored for a long time. Therefore, the phenomenon may occur in the magnetic recording medium in the magnetic recording cartridge.

In the magnetic recording cartridge according to the embodiment of the present technology, a difference between the servo track widths of the inner and outer sides of winding is a positive value, that is, the servo track width of the inner side of the winding is larger than the servo track width of the outer side of the winding. Thus, the servo track width of the region near the reel-connected end portion is larger than the servo track width of the region near the outer end portion. Therefore, in a case where the magnetic recording medium is wound around the reel in the magnetic recording cartridge, a longitudinal tension applied to winding in the region near the reel-connected end portion is stronger and a longitudinal tension applied to winding in the region near the outer end portion is weaker to keep the servo track width constant. As a result, the magnetic recording medium is wound around the reel with the stronger tension in the region near the reel-connected end portion than in the region near the outer end portion. By winding the magnetic recording medium in this manner, it is possible to prevent the occurrence of wrinkles in the region near the reel-connected end portion.

The difference in servo track width between the inner and outer sides of winding may be, for example, 2.5 µm or less, preferably 1.8 µm or less, and more preferably 1.5 µm or less, 1.0 µm or less, 0.8 µm or less, or 0.5 µm or less. Since the difference between the servo track widths of the inner and outer sides of winding is equal to or less than the upper limit value, the width of the magnetic recording medium may be more easily kept constant by tension adjustment.

According to a preferred embodiment of the present technology, the magnetic recording medium may have a servo track width larger than a servo read head width of the magnetic recording and reproducing apparatus in which the magnetic recording cartridge is loaded (in which magnetic recording to the magnetic recording medium and/or magnetic reproducing from the magnetic recording medium is performed). More preferably, the magnetic recording medium may have a servo track width larger than a servo read head width over the entire length of an inner region sandwiched to positions 50 m away from both the end portions of the magnetic recording medium. Since the magnetic recording medium has a servo track width larger than the servo read head width, it is possible to prevent the occurrence of winding deviation when the magnetic recording medium is wound around the reel in the magnetic recording and reproducing apparatus. The method of measuring the difference in servo track width may be the same as the method of measuring the difference in servo track width described above regarding the difference in the servo track width between the inner and outer sides of winding, and this will be described in (3) of 2. below.

In a case where the magnetic recording medium has a servo track width smaller than the servo read head width, the longitudinal tension of the magnetic recording medium is loosened by the magnetic recording and reproducing apparatus for adjusting the longitudinal tension of the magnetic recording medium described above, and the tape width is expanded. However, the loosening of the tension may cause winding deviation.

In the present embodiment, since the magnetic recording medium has a servo track width larger than the servo read head width, the longitudinal tension may be increased by the magnetic recording and reproducing apparatus. Accordingly, the occurrence of winding deviation may be prevented.

Furthermore, the present technology provides a magnetic recording cartridge including a magnetic recording medium in which an average thickness $t_T$ is $t_T \leq 5.6$ µm, a dimensional change amount $\Delta w$ in a width direction with respect to a change in tension in a longitudinal direction is 660 ppm/N$\leq \Delta w$, and a squareness ratio in a vertical direction is 65% or more, in which the magnetic recording medium has a servo track width larger than a servo read head width of a magnetic recording and reproducing apparatus in which the magnetic recording cartridge is loaded. The magnetic recording cartridge has a high recording capacity and is suitable for use in a recording and reproducing apparatus that adjusts tension in the longitudinal direction. The magnetic recording cartridge may prevent winding deviation that may occur with the tension adjustment. Also, for this magnetic recording cartridge, any one or a combination of two or more of the configurations described for the magnetic recording cartridge in the present specification may be introduced.

The magnetic recording medium included in the magnetic recording cartridge according to the embodiment of the present technology is preferably a long-shaped magnetic recording medium, and may be, for example, a magnetic recording tape (in particular, a long-shaped magnetic recording tape).

The magnetic recording medium included in the magnetic recording cartridge according to the embodiment of the present technology may have a magnetic layer, a base layer, and a back layer, and may include any other layer in addition to those layers. The other layer may be appropriately selected according to types of magnetic recording medium. The magnetic recording medium may be, for example, a coating type magnetic recording medium or a vacuum thin film type magnetic recording medium. The coating type magnetic recording medium will be described in more detail in 2. below. The vacuum thin film type magnetic recording medium will be described in more detail in 3. below. For the layers included in the magnetic recording medium other than the above three layers, those descriptions may be referred to.

The magnetic recording medium included in the magnetic recording cartridge according to the embodiment of the present technology may have, for example, at least one data band and at least two servo bands. The number of the data bands may be, for example, 2 to 10, particularly, 3 to 6, and more particularly, 4 or 5. The number of the servo bands may be, for example, 3 to 11, particularly, 4 to 7, and more particularly, 5 or 6. These servo bands and data bands may be arranged, for example, to extend in the longitudinal direction of the long-shaped magnetic recording medium (in particular, a magnetic recording tape), and in particular, to be substantially parallel. The data bands and the servo bands may be provided in the magnetic layer. The magnetic recording media having the data bands and the servo bands may include a magnetic recording tape conforming to the linear tape-open (LTO) standard. In other words, the magnetic recording medium may be a magnetic recording tape conforming to the LTO standard. For example, the magnetic recording medium may be a magnetic recording tape conforming to LTO8 or a later standard (e.g., LTO9, LTO10, LTO11, LTO12, etc.).

A width of the long-shaped magnetic recording medium (particularly, magnetic recording tape) may be, for example, 5 mm to 30 mm, particularly, 7 mm to 25 mm, more particularly, 10 mm to 20 mm, and even more particularly, 11 mm to 19 mm. The length of the long-shaped magnetic recording medium (in particular, the magnetic recording tape) may be, for example, 500 m to 1,500 m. For example, a tape width according to the LTO8 standard is 12.65 mm and a length is 960 m.

2. FIRST EMBODIMENT (EXAMPLE OF MAGNETIC RECORDING CARTRIDGE INCLUDING COATING TYPE MAGNETIC RECORDING MEDIUM)

(1) Configuration of Magnetic Recording Cartridge

First, a configuration of a magnetic recording cartridge according to the embodiment of the present technology will be described with reference to FIG. 1A. FIG. 1A is a schematic view of an example of a magnetic recording cartridge according to the embodiment of the present technology. The magnetic recording cartridge 1 shown in FIG. 1A includes a reel 3 provided in a cartridge case 2. A magnetic recording medium 10 (in particular, a magnetic recording tape) is wound around the reel 3.

Figure 1B:
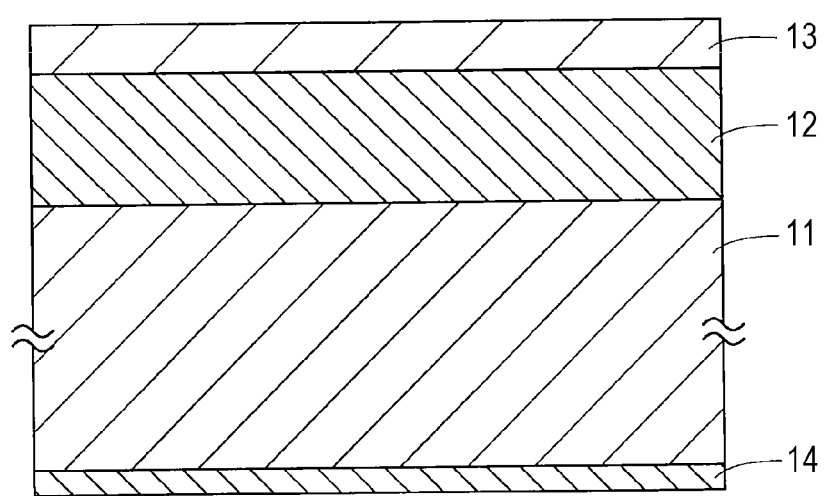
FIG. 1B is a cross-sectional view showing an example of a configuration of a magnetic recording medium included in a magnetic recording cartridge according to an embodiment of the present technology.

Next, a configuration of the magnetic recording medium 10 will be described with reference to FIG. 1B. The magnetic recording medium 10 is, for example, a magnetic recording medium subjected to vertical alignment processing, and as shown in FIG. 1B, and includes a long-shaped base layer (also referred to as substrate) 11, a ground layer (non-magnetic layer) 12 provided on one principal plane of the base layer 11, a magnetic layer (or record layer) 13 provided on the ground layer 12, and a back layer 14 provided on the other principal plane of the base layer 11. Hereinafter, among the both principal planes of the magnetic recording medium 10, the plane on which the magnetic layer 13 is provided will be referred to as a magnetic surface, and the plane opposite to the magnetic surface (the plane on which the back layer 14 is provided) will be referred to as a back surface.

The magnetic recording medium 10 has a long shape and runs in the longitudinal direction during recording and reproducing. Furthermore, the magnetic recording medium 10 may be configured to be able to record a signal at a shortest recording wavelength of preferably 100 nm or less, more preferably 75 nm or less, still more preferably 60 nm or less, particularly preferably 50 nm or less, and may be used for, for example, a recording and reproducing apparatus whose shortest recording wavelength is in the above range. The recording and reproducing apparatus may include a ring type head as a recording head. A recording track width is, for example, 2 μm or less.

(2) Description of Each Layer (Base Layer)

The base layer 11 may function as a support of the magnetic recording medium 10, and may be, for example, a long shaped flexible non-magnetic substrate, and in particular, may be a non-magnetic film. A thickness of the base layer 11 may be, for example, 2 μm to 8 μm, preferably 2.2 μm to 7 μm, more preferably 2.5 μm to 6 μm, and still more preferably 2.6 μm to 5 μm. The base layer 11 may contain, for example, at least one of a polyester-based resin, a polyolefin-based resin, a cellulose derivative, a vinyl-based resin, an aromatic polyether ketone resin, or any other polymer resin. In a case where the base layer 11 contains two or more of the above-described materials, the two or more materials may be mixed, copolymerized, or stacked.

Examples of the polyester-based resin may include one or a mixture of two or more of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), and polyethylenebisphenoxycarboxylate. According to a preferred embodiment of the present technology, the base layer 11 may include PET or PEN.

The polyolefin-based resin may be, for example, one or a mixture of two or more of polyethylene (PE) and polypropylene (PP).

The cellulose derivative may be, for example, one or a mixture of two or more of cellulose diacetate, cellulose triacetate, cellulose acetate butyrate (CAB), and cellulose acetate propionate (CAP).

The vinyl-based resin may be, for example, one or a mixture of two or more of polyvinyl chloride (PVC) and polyvinylidene chloride (PVDC).

The aromatic polyether ketone resin may be, for example, one or a mixture of two or more of polyether ketone (PEK), polyether ether ketone (PEEK), polyether ketone ketone (PEKK), and polyether ether ketone ketone (PEEKK). According to a preferred embodiment of the present technology, the base layer 11 may include PEEK.

Examples of any other polymer resin may be, for example, one or a mixture of two or more of polyamide (PA, nylon), aromatic PA (aromatic polyamide, aramid), polyimide (PI), aromatic PI, polyamide imide (PAI), aromatic PAI, polybenzoxazole (PBO) (e.g., Zylon (registered trademark)), polyether, polyether ester, polyether sulfone (PES), polyether imide (PEI), polysulfone (PSF), polyphenylene sulfide (PPS), polycarbonate (PC), polyarylate (PAR), and polyurethane (PU).

(Magnetic Layer)

The magnetic layer 13 may be, for example, a perpendicular record layer. The magnetic layer 13 may contain magnetic powder. The magnetic layer 13 may further contain, for example, a binder and conductive particles in addition to the magnetic powder. The magnetic layer 13 may further contain, for example, additives such as a lubricant, an abrasive, a corrosion inhibitor, and the like, as necessary.

An average thickness tm of the magnetic layer 13 is preferably 35 nm ≤ tm ≤ 120 nm, more preferably 35 nm ≤ tm ≤ 100 nm, and particularly preferably 35 nm ≤ tm ≤ 90 nm. When the average thickness tm of the magnetic layer 13 is within the above numerical range, the magnetic layer 13 contributes to improvement of electromagnetic conversion characteristic.

The average thickness tm of the magnetic layer 13 may be obtained as follows. First, a specimen is fabricated by processing the magnetic recording medium 10 perpendicularly to a main surface thereof, and a cross-section of the specimen is observed by a transmission electron microscope (TEM) under the following conditions.

Device: TEM (H9000NAR manufactured by Hitachi, Ltd.)
Acceleration voltage: 300 kV
Magnification: 100,000 times Next, using an obtained TEM image, a thickness of the magnetic layer 13 is measured at positions of at least 10 spots in the longitudinal direction of the magnetic recording medium 10, and thereafter, the measured values are simply averaged (arithmetic mean) to be determined as an average thickness tm (nm) of the magnetic layer 13.

The magnetic layer 13 is preferably a vertically aligned magnetic layer. In the present specification, vertical alignment refers to that a squareness ratio S1 measured in the longitudinal direction (running direction) of the magnetic recording medium 10 is 35% or less. A method of measuring the squareness ratio S1 will be described separately below.

Note that the magnetic layer 13 may be a magnetic layer which is in-plane aligned (longitudinal alignment). In other words, the magnetic recording medium 10 may be a horizontal recording type magnetic recording medium. However, vertical alignment is more preferable in terms of higher recording density.

(Magnetic Powder)

Examples of magnetic particles forming magnetic powder contained in the magnetic layer 13 may contain epsilon type iron oxide (ε iron oxide), gamma hematite, magnetite, chromium dioxide, cobalt-coated iron oxide, hexagonal ferrite, barium ferrite (BaFe), Co ferrite, strontium ferrite, a metal, or the like, but are not limited thereto. The magnetic powder may be one or a combination or two or more thereof. In particular, preferably, the magnetic powder may contain ε iron oxide magnetic powder, barium ferrite magnetic powder, cobalt ferrite magnetic powder, or strontium ferrite magnetic powder. Note that ε iron oxide may contain Ga and/or Al. These magnetic particles may be appropriately selected by those skilled in the art on the basis of factors such as, for example, the method of manufacturing the magnetic layer 13, specifications of the tape, a function of the tape, and the like.

An average particle size (average maximum particle size) D of the magnetic powder may be preferably 22 nm or less, more preferably 8 nm to 22 nm, and still more preferably 10 nm to 20 nm.

The average particle size D of the above magnetic powder is obtained as follows. First, the magnetic recording medium 10 to be measured is processed by a focused ion beam (FIB) method or the like to produce a thin piece, and a cross-section of the thin piece is observed by a transmission electron microscope (TEM). Next, 500 ε iron oxide particles are randomly selected from the captured TEM image, a maximum particle size $d_{max}$ of each particle is measured, and a particle size distribution of the maximum particle size $d_{max}$ of the magnetic powder is obtained. Here, the "maximum particle size $d_{max}$" refers to the so-called maximum Feret diameter. Specifically, the "maximum particle size $d_{max}$" refers to a maximum distance among distances between two parallel lines drawn from all angles so as to be in contact with outline of the ε iron oxide particle. Thereafter, a median diameter (50% diameter, D50) of the maximum particle size $d_{max}$ is obtained from the particle size distribution of the obtained maximum particle size $d_{max}$, and is determined as an average particle size (average maximum particle size) D of the magnetic powder.

A shape of the magnetic particles depends on a crystal structure of the magnetic particles. For example, BaFe and strontium ferrites may have a hexagonal plate shape. The ε iron oxide may be spherical. The cobalt ferrite may be cubic. The metal may have a spindle shape. These magnetic particles are aligned in a manufacturing process of the magnetic recording medium 10.

According to a preferred embodiment of the present technology, the magnetic powder may contain powder of nanoparticles preferably containing ε iron oxide (hereinafter, referred to as "ε iron oxide particles"). Even with the fine particles of ε iron oxide particles, high coercive force can be obtained. Preferably, the ε iron oxide contained in the ε iron oxide particle is preferentially crystal-aligned in a thickness direction (vertical direction) of the magnetic recording medium 10.

The ε iron oxide particles have a spherical or substantially spherical shape or have a cubic or substantially cubic shape. Since the ε iron oxide particles have the shape as mentioned above, in a case where ε iron oxide particles are used as the magnetic particles, a contact area between particles in a thickness direction of the medium is reduced to thus suppress aggregation of the particles, as compared with a case where barium ferrite particles having a hexagonal plate-like shape are used as magnetic particles. Therefore, dispersibility of the magnetic powder may be increased to thus obtain a better signal-to-noise ratio (SNR).

Figure 2:
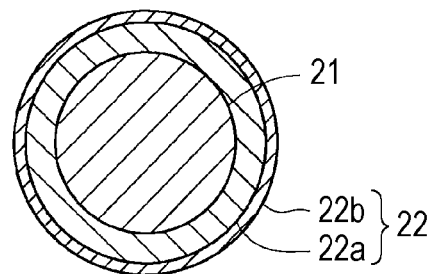
FIG. 2 is a cross-sectional view showing a configuration of a magnetic particle.

The ε iron oxide particles have a core-shell type structure. Specifically, as shown in FIG. 2, the ε iron oxide particle includes a core portion 21 and a shell portion 22 provided around the core portion 21 and having a two-layer structure. The shell portion 22 having the two-layer structure includes a first shell portion 22a provided on the core portion 21 and a second shell portion 22b provided on the first shell portion 22a.

The core portion 21 contains ε iron oxide. The ε iron oxide contained in the core portion 21 preferably has an $\varepsilon\text{-}Fe_2O_3$ crystal as a main phase, and more preferably includes a single phase $\varepsilon\text{-}Fe_2O_3$.

The first shell portion 22a covers at least a portion of the periphery of the core portion 21. Specifically, the first shell portion 22a may partially cover the periphery of the core portion 21 or may cover the entire periphery of the core portion 21. If exchange coupling of the core portion 21 and the first shell portion 22a is sufficient and in terms of improvement of magnetic characteristic, the first shell portion 22a preferably covers the entire surface of the core portion 21.

The first shell portion 22a is a so-called soft magnetic layer, and may contain, for example, a soft magnetic material such as α-Fe, a Ni—Fe alloy, an Fe—Si—Al alloy, or the like. α-Fe may be obtained by reducing the ε iron oxide contained in the core portion 21.

The second shell portion 22b is an oxide film as an anti-oxidation layer. The second shell portion 22b may contain α iron oxide, aluminum oxide, or silicon oxide. The α iron oxide may contain, for example, at least one of $Fe_3O_4$, $Fe_2O_3$, or $FeO$. In a case where the first shell portion 22a contains α-Fe (soft magnetic material), the α-iron oxide may be obtained by oxidizing α-Fe contained in the first shell portion 22a.

Since the ε iron oxide particles have the first shell portion 22a as described above, thermal stability may be ensured, whereby the coercive force Hc of the single core portion 21 may be maintained at a large value and/or the overall coercive force Hc of the ε iron oxide particles (core shell type particles) may be adjusted to the coercive force Hc appropriate for recording. Furthermore, since the ε iron oxide particles have the second shell portion 22b as described above, the ε iron oxide particles are prevented from being exposed in the air during or before the manufacturing process of the magnetic recording medium 10 to cause the particle surfaces to be rusted, or the like, and thus, a degradation of the characteristic of the ε iron oxide particles can be suppressed. Therefore, a degradation of the characteristics of the magnetic recording medium 10 may be suppressed.

Figure 6:
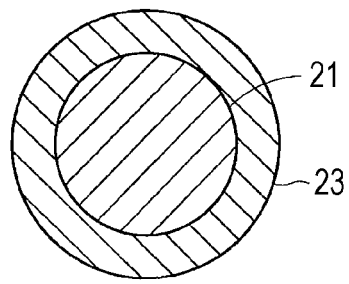
FIG. 6 is a cross-sectional view showing a configuration of a magnetic particle in a modification.

The ε iron oxide particle may have a shell portion 23 having a single layer structure as shown in FIG. 6. In this case, the shell portion 23 has a configuration similar to that of the first shell portion 22a. However, from the viewpoint of suppressing the degradation of the characteristics of the ε iron oxide particle, the ε iron oxide particle preferably has the shell portion 22 having a two-layer structure.

The ε iron oxide particle may contain an additive instead of the core-shell type structure, or may have the core-shell type structure and may contain the additive as well. In these cases, a part of Fe of the ε iron oxide particle is replaced by the additive. Since the coercive force Hc of the entire ε iron oxide particle may be adjusted to the coercive force Hc suitable for recording also by the ε iron oxide particle containing the additive, ease of recording may be improved. The additive is one or more selected from the group including metal element other than iron, preferably trivalent metal element, more preferably aluminum (Al), gallium (Ga), and indium (In).

Specifically, the ε iron oxide containing the additive is an $\varepsilon\text{-Fe}_2\text{-xMxO}_3$ crystal (where, M is one or more selected from the group including metal elements other than iron, preferably trivalent metal elements, more preferably Al, Ga, and In) and x is, for example, 0<x<1).

According to another preferred embodiment of the present technology, the magnetic powder may be barium ferrite (BaFe) magnetic powder. The barium ferrite magnetic powder contains magnetic particles of iron oxide containing barium ferrite as a main phase (hereinafter referred to as "barium ferrite particles"). The barium ferrite magnetic powder has high reliability of data recording, for example, in that the coercive force is not lowered even in a high temperature and high humidity environment, and the like. From this viewpoint, barium ferrite magnetic powder is preferable as the magnetic powder.

An average particle size of the barium ferrite magnetic powder is 50 nm or less, more preferably 10 nm to 40 nm, and still more preferably 12 nm to 25 nm.

In a case where the magnetic layer 13 contains the barium ferrite magnetic powder as magnetic powder, an average thickness tm [nm] of the magnetic layer 13 is preferably 35 nm≤$t_m$≤100 nm. Furthermore, the coercive force Hc of the magnetic recording medium 10 measured in a thickness direction (vertical direction) is preferably 160 kA/m to 280 kA/m, more preferably 165 kA/m to 275 kA/m, and still more preferably 170 kA/m to 270 kA/m.

According to yet another preferred embodiment of the present technology, the magnetic powder may be cobalt ferrite magnetic powder. The cobalt ferrite magnetic powder contains magnetic particles of iron oxide containing cobalt ferrite as a main phase (hereinafter referred to as "cobalt ferrite magnetic particles"). The cobalt ferrite magnetic particles preferably have uniaxial anisotropy. The cobalt ferrite magnetic particles have, for example, a cubic shape or a substantially cubic shape. The cobalt ferrite is cobalt ferrite containing Co. The cobalt ferrite may further contain one or more selected from the group including Ni, Mn, Al, Cu, and Zn in addition to Co.

The cobalt ferrite has, for example, an average composition represented by the following Formula (1).

$$\text{Co}_x\text{M}_y\text{Fe}_2\text{O}_z \quad (1)$$

(where, in Formula (1), M is, for example, one or more metals selected from the group including Ni, Mn, Al, Cu, and Zn; x is a value within a range of 0.4≤x≤1.0; y is a value within the range of 0≤y≤0.3; however, x and y satisfy the relationship of (x+y)≤1.0; z is a value within a range of 3≤z≤4; a part of Fe may be substituted by another metal element).

An average particle size of the cobalt ferrite magnetic powder is preferably 25 nm or less, more preferably 23 nm or less. The coercive force Hc of the cobalt ferrite magnetic powder is preferably 2500 Oe or more, and more preferably 2600 Oe or more and 3500 Oe or less.

According to yet another preferred embodiment of the present technology, the magnetic powder may contain powder of nanoparticles containing hexagonal ferrite (hereinafter, referred to as "hexagonal ferrite particles"). The hexagonal ferrite particle has, for example, a hexagonal plate shape or a substantially hexagonal plate shape. The hexagonal ferrite may preferably contain at least one of Ba, Sr, Pb or Ca, and more preferably at least one of Ba or Sr. The hexagonal ferrite may be, for example, barium ferrite or strontium ferrite. The barium ferrite may further contain at least one of Sr, Pb, or Ca in addition to Ba. The strontium ferrite may further contain at least one of Ba, Pb or Ca in addition to Sr.

More specifically, the hexagonal ferrite may have an average composition represented by a general formula $\text{MFe}_{12}\text{O}_{19}$. Here, M is, for example, at least one metal of Ba, Sr, Pb, and Ca, preferably at least one metal of Ba and Sr. M may be a combination of Ba and at least one metal selected from the group including Sr, Pb, and Ca. Furthermore, M may be a combination of Sr and one or more metals selected from the group including Ba, Pb, and Ca. In the above general formula, part of Fe may be substituted by another metal element.

In a case where the magnetic powder contains powder of hexagonal ferrite particles, an average particle size of the magnetic powder is preferably 50 nm or less, more preferably 10 nm to 40 nm, and still more preferably 15 nm to 30 nm.

(Binder)

The binder is preferably a resin having a structure in which a crosslinking reaction is given to a polyurethane-based resin, a vinyl chloride-based resin, or the like. However, the binder is not limited thereto, and any other resins may be appropriately mixed depending on physical properties and the like desired for the magnetic recording medium 10. The resin to be mixed is not particularly limited as long as it is a resin generally used in the coating type magnetic recording medium 10.

The binder may include, for example, polyvinyl chloride, polyvinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer a methacrylic acid ester-vinyl chloride copolymer, a methacrylic acid ester-ethylene copolymer, a polyvinyl fluoride, vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, synthetic rubber, and the like.

Furthermore, as the binder, a thermosetting resin or a reactive resin may be used, and examples thereof include a phenol resin, an epoxy resin, a urea resin, a melamine resin, an alkyd resin, a silicone resin, a polyamine resin, an urea-formaldehyde resin, and the like.

Furthermore, polar functional groups such as, $-SO_3M$, $-OSO_3M$, $-COOM$, $P=O(OM)_2$, or the like, may be introduced into each binder described above in order to improve dispersibility of the magnetic powder. Here, in the formula, M is a hydrogen atom or an alkali metal such as lithium, potassium, sodium, and the like.

Moreover, examples of the polar functional group may include a side chain type having an end group of $-NR1R2$ and $-NR1R2R3^+X-$ or a main chain type of $>NR1R2^+X^-$. Here, in the formulas, R1, R2 and R3 are a hydrogen atom or a hydrocarbon group, and X— is a halogen element ion such as fluorine, chlorine, bromine, iodine, or the like, or an inorganic or organic ion. Furthermore, the polar functional group may also include $-OH$, $-SH$, $-CN$, and an epoxy group.

(Additive)

The magnetic layer 13 may further contain aluminum oxide (α, β or γ alumina), chromium oxide, silicon oxide, diamond, garnet, emery, boron nitride, titanium carbide, silicon carbide, titanium carbide, titanium oxide (rutile type titanium carbide or anatase type titanium oxide), or the like, as nonmagnetic reinforcing particles.

(Ground Layer)

The ground layer 12 is a nonmagnetic layer containing nonmagnetic powder and a binder as main components. The above description regarding the binder contained in the magnetic layer 13 is also applied to the binder contained in the ground layer 12. The ground layer 12 may further contain at least one of additives among conductive particles, a lubricant, a curing agent, a rust-preventive agent, or the like, as necessary.

An average thickness of the ground layer 12 is preferably 0.6 µm to 2.0 µm, and more preferably 0.8 µm to 1.4 µm. Note that the average thickness of the ground layer 12 is obtained in a manner similar to that of the average thickness $t_m$ of the magnetic layer 13. However, a magnification of a TEM image is appropriately adjusted according to the thickness of the ground layer 12.

(Nonmagnetic Powder)

The nonmagnetic powder contained in the ground layer 12 may include, for example, at least one selected from inorganic particles and organic particles. One kind of nonmagnetic powder may be used alone, or two or more kinds of nonmagnetic powder may be used in combination. The inorganic particles include, for example, one or a combination of two or more selected from metal, metal oxide, metal carbonate, metal sulfate, metal nitride, metal carbide, and metal sulfide. More specifically, the inorganic particles may be, for example, one or two or more selected from iron oxyhydroxide, hematite, titanium oxide, and carbon black. A shape of the nonmagnetic powder may include, for example, various shapes such as a needle shape, sphere shape, cubic shape, plate shape, or the like, but is not particularly limited thereto.

(Back Layer)

The back layer 14 may contain a binder and nonmagnetic powder. The back layer 14 may contain various additives such as a lubricant, a curing agent, an antistatic agent, and the like, as necessary. The above description of the binder and the nonmagnetic powder contained in the ground layer 12 is also applied to the binder and the nonmagnetic powder contained in the back layer 14.

An average particle size of the inorganic particles contained in the back layer 14 is preferably 10 nm to 150 nm, and more preferably 15 nm to 110 nm. The average particle size of the inorganic particles is obtained in a manner similar to that of the average particle size D of the magnetic powder described above.

An average thickness $t_b$ of the back layer 14 is preferably $t_b \leq 0.6$ µm. Since the average thickness $t_b$ of the back layer 14 is within the above range, even in a case where the average thickness $t_T$ of the magnetic recording medium 10 is $t_T \leq 5.5$ µm, the thicknesses of the ground layer 12 and the base layer 11 may be kept thick, whereby running stability of the magnetic recording medium 10 in the recording and reproducing apparatus may be maintained.

The average thickness $t_b$ of the back layer 14 is obtained as follows. First, a ½ inch-wide magnetic recording medium 10 is prepared and cut into a length of 250 mm to prepare a sample. Next, thicknesses of different spots of the sample are measured at 5 or more points using a laser hologage manufactured by Mitsutoyo Co., Ltd., as a measurement device, and the measured values are simply averaged (arithmetic average) to obtain an average value $t_T$ [µm]. Subsequently, the back layer 14 of the sample is removed with a solvent such as methyl ethyl ketone (MEK) or diluted hydrochloric acid, and thereafter, thicknesses of different spots of the sample are measured at 5 or more points using the laser hologage and the measured values are simply averaged (arithmetic average) to obtain an average value $t_B$ [µm]. Thereafter, the average thickness $t_b$ [µm] of the back layer 14 is obtained by the following equation.

$$t_b [\mu m] = t_T [\mu m] - t_B [\mu m]$$

(3) Physical Properties and Structure (Average Thickness $t_T$ of Magnetic Recording Medium)

The average thickness $t_T$ of the magnetic recording medium 10 is $t_T \leq 5.6$ µm. When the average thickness $t_T$ of the magnetic recording medium 10 is $t_T \leq 5.6$ µm, a recording capacity that can be recorded in one data cartridge can be increased as compared to the related art. A lower limit value of the average thickness $t_T$ of the magnetic recording medium 10 is, for example, 3.5 µm $\leq t_T$, but is not particularly limited.

The average thickness $t_T$ of the magnetic recording medium 10 is obtained by the method of measuring the average value $t_T$ described above in the method of measuring the average thickness $t_b$ of the back layer 14.

(Dimensional Change Amount Δw)

The dimensional change amount Δw [ppm/N] of the magnetic recording medium 10 in the width direction with respect to a change in tension of the magnetic recording medium 10 in the longitudinal direction is 660 ppm/N≤Δw, more preferably 670 ppm/N≤Δw, more preferably 700 ppm/N≤Δw, more preferably 710 ppm/N≤Δw, more preferably 730 ppm/N≤Δw, more preferably 750 ppm/N≤Δw, still more preferably 780 ppm/N≤Δw, and particularly preferably 800 ppm/N≤Δw. If the dimensional change amount Δw is Δw≤640 ppm/N, it may be difficult to suppress a change in width in the adjustment of longitudinal tension by the recording and reproducing apparatus. The upper limit value of the dimensional change amount Δw is not particularly limited. For example, Δw≤1700000 ppm/N, preferably Δw≤20000 ppm/N, more preferably Δw≤8000 ppm/N, still more preferably Δw≤5000 ppm/N, Δw≤4000 ppm/N, Δw≤3000 ppm/N, or Δw≤2000 ppm/N.

Those skilled in the art can appropriately set the dimensional change amount Δw. For example, the dimensional change amount Δw may be set to a desired value by selecting a thickness of the base layer 11 and/or a material of the base layer 11. Furthermore, the dimensional change amount Δw may be set to a desired value, for example, by adjusting the stretching strength in the vertical and horizontal directions of the film constituting the base layer. For example, Δw decreases more when the film is stretched more strongly in the width direction, and conversely, Δw increases when the film is stretched strongly in the longitudinal direction.

The dimensional change amount Δw is obtained as follows. First, a ½ inch-wide magnetic recording medium 10 is prepared and cut into a length of 250 mm to prepare a sample 10S. Next, loads are applied in order of 0.2 N, 0.6 N, and 1.0 N in the longitudinal direction of the sample 10S, and widths of the sample 10S at the loads of 0.2 N, 0.6 N, and 1.0 N are measured. Subsequently, the dimensional change amount Δw is determined from the following equation. Note that the measurement in a case of applying the load of 0.6 N is carried out to check whether an abnormality has not occurred in the measurement (in particular, in order to check whether these three measurement results are linear), and the measurement results are not used in the following equation.

$$\Delta w[\text{ppm}/N] = \frac{D(0.2\,N)[\text{mm}] - D(1.0\,N)[\text{mm}]}{D(0.2\,N)[\text{mm}]} \times \frac{1{,}000{,}000}{(1.0[N]) - (0.2[N])} \quad [\text{Equation 1}]$$

(where, D(0.2 N) and D(1.0 N) represent widths of the sample 10S when 0.2 N and 1.0 N are loaded in the longitudinal direction of sample 10S, respectively).

Figure 3A:
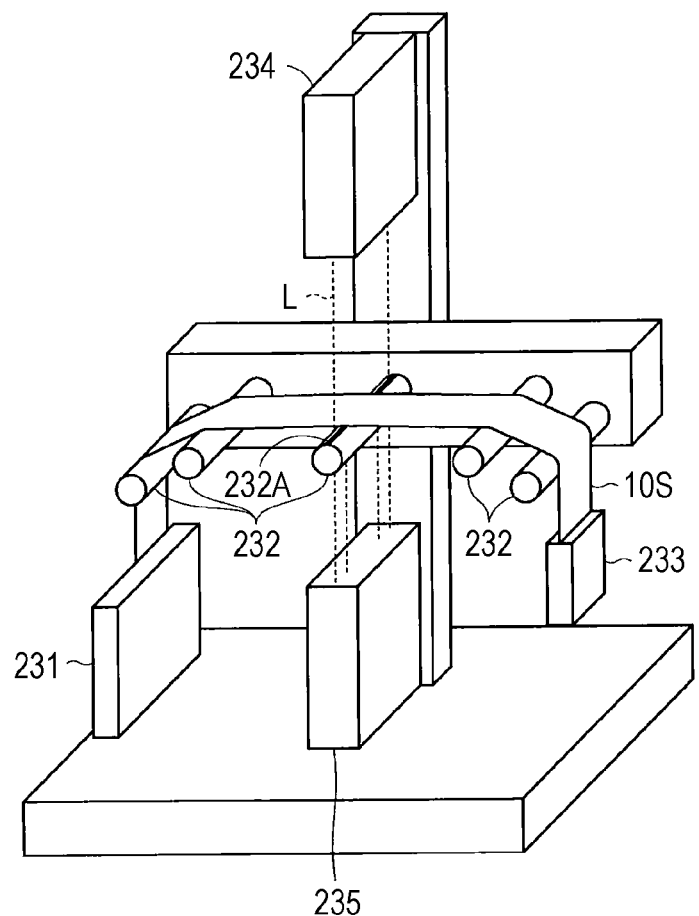
FIG. 3A is a perspective view showing a configuration of a measurement device.

The widths of the sample 10S when each load is applied are measured as follows. First, a measurement device shown in FIG. 3A including a digital dimension measuring instrument LS-7000 manufactured by Keyence Corporation is prepared as a measurement device, and the sample 10S is set in the measurement device. Specifically, one end of the long-shaped sample (magnetic recording medium) 10S is fixed by a fixing portion 231. Next, as shown in FIG. 3A, the sample 10S is placed on five substantially cylindrical and rod-like support members 232. The sample 10S is placed on the five support members 232 so that a back surface thereof is in contact with the five support members 232. The five support members 232 (particularly, surfaces thereof) all include stainless steel SUS304, and surface roughness Rz (maximum height) thereof is 0.15 μm to 0.3 μm.

Figure 3B:
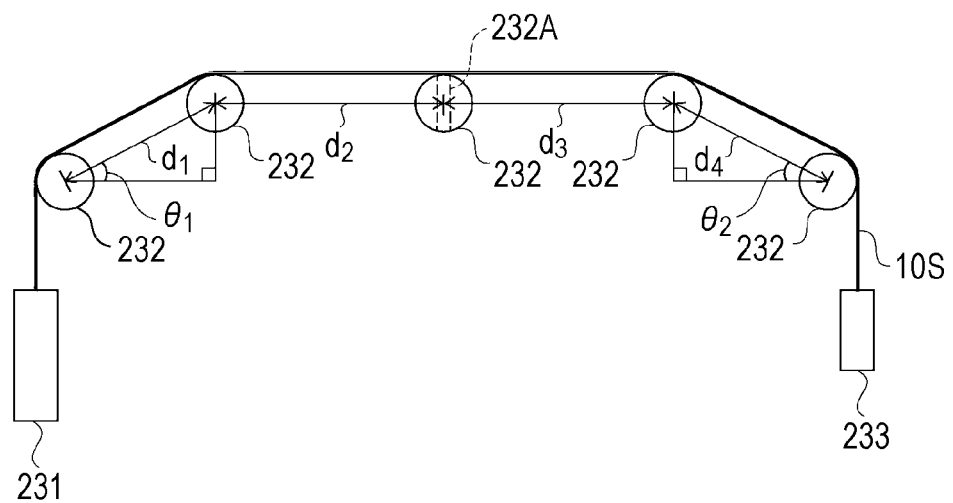
FIG. 3B is a schematic view showing the details of a measurement device.

The arrangement of the five rod-like support members 232 will be described with reference to FIG. 3B. As shown in FIG. 3B, the sample 10S is placed on the five support members 232. Hereinafter, the five support members 232 will be referred to as, starting from the side closest to the fixing portion 231, a "first support member", a "second support member", a "third support member" (having a slit 232A), a "fourth support member", and a "fifth support member" (closest to a weight 233). A diameter of these five support members is 7 mm. A distance $d_1$ between the first support member and the second support member (in particular, a distance between the centers of these support members) is 20 mm. A distance d2 between the second support member and the third support member is 30 mm. A distance d3 between the third support member and the fourth support member is 30 mm. A distance d4 between the fourth support member and the fifth support member is 20 mm. Furthermore, the second support member, the third support member, and the fourth support member are arranged so that portions of the sample 10S placed between the second support member, the third support member, and the fourth support member forms a substantially perpendicular plane with respect to the direction of gravity. Furthermore, the first support member and the second support member are arranged so that the sample 10S forms an angle of $\theta_1=30°$ with respect to the substantially perpendicular plane between the first support member and the second support member. Moreover, the fourth support member and the fifth support member are arranged so that the sample 10S forms an angle of $\theta_2=30°$ with respect to the substantially perpendicular plane between the fourth support member and the fifth support member.

Furthermore, among the five support members 232, the third support member is fixed so as not to rotate, while the other four support members are all rotatable.

The sample 10S is held on the support member 232 so as not to move in a width direction of the sample 10S. Note that, among the support members 232, the support member 232 positioned between a light emitter 234 and a light receiver 235 and positioned substantially at the center between the fixing portion 231 and a load applying portion has the slit 232A. Light L is irradiated from the light emitter 234 to the light receiver 235 through the slit 232A. A slit width of the slit 232A is 1 mm and the light L may pass through the width, without being blocked by the rim of the slit 232A.

Subsequently, after the measurement device is accommodated in a chamber controlled in a predetermined environment controlled at a constant temperature of 25° C. and a relative humidity of 50%, the weight 233 for applying a load of 0.2 N is attached to the other end of the sample 10S and the sample 10S is left for 2 hours in the environment. After 2 hours, a width of the sample 10S is measured. Next, the weight for applying the load of 0.2 N is changed to a weight for applying a load of 0.6 N, and the width of the sample 10S is measured 5 minutes after the switch. Finally, the weight is changed to a weight for applying a load of 1.0 N, and the width of the sample 10S is measured 5 minutes after the switch.

As described above, by adjusting the weight of the weight 233, the load applied in the longitudinal direction of the sample 10S may be changed. With each load applied, light L is irradiated from the light emitter 234 toward the light receiver 235, and the width of the sample 10S to which the load is applied in the longitudinal direction is measured. The measurement of the width is performed in a state where the sample 10S is not curled. The light emitter 234 and the light receiver 235 are provided in the digital dimension measuring instrument LS-7000.

(Thermal Expansion Coefficient α)

The thermal expansion coefficient α[ppm/° C.] of the magnetic recording medium 10 may be preferably 5.5 ppm/° C.≤α≤9 ppm/° C., and more preferably 5.9 ppm/° C.≤α≤8 ppm/° C. When the thermal expansion coefficient α is within the above range, a change in the width of the magnetic recording medium 10 may be further suppressed by adjusting tension in the longitudinal direction of the magnetic recording medium 10 by the recording and reproducing apparatus.

The temperature expansion coefficient α is obtained as follows. First, the sample 10S is prepared in a manner similar to that of the method of measuring the dimensional change amount Δw, the sample 10S is set in a measurement device similar to that of the method of measuring the dimensional change amount Δw, and thereafter, the measurement device is accommodated in a chamber of a predetermined environment controlled at a temperature of 29° C. and relative humidity of 24%. Next, a load of 0.2 N is applied in the longitudinal direction of the sample 10S, and the sample 10S was placed in the above environment for 2 hours. Thereafter, with the relative humidity of 24% maintained, widths of the sample 10S at 45° C., 29° C., and 10° C. are measured, while changing the temperatures in order of 45° C., 29° C., and 10° C., and the temperature expansion coefficient α is obtained from the following equation. Here, the widths of the sample 10S are measured at these temperatures 2 hours after each temperature is reached. Note that the measurement at the temperature of 29° C. is carried out in order to check whether an abnormality has not occurred in the measurement (in particular, to check whether these three measurement results are linear) and the measurement results are not used in the following equation.

$$\alpha[\text{ppm}/°\text{C.}] = \frac{D(45°\text{ C.})[\text{mm}] - D(10°\text{ C.})[\text{mm}]}{D(10°\text{ C.})[\text{mm}]} \times \frac{1{,}000{,}000}{(45[°\text{ C.}]) - (10[°\text{ C.}])} \quad \text{[Equation 2]}$$

(where, D(45° C.) and D(10° C.) represent the widths of the sample 10S at the temperatures of 45° C. and 10° C., respectively).

(Humidity Expansion Coefficient β)

A humidity expansion coefficient β[ppm/% RH] of the magnetic recording medium 10 may be preferably β≤5.5 ppm/% RH, more preferably β≤5.2 ppm/% RH, and still more preferably β≤5.0 ppm/% RH. When the humidity expansion coefficient β is within the range, a change in the width of the magnetic recording medium 10 can be further suppressed by adjusting tension in the longitudinal direction of the magnetic recording medium 10 by the recording and reproducing apparatus.

The humidity expansion coefficient β is obtained as follows. First, the sample 10S is prepared in a manner similar to that of the method of measuring the dimensional change amount Δw and set in a measurement device similar to that of the method of measuring the dimensional change amount Δw, and thereafter, the measurement device is accommodated in a chamber of a predetermined environment controlled at a temperature of 29° C. and a relative humidity of 24%. Next, a load of 0.2 N is applied in the longitudinal direction of the sample 10S, and the sample is left in the environment for 2 hours. Thereafter, with the temperature of 29° C. maintained, widths of the sample 10S at relative humidity of 80%, 24%, and 10% are measured, while the relative humidity is changed in order of 80%, 24%, and 10%, and a humidity expansion coefficient β is obtained by the following equation. Here, the widths of the sample 10S are measured at these pieces of humidity immediately after each humidity is reached. Note that the measurement at the humidity of 24% is carried out in order to check whether an abnormality has not occurred in the measurement, and the measurement results are not used in the following equation.

$$\beta[\text{ppm}/\%\,RH] = \frac{D(80\%)[\text{mm}] - D(10\%)[\text{mm}]}{D(10\%)[\text{mm}]} \times \frac{1{,}000{,}000}{(80[\%]) - (10[\%])} \quad \text{[Equation 3]}$$

(where, D(80%) and D(10%) represent the widths of the sample 10S at the relative humidity 80% and 10%, respectively).

(Poisson's Ratio ρ)

A Poisson's ratio ρ of the magnetic recording medium 10 may be preferably 0.25≤ρ, more preferably 0.29≤ρ, and still more preferably 0.3≤ρ. When the Poisson's ratio ρ is within the above range, a change in the width of the magnetic recording medium 10 can be further suppressed by adjusting tension in the longitudinal direction of the magnetic recording medium 10 by the recording and reproducing apparatus.

The Poisson's ratio ρ is obtained as follows. First, a ½ inch-wide magnetic recording medium 10 is prepared and cut into a length of 150 mm to prepare a sample, and a mark having a size of 6 mm×6 mm is given to the center of the sample. Next, both end portions in the longitudinal direction of the sample are chucked so that a distance between chucks is 100 mm, an initial load of 2 N is applied, a length of the mark in the longitudinal direction of the sample at that time is determined as an initial length and a width of the mark in a width direction of the sample is determined as an initial width. Subsequently, the sample is stretched with an Instron type universal tensile tester at a tensile speed of 0.5 mm/min and dimensional change amounts of the mark in the length of the mark in the longitudinal direction of the sample and the width of the mark in the width direction of the sample are measured with an image sensor manufactured by Keyence Corporation. Thereafter, Poisson's ratio ρ is obtained from the following equation.

$$\rho = \frac{\left\{\dfrac{(\text{Dimensional Change Amount of Width of Mark [mm]})}{(\text{Initial Width [mm]})}\right\}}{\left\{\dfrac{(\text{Dimensional Change Amount of Length of Mark [mm]})}{(\text{Initital Width [mm]})}\right\}} \quad \text{[Equation 4]}$$

(Longitudinal Elasticity Limit Value $\sigma_{MD}$)

The elasticity limit value $\sigma_{MD}$[N] in the longitudinal direction of the magnetic recording medium 10 may be preferably 0.7 N≤$\sigma_{MD}$, more preferably 0.75 N≤$\sigma_{MD}$, and still more preferably 0.8 N≤$\sigma_{MD}$. When the elasticity limit value $\sigma_{MD}$ is within the above range, a change in the width of the magnetic recording medium 10 can be further suppressed by adjusting tension in the longitudinal direction of the magnetic recording medium 10 by the recording and reproducing apparatus. Furthermore, it is easier to control a drive side. An upper limit value of the elasticity limit value $\sigma_{MD}$ in the longitudinal direction of the magnetic recording medium 10 is not particularly limited and may be, for example, $\sigma_{MD}$≤5.0 N. Preferably, the elasticity limit value $\sigma_{MD}$ does not depend on a speed V when an elastic limit is measured. The reason is because, when the elastic limit value $\sigma_{MD}$ does not depend on the speed V, the change in the width of the magnetic recording medium 10 can be effectively suppressed without being affected by a running speed of the magnetic recording medium 10 in the recording and reproducing apparatus and a tension adjustment speed or responsiveness of the recording and reproducing apparatus. The elasticity limit value $\sigma_{MD}$ is set to a desired value, for example, depending on a selection of curing conditions of the ground layer 12, the magnetic layer 13, and the back layer 14, and or a selection of a material of the base layer 11. For example, as a time for curing paint for forming the ground layer, paint for forming the magnetic layer, and paint for forming the back layer is increased or as a curing temperature thereof is increased, a reaction between a binder and a curing agent contained in each paint is accelerated. As a result, elastic characteristic are improved to improve the elasticity limit value GMD.

The elastic limit value GMD is obtained as follows. First, a ½ inch-wide magnetic recording medium 10 is prepared, cut into a length of 150 mm to prepare a sample, and both ends of the sample in the longitudinal direction are chuck in the universal tensile tester so that a distance λ0 between the chucks is 100 mm (λ0=100 mm). Next, the sample is stretched at a tensile speed of 0.5 mm/min, and a load σ(N) regarding the distance λ(mm) between the chucks is continuously measured. Subsequently, a relationship between Δλ(%) and σ(N) is graphed using the obtained data of λ(mm) and σ(N). However, Δλ(%) is given by the following equation.

Δλ(%)=((λ−λ0)/λ0)×100

Next, in the above graph, a region in which the graph is a straight line is calculated in the region of σ≥0.2 N and a maximum load σ thereof is set as an elasticity limit value $\sigma_{MD}(N)$ (Friction Coefficient μ Between Magnetic Surface and Back Surface)

A friction coefficient μ between the surface of the magnetic layer side and the surface of the back layer side of the magnetic recording medium 10 (hereinafter, also referred to as interlayer friction coefficient μ) is preferably 0.20≤μ≤0.80, more preferably 0.20≤μ≤0.78, and still more preferably 0.25≤μ≤0.75. When the friction coefficient μ is within the above range, handling properties of the magnetic recording medium 10 is improved. For example, when the friction coefficient μ is within the above range, the occurrence of winding deviation when the magnetic recording medium 10 is wound around the reel (for example, the reel 10C, etc., in FIG. 5) is suppressed. More specifically, in a case where the friction coefficient μ is too small (for example, in case of μ<0.18), an interlayer friction between a magnetic surface of a portion of the magnetic recording medium 10, which has already been wound around the cartridge reel, positioned on the outermost circumference and a back surface of the magnetic recording medium 10 to be newly wound around an outer side thereof is extremely low and thus the magnetic recording medium 10 to be newly wound may readily deviate from the magnetic surface of the portion position on the outermost circumference of the magnetic recording medium 10 which has already been wound. Therefore, winding deviation of the magnetic recording medium 10 occurs. Meanwhile, in a case where the friction coefficient μ is too large (for example, in case of 0.82<μ or 0.80<μ), an interlayer friction between the back surface of the magnetic recording medium 10 which is to be definitely released from the outermost circumference of the reel on the drive side and the magnetic surface of the magnetic recording medium 10, which is positioned immediately thereunder and which is in a state of being wound yet on the reel on the drive side is extremely high, so the back surface and the magnetic surface are stuck to each other. Therefore, the operation of the magnetic recording medium 10 toward the cartridge reel becomes unstable, thereby causing winding deviation of the magnetic recording medium 10.

The friction coefficient μ is obtained as follows. First, the magnetic recording medium 10 having a width of ½ inches, with the back surface facing upward, is wound around a circumference having a diameter of 1 inch so as to be fixed. Next, the magnetic recording medium 10 having the width of ½ inches is brought into contact with the circumference at a wrap angle of θ(°)=180°+1° to 180°−10° so that the magnetic surface thereof is in contact therewith and one end of the magnetic recording medium 10 is connected to a movable strain gauge and tension $T_0$=0.6(N) is given to the other end of the magnetic recording medium 10. The reading $T_1(N)$ to $T_8(N)$ of the movable strain gauge at each outward path when the movable strain gauge is reciprocated 8 times at 0.5 mm/s is measured, and an average value of $T_4$ to $T_8$ is determined as $T_{ave}(N)$. Thereafter, the friction coefficient μ is obtained from the following equation.

$$\mu = \frac{1}{(\theta[°]) \times (\pi/180)} \times \log_e\left(\frac{T_{ave}\,[N]}{T_0\,[N]}\right) \quad \text{[Equation 5]}$$

(Surface Roughness $R_{ab}$ of Back Layer)

The surface roughness $R_{ab}$ [nm] (in other words, surface roughness of the back surface) of the back layer 14 is preferably 7.5 nm or less, more preferably 7.2 nm or less, still more preferably 7.0 nm or less, 6.5 nm or less, 6.3 nm or less, or 6.0 nm or less. Furthermore, the surface roughness $R_{ab}$ is preferably 3.0 nm or more, more preferably 3.2 nm or more, and still more preferably 3.4 nm or more. When the surface roughness $R_{ab}$ of the back layer is within the above range, handling properties of the magnetic recording medium 10 can be improved. Furthermore, when the magnetic recording medium 10 is wound, an influence on the surface of the magnetic layer can be reduced, and thus, an adverse effect on the electromagnetic conversion characteristic can be suppressed. The handling properties and electromagnetic conversion characteristic are contradictory properties, but the surface roughness $R_{ab}$ within the numerical range enables their compatibility.

The surface roughness $R_{ab}$ of the back surface is obtained as follows. First, the magnetic recording medium 10 having a width of ½ inches is prepared, and the magnetic recording medium 10 is attached to a slide glass, with the back surface facing upward (that is, the magnetic surface is attached to the slide glass) to use it as a sample piece. Next, surface roughness of the back surface of the sample piece is measured by the following non-contact roughness meter using optical interference.

Device: Non-contact roughness meter using optical interference (VertScan R5500GL-M100-AC, non-contact surface and layer cross-sectional shape measurement system, manufactured by Ryoka Systems Inc.)

Objective lens: 20 times (approximately 237 μm×178 μm field of view)

Resolution: 640 points×480 points

Measurement mode: phase

Wavelength filter: 520 nm

Surface correction: correction by quadratic polynomial approximation plane

As described above, surface roughness is measured at positions of at least five spots in the longitudinal direction, and an average value of each arithmetic average roughness Sa (nm), which is automatically calculated from a surface profile obtained at each position, is determined as the surface roughness $R_{ab}$ (nm) of the back surface.

((Servo Track Width on Inner Side of Winding)–(Servo Track Width on Outer Side of Winding))

A difference between the servo track widths on the inner side of the winding and the outer side of the winding exceeds 0 preferably 0.01 µm or more, more preferably 0.02 or more, and still more preferably 0.05 µm or more. The difference between servo track widths on the inner side of the winding and the outer side of the winding may be, for example, 0.10 or more, 0.15 µm or more, or 0.20 µm or more. Accordingly, the occurrence of wrinkles on the magnetic recording medium wound around the reel in the cartridge may be prevented.

The difference in servo track width between the inner and outer sides of winding may be, for example, 2.5 µm or less, preferably 1.8 µm or less, and more preferably 1.5 µm or less, 1.0 µm or less, 0.8 µm or less, or 0.5 µm or less.

In order to obtain a difference between the servo track widths on the inner and outer sides of the winding, a deviation amount $T_{in}W$ of the servo track width on the inner side of the winding of the magnetic recording medium and a deviation amount $T_{out}W$ of the servo track width on the outer side of the winding are respectively measured. The measurement is carried out under an environment of a temperature of 23±3° C. and a relative humidity of 50%±5%. These deviation amounts indicate how large or small the servo track widths are, with respect to a standard servo track width. A method of measuring these deviation amounts will be separately described below.

In this specification, on the basis of a position, as a starting point, 50 m away from an end portion (hereinafter, referred to as an "inner end portion") installed on the reel (around which the magnetic recording medium is wound) in the magnetic recording cartridge, the inner side of the winding refers to a region up to a position 10 m advancing from the starting position in a direction toward an end portion (hereinafter, referred to as an "outer end portion") opposite to the inner end portion of the two end portions of the magnetic recording medium.

In this specification, on the basis of a position, as a starting point, 50 m away from the outer end portion, the outer side of the winding refers to a region up to a position 10 m advancing from the starting position in a direction toward the inner end portion of among the two end portions of the magnetic recording medium.

Figure 11:
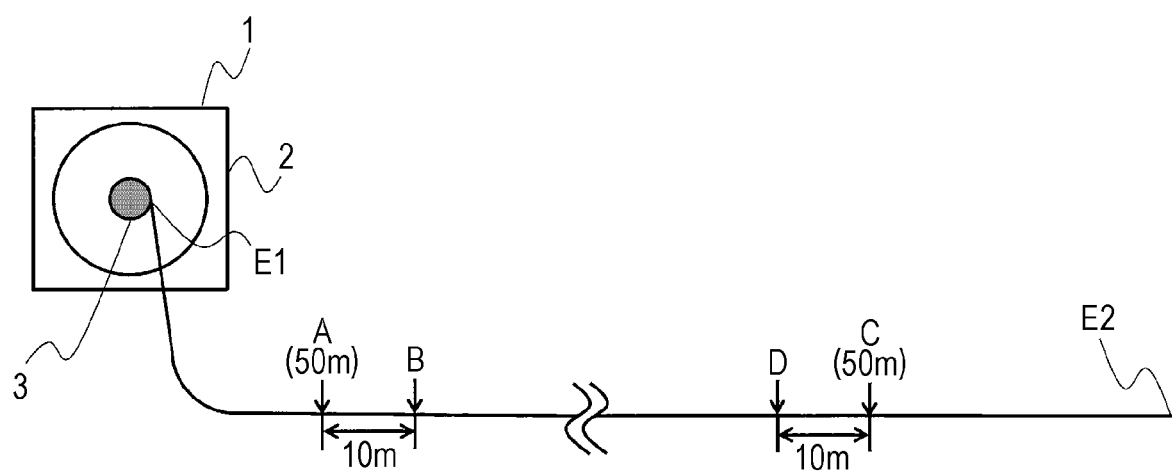
FIG. 11 is a schematic view showing measurement positions of a deviation amount of a servo track width.

The inner side and the outer side of the winding will be described in more detail with reference to FIG. 11. In FIG. 11, an inner end portion E1 of the reel 3 of the magnetic recording cartridge 1 is provided. A region between a position A 50 m away from the inner end portion E1 and a position B 10 m away from the position A toward the outer end portion E2 is the inner side of the winding. A region between a position C 50 m away from the outer end portion E2 toward the inner end portion E1 and a position D 10 m further away from the position C toward the inner end portion E1 is the outer side of the winding.

The deviation amount $T_{in}W$ of the servo track width on the inner side of the winding is measured, while allowing the magnetic recording medium accommodated in the magnetic recording cartridge to run so as to be drawn into the magnetic recording and reproducing apparatus (that is, while allowing the magnetic recording medium to run in a forward direction). In the measurement, tension applied to the magnetic recording medium is 0.55 N and a running speed is 3 to 6 m/s. The average value of the deviation amounts of the servo track widths measured over the region of 10 m of the inner side of the winding is used as a deviation amount $T_{in}W$ of the servo track width of the inner side of the winding to obtain the above difference. The average value is calculated by a simple average.

The measurement of the deviation amount $T_{out}W$ of the servo track width on the outer side of the winding is also carried out, while allowing the magnetic recording medium to run in the forward direction, similar to the inner side of the winding. The average value of the deviation amounts of the servo track widths measured over the region of 10 m of the outer side of the winding is used as a deviation amount $T_{out}W$ of the servo track width of the outer side of the winding to obtain the above difference. The average value is also calculated by a simple average.

A difference ($T_{in}W - T_{out}W$) is obtained by subtracting the deviation amount $T_{out}W$ of the servo track width on the outer side of the winding from the deviation amount $T_{in}W$ of the servo track width on the inner side of the winding obtained as described above, and the above difference is (servo track width on inner side of winding)–(servo track width on outer side of winding).

(Deviation Amount of Servo Track Width)

Figure 12A:
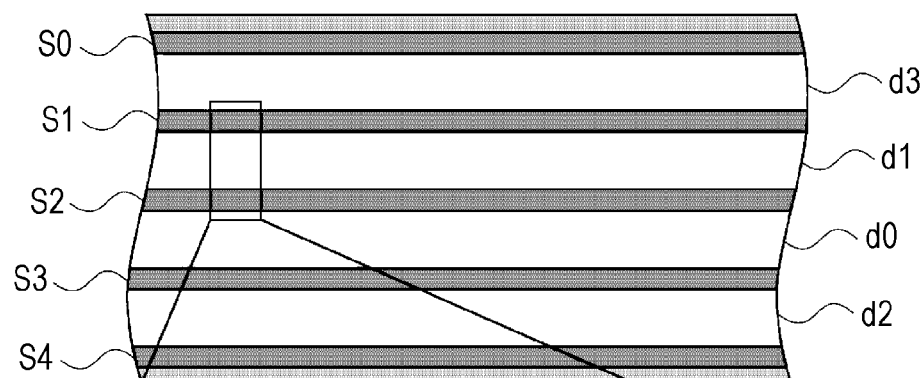
FIGS. 12A to 12C are a schematic views showing a method of measuring a deviation amount of a servo track width.
Figure 12B:
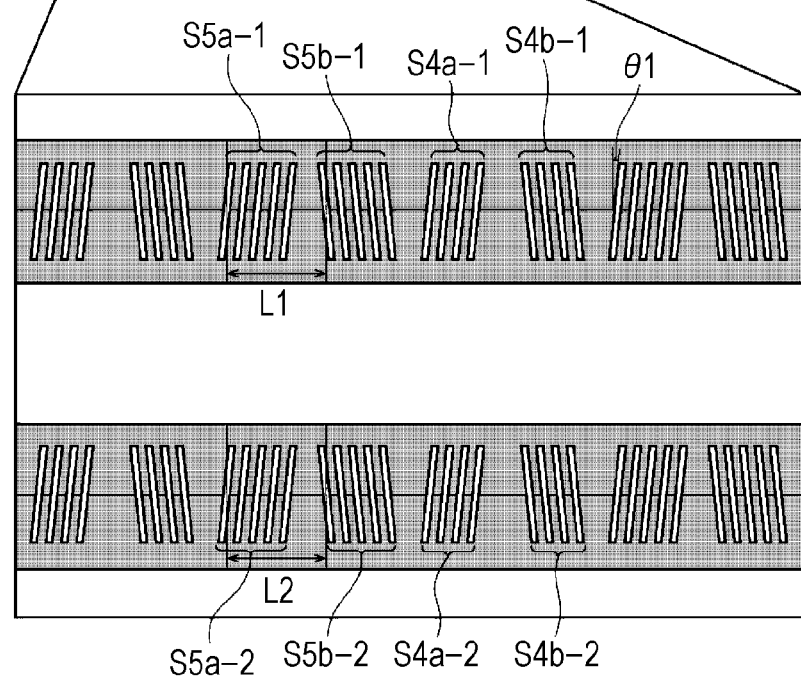

A method of measuring a deviation amount of the servo track width will be described with reference to FIGS. 12A to 12C. FIG. 12A is a schematic diagram of a data band and a servo band formed in a magnetic layer of a magnetic recording tape. As shown in FIG. 12A, the magnetic layer has four data bands d0 to d3. The magnetic layer has a total of five servo bands S0 to S4 so that each data band is sandwiched by two servo bands. As shown in FIG. 12B, each servo band has repeated frame units each including five servo signals S5a inclined at a predetermined angle θ1, five servo signals S5b inclined at the same angle in the opposite direction of the servo signals S5a, four servo signals S4a inclined at the predetermined angle θ1, and four servo signals S4b inclined at the same angle in the opposite direction of the servo signals S4a. The angle θ1 may be, for example, 5° to 25°, and particularly 11° to 20°.

The deviation amount of the servo track width measured in the above measuring method is the deviation amount of the servo track width between two servo tracks S1 and S2 sandwiching the second data band d1 from the top in FIG. 12A with respect to a standard servo track width.

Figure 12C:

In a case where two servo tracks S1 and S2 sandwiching the data band d1 are reproduced at the time of driving, a waveform as shown in FIG. 12C is obtained for each servo track by a digital oscilloscope (WAVEPRO 960 manufactured by Lecroy Corporation).

A time between the timing signals is obtained from the waveform obtained by reproduction of the servo track S1 and a distance between a leading magnetic stripe of burst A and a leading magnetic stripe of burst B in the servo track S1 is calculated from the time and a tape running speed. For example, as shown in FIG. 12B, a distance L1 between a leading magnetic stripe (the leftmost magnetic stripe among the five magnetic stripes) of the burst A S5a-1 and a leading magnetic stripe (the leftmost magnetic stripe among the five magnetic stripes) of the burst B S5b-1 is calculated.

Similarly, a time between timing signals is obtained from a waveform obtained by reproduction of the servo track S2, and a distance between the leading magnetic stripe of the burst A and the leading magnetic stripe of the burst B in the servo track S2 is calculated from the time and a tape running speed. For example, as shown in FIG. 11(b), a distance L2 between a leading magnetic stripe of the burst A S5a-2 and a leading magnetic stripe of the burst B S5b-2 is calculated.

For example, in a case where the magnetic recording tape is enlarged in the width direction, for example, a time between timing signals obtained by reproduction of the servo track S1 is lengthened, and as a result, the calculated distance L1 may also be increased. In a case where the magnetic recording tape is reduced in the width direction, the calculated distance L1 may be reduced. Therefore, by using the distance L1, the distance L2 and an azimuth angle, the deviation amount of the servo track width may be obtained. The deviation amount of the servo track width is obtained from the following equation.

(Deviation amount of servo track width)={(L1−L2)/ 2}×tan(90°−θ1)

In this equation, L1 and L2 are the distances L1 and L2 described above, and θ1 is the inclination angle θ1 described above and is also referred to as an azimuth angle. θ1 is obtained by developing the magnetic recording tape taken out from the cartridge with FERRICOLLOID developer and using a universal tool microscope (TOPCON TUM-220ES) and a data processing device (TOPCON CA-1B).

The deviation amount of the servo track width is a change amount with respect to a standard servo track width. The standard servo track width may be equal to the servo lead head width of the magnetic recording and reproducing apparatus and may be determined, for example, according to the type of the magnetic recording medium 10 such as a standard that the magnetic recording medium 10 follows, and the like.

Note that the servo track width can be adjusted, for example, as follows. In order to alleviate distortion occurring in the magnetic recording medium 10, winding tension may be lowered in a drying process of the magnetic recording medium 10 and/or a calendering process (heating region). Furthermore, in order to alleviate distortion in a pancake state and/or a cartridge state after cutting, the magnetic recording medium 10 may be stored for a long time at a temperature of 55° C. or higher. The servo track width may be adjusted by reducing the distortion in this way.

(Servo Track Width Larger than Servo Lead Head Width)

The magnetic recording medium 10 preferably has a servo track width larger than the servo lead head width of the magnetic recording and reproducing apparatus in which the magnetic recording cartridge 1 is loaded. The servo track width is a servo track width between the servo tracks S1 and S2 described above. The servo lead head width is a width of two adjacent servo signal reading magnetic head gaps included in the magnetic recording and reproducing apparatus, and servo signals of two adjacent servo bands are read by the two adjacent servo signal reading magnetic head gaps, respectively. The servo lead head width may have, for example, the standard servo track width described above.

For example, the deviation amount $T_{in}W$ of the servo track width on the inner side of the winding and the deviation amount $T_{out}W$ of the servo track width on the outer side of the winding are measured using the servo lead head width as the standard servo track width, and in a case where both of the measured deviation amounts are positive values (for example, more than 0.00 μm), it is determined that the magnetic recording medium has a servo track width larger than the servo lead head width. In a case where one deviation amount is 0 or less or in a case where the deviation amount of both is 0 or less, it is determined that the magnetic recording medium does not have a servo track width larger than the servo lead head width.

Preferably, both the deviation amount $T_{in}W$ of the servo track width on the inner side of the winding and the deviation amount $T_{out}W$ of the servo track width on the outer side of the winding are preferably 0.01 μm or more, more preferably 0.05 μm or more, and still more preferably 0.10 μm or more.

The deviation amount $T_{in}W$ of the servo track width on the inner side of the winding and the deviation amount $T_{out}W$ of the servo track width on the outer side of the winding are both, for example, 5.0 μm or less, more preferably 4.0 μm or less, and still more preferably 3.0 μm or less, or 2.0 μm or less, or 1.0 μm or less.

The measurement of these deviation amounts is performed as described above.

(Coercive Force Hc)

The coercive force Hc measured in the thickness direction (vertical direction) of the magnetic recording medium 10 is preferably 220 kA/m to 310 kA/m, more preferably 230 kA/m to 300 kA/, still more preferably 240 kA/m to 290 kA/m. When the coercive force Hc is 220 kA/m or more, the coercive force Hc becomes a sufficient magnitude, and thus, a degradation of a magnetic signal recorded on an adjacent track due to a leakage magnetic field from the recording head may be suppressed. Therefore, a better SNR can be obtained. On the other hand, when the coercive force Hc is 310 kA/m or less, saturation recording by the recording head is facilitated, and thus, a better SNR can be obtained.

The coercive force Hc is obtained as follows. First, a measurement sample is cut out from the long-shaped magnetic recording medium 10 and an M-H loop of the entire measurement sample is measured in the thickness direction of the measurement sample (thickness direction of the magnetic recording medium 10) using a vibrating sample magnetometer (VSM). Next, the coating film (ground layer 12, magnetic layer 13, etc.) is wiped out using acetone, ethanol, or the like, to leave only the base layer 11 for background correction, and the M-H loop of the base layer 11 is measured in the thickness direction of the base layer 11 (the thickness direction of the magnetic recording medium 10) using the VSM. Thereafter, the M-H loop of the base layer 11 is subtracted from the M-H loop of the entire measurement sample to obtain an M-H loop after background correction. The coercive force Hc is obtained from the obtained M-H loop. Note that it is assumed that the measurement of the M-H loop is entirely performed at 25° C. Furthermore, it is also assumed that "demagnetizing field correction" when the M-H loop is measured in the thickness direction (vertical direction) of the magnetic recording medium 10 is not performed.

(Ratio R of Coercive Force Hc(50) and Coercive Force Hc(25))

The ratio R (=(Hc(50)/Hc(25))×100) between the coercive force Hc(50) measured at 50° C. in the thickness direction (vertical direction) of the magnetic recording medium 10 to the coercive force Hc(25) measured at 25° C. in the thickness direction of the magnetic recording medium 10 is preferably 95% or more, more preferably 96% or more, still more preferably 97% or more, and particularly preferably 98% or more. When the ratio R is 95% or more, temperature dependence of the coercive force Hc is small, and thus, deterioration of the SNR under a high temperature environment can be suppressed.

The coercive force Hc(25) is obtained in a manner similar to the method of measuring the coercive force Hc. Furthermore, the coercive force Hc(50) is obtained in a manner similar to the method of measuring the coercive force Hc except that the M-H loops of the measurement sample and the base layer 11 are all measured at 50° C.

(Squareness Ratio S1 Measured in Longitudinal Direction)

The squareness ratio S1 measured in the longitudinal direction (running direction) of the magnetic recording medium 10 is preferably 35% or less, more preferably 27% or less, and still more preferably 20% or less. When the squareness ratio S1 is 35% or less, vertical alignment of the magnetic powder is sufficiently high, and therefore, a better SNR can be obtained. Therefore, better electromagnetic conversion characteristic can be obtained. Furthermore, a shape of the servo signal is improved, and thus, the control on the drive side may be performed more easily.

In this specification, the perpendicular alignment of the magnetic recording medium may mean that the squareness ratio S1 of the magnetic recording medium is within the above numerical range (for example, 35% or less). The magnetic recording medium according to the embodiment of the present technology is preferably perpendicularly aligned.

The squareness ratio S1 is obtained as follows. First, a measurement sample is cut out from a long-shaped magnetic recording medium 10, and an M-H loop of the entire measurement sample corresponding to the longitudinal direction (running direction) of the magnetic recording medium 10 is measured using the VSM. Next, the coating film (ground layer 12, magnetic layer 13, etc.) is wiped out using acetone, ethanol, or the like, to leave only the base layer 11 for background correction, and the M-H loop of the base layer 11 corresponding to the longitudinal direction of the base layer 11 (running direction of the magnetic recording medium 10) is measured using the VSM. Thereafter, the M-H loop of the base layer 11 is subtracted from the M-H loop of the entire measurement sample to obtain an M-H loop after background correction. The squareness ratio S1(%) is calculated by substituting a saturation magnetization Ms(emu) and residual magnetization Mr(emu) of the obtained M-H loop into the following equation. Note that it is assumed that the measurement of the M-H loop is entirely performed at 25° C.

Squareness ratio $S1(\%)=(Mr/Ms) \times 100$ (Squareness Ratio S2 Measured in Vertical Direction)

The squareness ratio S2 measured in the vertical direction (thickness direction) of the magnetic recording medium 10 is preferably 65% or more, more preferably 73% or more, and still more preferably 80% or more. When the squareness ratio S2 is 65% or more, vertical alignment of the magnetic powder is sufficiently high, and thus, a better SNR can be obtained. Therefore, better electromagnetic conversion characteristic can be obtained. Furthermore, a servo signal shape is improved, making it easier to control a drive side.

In this specification, the perpendicular alignment of the magnetic recording medium may mean that the squareness ratio S2 of the magnetic recording medium is within the above numerical range (for example, 65% or more).

The squareness ratio S2 is obtained in a similar manner to the squareness ratio S1 except that the M-H loops are measured in the vertical direction (thickness direction) of the magnetic recording medium 10 and the base layer 11. Note that, in the measurement of the squareness ratio S2, it is assumed that "demagnetizing field correction" when measuring the M-H loop is measured in the vertical direction of the magnetic recording medium 10 is not performed.

The squareness ratios S1 and S2 may be set to a desired value by adjusting, for example, strength of a magnetic field applied to the magnetic layer forming coating material, an application time of the magnetic field to the magnetic layer forming coating material, a dispersion state of the magnetic powder in the magnetic layer forming coating material, and a concentration of the solid content in the magnetic layer forming coating material. Specifically, for example, as the strength of the magnetic field is increased, the squareness ratio S1 is reduced, while the squareness ratio S2 is increased. Furthermore, as the application time of the magnetic field is longer, the squareness ratio S1 is reduced, while the squareness ratio S2 is increased. Furthermore, as the dispersion state of the magnetic powder is improved, the squareness ratio S1 is reduced, while the squareness ratio S2 is increased. Furthermore, as the concentration of the solid content is lowered, the squareness ratio S1 is reduced, while the squareness ratio S2 is increased. Note that the above adjustment method may be used alone or in combination of two or more.

(SFD)

Figure 4:
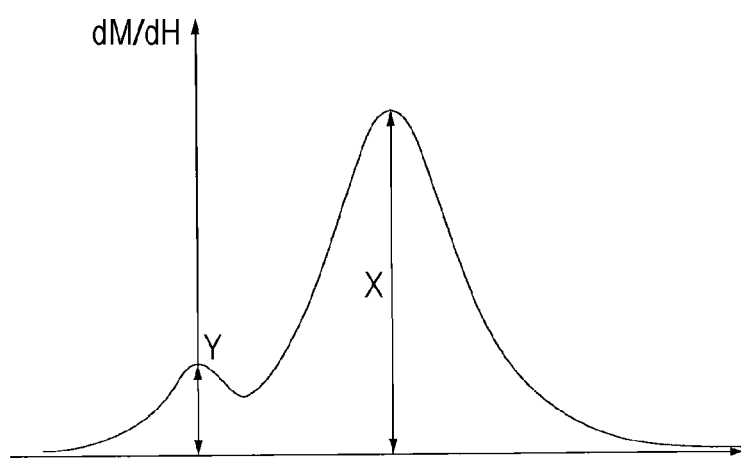
FIG. 4 is a graph showing an example of an SFD curve.

In a switching field distribution (SFD) curve of the magnetic recording medium 10, a peak ratio X/Y of a main peak height X and a height Y of a sub peak in the vicinity of magnetic field zero is preferably 3.0 or more, more preferably 5.0 or more, still more preferably 7.0 or more, particularly preferably 10.0 or more, and most preferably 20.0 or more (see FIG. 4). When the peak ratio X/Y is 3.0 or more, it is possible to suppress inclusion of a large amount of coercive force component (for example, soft magnetic particles, superparamagnetic particles, etc.) unique to ε iron oxide other than the ε iron oxide particles contributing to actual recording in the magnetic powder. Therefore, deterioration of magnetization signals recorded on the adjacent tracks due to a leakage magnetic field from the recording head is suppressed, and thus, a better SNR can be obtained. An upper limit value of the peak ratio X/Y is not particularly limited, but is, for example, 100 or less.

The peak ratio X/Y is obtained as follows. First, an M-H loop after background correction is obtained in a manner similar to the method of measuring the coercive force Hc described above. Next, an SFD curve is calculated from the obtained M-H loop. The calculation of the SFD curve may be performed by using a program attached to the measurement device, or by using other programs. Assuming that an absolute value of a point at which the calculated SFD curve traverses the Y axis (dM/dH) is "Y" and a height of the main peak seen in the vicinity of the coercive force Hc in the M-H loop is "X", a peak ratio X/Y is calculated. Note that the measurement of the M-H loop is performed at 25° C. in a manner similar to the method of measuring the coercive force Hc described above. Furthermore, it is also assumed that "demagnetizing field correction" when the M-H loop is measured in the thickness direction (vertical direction) of the magnetic recording medium 10 is not performed.

(Activation Volume $V_{act}$)

The activation volume $V_{act}$ is preferably 8000 nm$^3$ or less, more preferably 6000 nm$^3$ or less, still more preferably 5000 nm$^3$ or less, particularly preferably 4000 nm$^3$ or less, and most preferably 3000 nm3 or less. When the activation volume $V_{act}$ is 8000 nm$^3$ or less, the dispersion state of the magnetic powder is improved, and thus, a bit reversal region can be made steep and a degradation of the magnetization signal recorded on the adjacent track due to a leakage magnetic field from the recording head may be suppressed. Therefore, there is a possibility that a better SNR may not be obtained.

The activation volume $V_{act}$ is obtained by the following equation derived by Street&Woolley.

$$V_{act} (\text{nm}^3) = k_B \times T \times X_{irr}/(\mu_0 \times Ms \times S)$$

(where, kB: Boltzmann constant ($1.38 \times 10^{-23}$ J/K), T: temperature (K), $X_{irr}$:
irreversible magnetic susceptibility, $\mu_0$: permeability of vacuum, S: magnetic viscosity coefficient, Ms: saturation magnetization (emu/cm3))

The irreversible magnetic susceptibility $X_{irr}$, the saturation magnetization Ms and the magnetic viscosity coefficient S substituted in the above equation are obtained as follows using the VSM. Note that the measurement direction by the VSM is the thickness direction (vertical direction) of the magnetic recording medium 10. Furthermore, it is assumed that the measurement by the VSM is performed at 25° C. for the measurement sample cut out from the long-shaped magnetic recording medium 10. Furthermore, it is also assumed that "demagnetizing field correction" when the M-H loop is measured in the thickness direction (vertical direction) of the magnetic recording medium 10 is not performed.

(Irreversible Magnetic Susceptibility $X_{irr}$)

The irreversible magnetic susceptibility $X_{irr}$ is defined as an inclination in the vicinity of the residual coercive force Hr in the inclination of the residual magnetization curve (DCD curve). First, a magnetic field of −1193 kA/m (15 kOe) is applied to the entire magnetic recording medium 10, and the magnetic field is returned to zero to enter a residual magnetization state. Thereafter, a magnetic field of about 15.9 kA/m (200 Oe) is applied in the opposite direction, and the magnetic field is returned again to zero and a residual magnetization amount is measured. Thereafter, similarly, a measurement of applying a magnetic field 15.9 kA/m larger than the immediately previously applied magnetic field and returning the magnetic field to zero is repeatedly performed, and a DCD curve is measured by plotting a residual magnetization amount against the applied magnetic field. From the obtained DCD curve, the point at which the magnetization amount is zero is set as the residual coercive force Hr, and an inclination of the DCD curve in each magnetic field is obtained by differentiating the DCD curve again. In the inclination of the DCD curve, the inclination near the residual coercive force Hr is $X_{irr}$.

(Saturation Magnetization Ms)

First, an M-H loop of the entire magnetic recording medium 10 (measurement sample) is measured in the thickness direction of the magnetic recording medium 10. Next, the coating film (ground layer 12, magnetic layer 13, etc.) is wiped out using acetone, ethanol, or the like, to leave only the base layer 11 for background correction, and the M-H loop of the base layer 11 is measured in the thickness direction of the base layer 11 similarly. Thereafter, the M-H loop of the base layer 11 is subtracted from the M-H loops of the entire magnetic recording medium 10 to obtain an M-H loop after background correction. Ms (emu/cm³) is calculated from the value of the saturation magnetization Ms (emu) of the obtained M-H loop and the volume (cm³) of the magnetic layer 13 in the measurement sample. Note that the volume of the magnetic layer 13 is obtained by multiplying the area of the measurement sample by the average thickness of the magnetic layer 13. A method of calculating the average thickness of the magnetic layer 13 necessary for calculating the volume of the magnetic layer 13 will be described later.

(Magnetic Viscosity Coefficient S)

First, a magnetic field of −1193 kA/m (15 kOe) is applied to the entire magnetic recording medium 10 (measurement sample), and the magnetic field is returned to zero to enter a residual magnetization state. Thereafter, in the opposite direction, a magnetic field equivalent to the value of the residual coercive force Hr obtained from the DCD curve is applied. With the magnetic field applied, the magnetization amount is continuously measured at constant time intervals for 1000 seconds. A relationship between the time t and the magnetization amount M(t) thusly obtained is compared with the following equation to calculate the magnetic viscosity coefficient S.

$$M(t) = M0 + S \times \ln(t)$$

(where M(t): magnetization amount at time t, M0: initial magnetization amount, S: magnetic viscosity coefficient, ln(t): natural logarithm of time)

(Arithmetic Mean Roughness Ra)

The arithmetic mean roughness Ra of the magnetic surface is preferably 2.5 nm or less, and more preferably 2.0 nm or less. When Ra is 2.5 nm or less, a better SNR can be obtained.

The arithmetic mean roughness Ra is obtained as follows. First, the surface of the side on which the magnetic layer 13 is provided is observed using an atomic force microscope (AFM) (Dimension Icon manufactured by Bruker Corporation) to obtain a cross-sectional profile. Next, the arithmetic mean roughness Ra is obtained from the obtained cross-sectional profile in accordance with JIS B0601: 2001.

(4) Method of Manufacturing Magnetic Recording Medium

Next, a method of manufacturing the magnetic recording medium 10 having the above-described configuration will be described. First, a ground layer-forming coating material is prepared by kneading and/or dispersing a non-magnetic powder, a binder, or the like, in a solvent. Next, the magnetic layer-forming coating material is prepared by kneading and/or dispersing the magnetic powder and the binder in a solvent. For the preparation of the magnetic layer-forming coating material and the ground layer-forming coating material, for example, the following solvents, a dispersing device and a kneading device may be used.

Examples of the solvents used for preparing the above-described coating material include ketone solvents such as acetone, methyl ethyl ketone, methyl isobutyl ketone, cyclohexanone, and the like; alcohol solvents such as methanol, ethanol and propanol; ester solvents such as methyl acetate, ethyl acetate, butyl acetate, propyl acetate, ethyl lactate, ethylene glycol acetate, and the like; ether solvents such as diethylene glycol dimethyl ether, 2-ethoxyethanol, tetrahydrofuran, dioxane, and the like; aromatic hydrocarbon solvents such as benzene, toluene and xylene; and halogenated hydrocarbon solvents such as methylene chloride, ethylene chloride, carbon tetrachloride, chloroform, chlorobenzene, and the like. One of these may be used, or a mixture of two or more thereof may be used.

As the kneading device used in the preparation of the coating material preparation described above, for example, a kneading device such as a continuous biaxial kneader, a continuous biaxial kneader capable of diluting in multiple steps, a kneader, a press kneader, and a roll kneader may be used but the present technology is not particularly limited thereto. Furthermore, examples of the dispersing device used in the preparation of the coating material preparation described above include roll mills, ball mills, horizontal sand mills, vertical sand mills, spike mills, pin mills, tower mills, pearl mills (for example, DCP Mill, manufactured by Nippon Eirich Co., Ltd., etc.), a homogenizer, an ultrasonic dispersing device, or the like, may be used, but the present technology is not particularly limited thereto.

Next, the ground layer-forming coating material is applied to one main surface of the base layer 11 and dried to form the ground layer 12. Subsequently, the magnetic layer-forming coating material is applied to the ground layer 12 and dried to form the magnetic layer 13 on the ground layer 12. Note that, at the time of drying, magnetic powder is magnetically aligned in the thickness direction of the base layer 11 by, for example, a solenoid coil. Furthermore, at the time of drying, for example, the magnetic powder may be magnetically aligned in the longitudinal direction (running direction) of the base layer 11 and then magnetically aligned in the thickness direction of the base layer 11 by a solenoid coil. After the formation of the magnetic layer 13, the back layer 14 is formed on the other main surface of the base layer 11. Accordingly, the magnetic recording medium 10 is obtained.

Thereafter, the obtained magnetic recording medium 10 is wound around a large-diameter core again and a curing treatment is performed thereon. Finally, calendering is performed on the magnetic recording medium 10, and thereafter, the magnetic recording medium 10 is cut into a predetermined width (for example, ½ inch width). As a result, a magnetic recording medium 10 of a desired long shape may be obtained.

(5) Recording and Reproducing Apparatus

[Configuration of Recording and Reproducing Apparatus]

Next, an example of a configuration of a recording and reproducing apparatus 30 that performs recording and reproducing of the magnetic recording medium 10 accommodated in the magnetic recording cartridge 1 having the above-described configuration will be described with reference to FIG. 5.

The recording and reproducing apparatus 30 has a configuration capable of adjusting tension applied in the longitudinal direction of the magnetic recording medium 10. Furthermore, the recording and reproducing apparatus 30 has a configuration allowing the magnetic recording cartridge 1 to be loaded therein. Here, in order to facilitate the description, a case where the recording and reproducing apparatus 30 has a configuration allowing one magnetic recording cartridge 1 to be loaded therein will be described, but the recording and reproducing apparatus 30 may be configured so that a plurality of magnetic recording cartridges 1 may be loaded therein.

The recording and reproducing apparatus 30 is preferably a timing servo type magnetic recording and reproducing apparatus. The magnetic recording medium according to the embodiment of the present technology is suitable for use in a timing servo type magnetic recording and reproducing apparatus.

The recording and reproducing apparatus 30 is connected to an information processing device such as a server 41 and a personal computer (hereinafter referred to as "PC") 42 via a network 43, and is configured to record data supplied from these information processing devices in the magnetic recording medium 10 in the magnetic recording cartridge 1. The shortest recording wavelength of the recording and reproducing apparatus 30 is preferably 100 nm or less, more preferably 75 nm or less, still more preferably 60 nm or less, and particularly preferably 50 nm or less.

Figure 5:
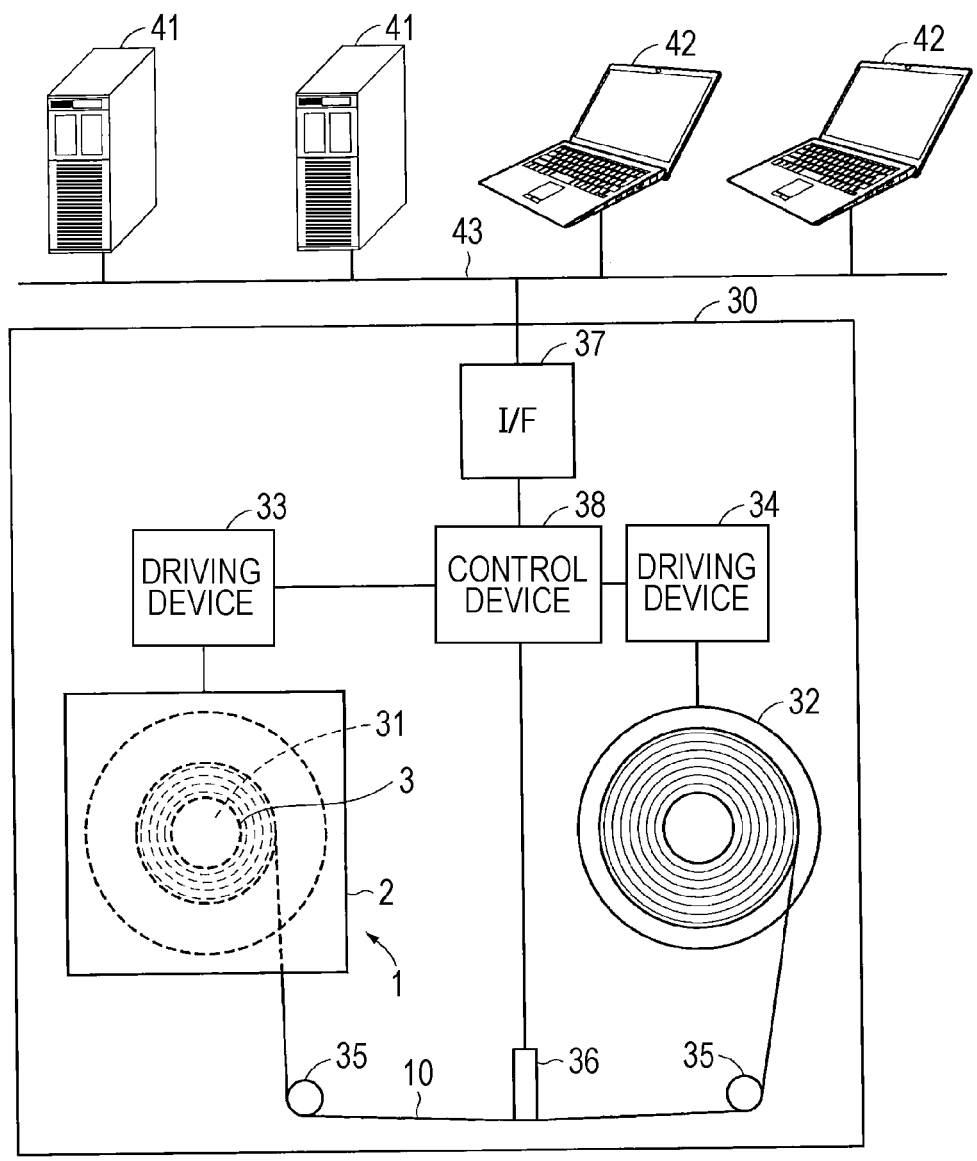
FIG. 5 is a schematic view showing a configuration of a recording and reproducing apparatus.

As illustrated in FIG. 5, the recording and reproducing apparatus includes a spindle 31, a reel 32 on the recording and reproducing apparatus side, a spindle driving device 33, a reel driving device 34, a plurality of guide rollers 35, a head unit 36, a communication interface (I/F) 37, and a control device 38.

The spindle 31 is configured to mount the magnetic recording cartridge 1. The magnetic recording cartridge 1 is compliant with the linear tape open (LTO) standard and accommodates a single reel 3, around which the magnetic recording medium 10 is wound, mounted in the cartridge case 2. In the magnetic recording medium 10, an inverted V-shaped servo pattern is recorded in advance as a servo signal. The reel 32 is configured to fix a leading end of the magnetic recording medium 10 drawn out from the magnetic recording cartridge 1.

The spindle driving device 33 is a device for rotationally driving the spindle 31. The reel driving device 34 is a device for rotationally driving the reel 32. When data is recorded to or reproduced from the magnetic recording medium 10, the spindle driving device 33 and the reel driving device 34 rotationally drive the spindle 31 and the reel 32 to cause the magnetic recording medium 10 to run. The guide roller 35 is a roller for guiding running of the magnetic recording medium 10.

The head unit 36 includes a plurality of recording heads for recording data signals to the magnetic recording medium 10, a plurality of reproducing heads for reproducing the data signals recorded on the magnetic recording medium 10, and a plurality of servo heads for reproducing a servo signal recorded on the magnetic recording medium 10. As the recording head, for example, a ring type head may be used, but the type of the recording head is not limited thereto.

The communication I/F 37 is for communicating with the information processing device such as the server 41 and the PC 42, and is connected to the network 43.

The control device 38 controls the entire recording and reproducing apparatus 30. For example, the control device 38 records the data signal supplied from the information processing device such as the server 41 or the PC 42 to the magnetic recording medium 10 by the head unit 36 in response to a request from the information processing device. Furthermore, the control device 38 reproduces the data signal recorded on the magnetic recording medium 10 by the head unit 36 and supplies the reproduced data signal to the information processing apparatus, in response to the request from the information processing apparatus such as the server 41 and the PC 42.

Furthermore, the control device 38 detects a change in width of the magnetic recording medium 10 on the basis of the servo signal supplied from the head unit 36. More specifically, the magnetic recording medium 10 has a plurality of inverted V-shaped servo patterns recorded as servo signals thereon and the head unit 36 simultaneously reproduces two different servo patterns by the two servo heads on the head unit 36 and obtain each servo signal. A position of the head unit 36 is controlled to follow the servo pattern using the servo pattern and relative position information of the head unit obtained from this servo signal. At the same time, distance information between the servo patterns may be obtained by comparing the two servo signal waveforms. By comparing the distance information between the servo patterns obtained at the time of each measurement, a change in distance between the servo patterns at the time of each measurement may be obtained. By adding the distance information between the servo patterns at the time of servo pattern recording, a change in the width of the magnetic recording medium 10 may also be calculated. The control device 38 adjusts tension in a longitudinal direction of the magnetic recording medium 10 so that the width of the magnetic recording medium 10 is a defined width or a substantially defined width by controlling rotation driving of the spindle driving device 33 and the reel driving device 34 on the basis of the change in the distance between the servo patterns obtained as described above or the calculated width of the magnetic recording medium 10. Accordingly, a change in the width of the magnetic recording medium 10 may be suppressed.

[Operation of Recording and Reproducing Apparatus]

Next, the operation of the recording and reproducing apparatus 30 having the above-described configuration will be described.

First, the magnetic recording cartridge 1 is attached to the recording and reproducing apparatus 30, a leading end of the magnetic recording medium 10 is drawn out and transferred to the reel 32 through the plurality of guide rollers 35 and the head unit 36, and the leading end of the magnetic recording medium 10 is installed on the reel 32.

Next, when an operation unit (not shown) is operated, the spindle driving device 33 and the reel driving device 34 are driven under the control of the control device 38, and the spindle 31 and the reel 32 are rotated in the same direction so that the magnetic recording medium 10 runs from the reel 3 toward the reel 32. As a result, while the magnetic recording medium 10 is being wound around the reel 32, information is recorded on the magnetic recording medium 10 or information recorded on the magnetic recording medium 10 is reproduced by the head unit 36.

Furthermore, in a case where the magnetic recording medium 10 is rewound around the reel 3, the spindle 31 and the reel 32 are rotationally driven in a direction opposite to the above direction such that the magnetic recording medium 10 runs from the reel 32 to the reel 3. Also, at the time of rewinding, the information is recorded on the magnetic recording medium 10 or the information recorded on the magnetic recording medium 10 is reproduced by the head unit 36.

(6) Effect

The magnetic recording medium 10 included in the magnetic recording cartridge according to the first embodiment has an average thickness $t_T$ of $t_T \leq 5.6$ μm and a dimensional change amount Δw of 660 ppm/N≤Δw in a width direction of the magnetic recording medium 10 with respect to a change in tension in the longitudinal direction of the magnetic recording medium 10, and a squareness ratio of 65% or more in a vertical direction. As a result, a recording capacity per cartridge is high, and a change in the width of the magnetic recording medium 10 may be suppressed by adjusting tension in the longitudinal direction of the magnetic recording medium 10 by the recording and reproducing apparatus.

Moreover, the magnetic recording medium 10 is accommodated in a state of being wound around a reel and (servo track width on inner side of winding of magnetic recording medium)−(servo track width on outer side of winding of magnetic recording medium)>0 is satisfied. As a result, the occurrence of wrinkles on the inner side of winding in the cartridge may be suppressed.

As described above, the magnetic recording cartridge according to the first embodiment has high recording capacity per cartridge, is suitable for use in a recording and reproducing apparatus which adjusts tension in the longitudinal direction of the magnetic recording medium, and suppresses the occurrence of wrinkles that may occur with the tension adjustment.

(7) Modification

Modification 1

Figure 7:
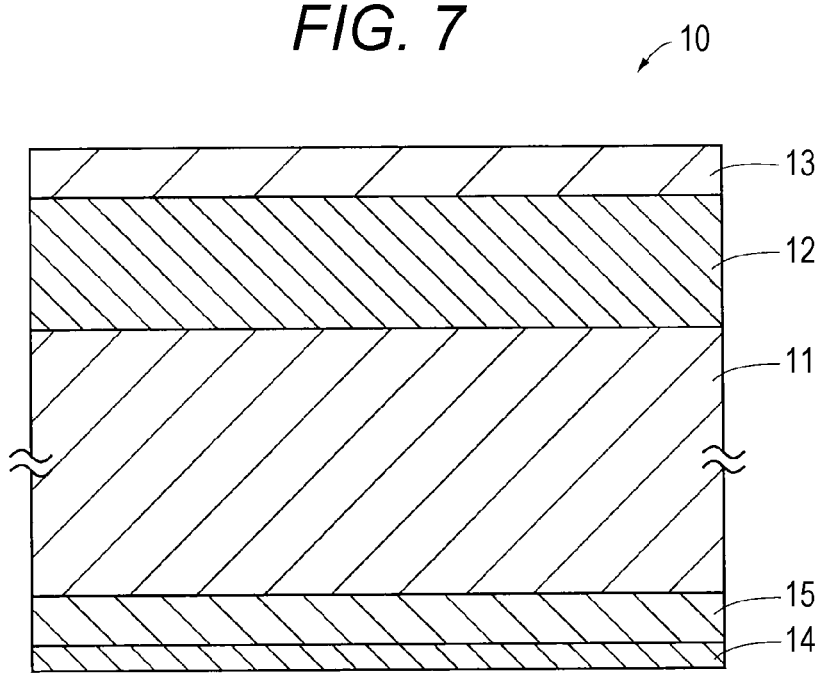
FIG. 7 is a cross-sectional view showing a configuration of a magnetic recording medium in a modification.

The magnetic recording medium 10 may further include a barrier layer 15 provided on at least one surface of the base layer 11 as shown in FIG. 7. The barrier layer 15 is a layer for suppressing a dimensional change in the base layer 11 depending on the environment. For example, moisture absorbency of the base layer 11 is an example of a cause of the dimensional change, and a penetration speed of moisture into the base layer 11 may be reduced by the barrier layer 15. The barrier layer 15 includes a metal or a metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta may be used. As the metal oxide, for example, at least one of $Al_2O_3$, CuO, CoO, $SiO_2$, $Cr_2O_3$, $TiO_2$, $Ta_2O_5$ or $ZrO_2$ may be used, and any of the oxides of the above metals may also be used. Furthermore, diamond-like carbon (DLC), diamond, and the like may also be used.

An average thickness of the barrier layer 15 is preferably 20 nm to 1000 nm, and more preferably 50 nm to 1000 nm. The average thickness of the barrier layer 15 is obtained in a manner similar to the average thickness $t_m$ of the magnetic layer 13. However, a magnification of the TEM image is appropriately adjusted according to thicknesses of the barrier layer 15.

Modification 2

The magnetic recording medium 10 may be incorporated in a library apparatus. In other words, the present technology also provides a library apparatus including at least one magnetic recording medium 10. The library apparatus has a configuration capable of adjusting tension applied in the longitudinal direction of the magnetic recording medium 10, and may include a plurality of the recording and reproducing apparatuses 30 described above.

Modification 3

The magnetic recording medium 10 may be attached to servo signal write processing by a servo writer. The servo writer may adjust tension in the longitudinal direction of the magnetic recording medium 10 when recording a servo signal or the like, thereby keeping the width of the magnetic recording medium 10 constant or substantially constant. In this case, the servo writer may have a detection device for detecting the width of the magnetic recording medium 10. The servo writer may adjust the tension in the longitudinal direction of the magnetic recording medium 10 on the basis of a detection result from the detection device.

3. SECOND EMBODIMENT (EXAMPLE OF MAGNETIC RECORDING CARTRIDGE INCLUDING VACUUM THIN FILM TYPE MAGNETIC RECORDING MEDIUM)

(1) Configuration of Magnetic Recording Cartridge

The magnetic recording cartridge of the present embodiment is the same as the magnetic recording cartridge 1 described in "(1) Configuration of magnetic cartridge" of 2.

except that a vacuum thin-film type magnetic recording medium 110 is used instead of the coating type magnetic recording medium 10. Hereinafter, the vacuum thin-film type magnetic recording medium 110 will be described.

Figure 8:
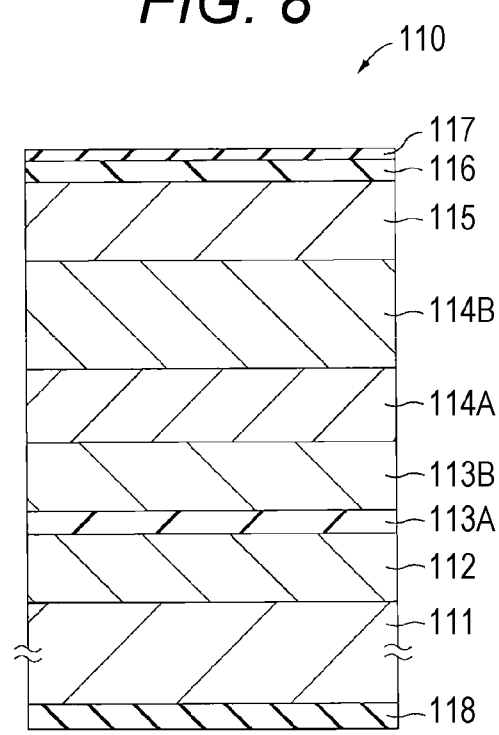
FIG. 8 is a cross-sectional view showing another example of a configuration of a magnetic recording medium included in a magnetic recording cartridge according to an embodiment of the present technology.

The magnetic recording medium 110 is a long, vertical magnetic recording medium and includes a film type base layer 111, a soft magnetic underlayer 112 (hereinafter referred to as SUL), a first seed layer 113A, a second seed layer 113B, a first ground layer 114A, a second ground layer 114B, and a magnetic layer 115 as illustrated in FIG. 8. The SUL 112, the first and second seed layers 113A and 113B, first and second ground layers 114A and 114B, and the magnetic layer 115 may be, for example, vacuum thin films such as layers formed by sputtering (hereinafter also referred to as "sputtered layer"), or the like.

The SUL 112, the first and second seed layers 113A and 113B, and the first and second ground layer 114A and 114B are provided between one main surface of the base layer 111 (hereinafter referred to as "surface") and the magnetic layer 115, and the SUL 112, the first seed layer 113A, the second seed layer 113B, the first ground layer 114A, and the second ground layer 114B are stacked in this order from the base layer 111 toward the magnetic layer 115.

The magnetic recording medium 110 may further include a protective layer 116 provided on the magnetic layer 115 and a lubricating layer 117 provided on the protective layer 116 as necessary. Furthermore, the magnetic recording medium 110 may further include a back layer 118 provided on the other main surface (hereinafter referred to as "back surface") of the base layer 111 as necessary.

Hereinafter, the longitudinal direction of the magnetic recording medium 110 (longitudinal direction of the base layer 111) is referred to as a machine direction (MD). Here, the machine direction refers to a relative movement direction of a recording and reproducing head with respect to the magnetic recording medium 110, that is, the direction in which the magnetic recording medium 110 runs at the time of recording and reproduction.

The magnetic recording medium 110 is preferably used as a storage medium for a data archive, which is expected to increase in demand in the future. This magnetic recording medium 110 may realize a surface recording density of 10 times or more, that is, a surface recording density of 50 Gb/in$^2$ or more, for example, of the current coating type magnetic recording medium for storage. In a case where a general linear recording type data cartridge is configured using the magnetic recording medium 110 having such a surface recording density, a large capacity recording of 100 TB or more per data cartridge may be realized.

The magnetic recording medium 110 is preferably used in a recording and reproducing apparatus (recording and reproducing apparatus for recording and reproducing data) having a ring-type recording head and a giant magnetoresistive (GMR) type reproducing head or a tunneling magnetoresistive (TMR) type reproducing head. Furthermore, it is preferable that the magnetic recording medium 110 according to the second embodiment uses a ring-type recording head as the servo signal write head. In the magnetic layer 115, for example, a data signal is vertically recorded by a ring-type recording head. Furthermore, in the magnetic layer 115, for example, a servo signal is vertically recorded by the ring-type recording head.

(2) Description of Each Layer (Base Layer)
The description regarding the base layer 11 in the first embodiment is applied to the base layer 111, and a description regarding the base layer 111 is thus omitted.

(SUL)
The SUL 112 contains a soft magnetic material in an amorphous state. The soft magnetic material includes, for example, at least one of a Co-based material or an Fe-based material. The Co-based material includes, for example, CoZrNb, CoZrTa, or CoZrTaNb. The Fe-based material includes, for example, FeCoB, FeCoZr, or FeCoTa.

The SUL 112 is a single-layer SUL, and is provided directly on the base layer 111. An average thickness of the SUL 112 is preferably 10 nm or more to 50 nm or less, and more preferably 20 nm or more and 30 nm or less.

The average thickness of the SUL 112 is obtained by the same method as the method of measuring the average thickness of the magnetic layer 13 in the first embodiment. Note that average thicknesses of layers other than the SUL 112, as described later (in other words, average thicknesses of first and second seed layers 113A and 113B, first and second ground layers 114A and 114B, and a magnetic layer 115) are also obtained by the same method as the method of measuring the average thickness of the magnetic layer 13 in the first embodiment. However, a magnification of a TEM image is appropriately adjusted according to the thickness of each layer.

(First and Second Seed Layers)
The first seed layer 113A contains an alloy containing Ti and Cr, and has an amorphous state. Furthermore, this alloy may further contain O (oxygen). The oxygen may be impurity oxygen contained in a small amount in the first seed layer 113A when the first seed layer 113A is formed by a film forming method such as a sputtering method or the like.

Here, the "alloy" means at least one of a solid solution, a eutectic material, an intermetallic compound, or the like, containing Ti and Cr. The "amorphous state" means a state in which a halo is observed by X-ray diffraction, electron beam diffraction method or the like, and a crystal structure may not be specified.

An atomic ratio of Ti to a total amount of Ti and Cr contained in the first seed layer 113A is preferably 30 atomic % or more and less than 100 atomic %, and more preferably 50 atomic % or more and less than 100 atomic %. When the atomic ratio of Ti is less than 30 atomic %, a (100) plane of a body-centered cubic lattice (bcc) structure of Cr is aligned, so that there is a possibility that alignment of the first and second ground layers 114A and 114B formed on the first seed layer 113A will be reduced.

The atomic ratio of Ti is obtained as follows. Depth direction analysis (depth profile measurement) of the first seed layer 113A by auger electron spectroscopy (hereinafter referred to as "AES") is performed while ion-milling the magnetic recording medium 110 from the magnetic layer 115 side. Next, an average composition (average atomic ratio) of Ti and Cr in the film thickness direction is obtained from the obtained depth profile. Next, the atomic ratio of Ti is obtained using the obtained average composition of Ti and Cr.

In a case where the first seed layer 113A contains Ti, Cr and O, an atomic ratio of O to a total amount of Ti, Cr and O contained in the first seed layer 113A is preferably 15 atomic % or less, and more preferably Is 10 atomic % or less. In a case where the atomic ratio of O exceeds 15 atomic %, TiO$_2$ crystals are formed, which affects nucleation of the first and second ground layers 114A and 114B formed on the first seed layer 113A, so that there is a possibility that the alignment of the first and second ground layers 114A and 114B will be reduced. The atomic ratio of O is obtained using a method similar to a method of analyzing the atomic ratio of Ti.

The alloy contained in the first seed layer 113A may further contain an element other than Ti and Cr as an additional element. This additional element may be, for example, one or more elements selected from the group including Nb, Ni, Mo, Al, and W.

The average thickness of the first seed layer 113A is preferably 2 nm to 15 nm, and more preferably 3 nm to 10 m.

The second seed layer 113B contains, for example, NiW or Ta, and has a crystalline state. The average thickness of the second seed layer 113B is preferably 3 nm to 20 nm, and more preferably 5 nm to 15 nm.

The first and second seed layers 113A and 113B have a crystal structure similar to that of the first and second ground layers 114A and 114B, and are not seed layers provided for the purpose of crystal growth, but are seed layers improving vertical alignment of the first and second ground layers 114A and 114B by amorphous states of the first and second seed layers 113A and 113B.

(First and Second Ground Layers)

It is preferable that the first and second ground layers 114A and 114B have a crystal structure similar as that of the magnetic layer 115. In a case where the magnetic layer 115 contains a Co-based alloy, it is preferable that the first and second ground layers 114A and 114B contain a material having a hexagonal closest-packed (hcp) structure similar to that of the Co-based alloy and a c axis of the hcp structure is aligned in a direction (that is, film thickness direction) perpendicular to a film surface. The reason is because the alignment of the magnetic layer 115 can be improved and matching in a lattice constant between the second ground layer 114B and the magnetic layer 115 can be made relatively good. As the material having the hexagonal closest-packed (hcp) structure, it is preferable to use a material containing Ru, and specifically, it is preferable to use Ru alone or use a Ru alloy. Examples of the Ru alloy can include Ru alloy oxides such as Ru—$SiO_2$, Ru—$TiO_2$, Ru—$ZrO_2$, and the like, and the Ru alloy may be any one of Ru—$SiO_2$, Ru—$TiO_2$, and Ru—$ZrO_2$.

As described above, similar materials can be used as the materials of the first and second ground layers 114A and 114B. However, intended effects of each of the first and second ground layers 114A and 114B are different from each other. Specifically, the second ground layer 114B has a film structure promoting a granular structure of the magnetic layer 115 which is an upper layer of the second ground layer 114B, and the first ground layer 114A has a film structure with a high crystal alignment. In order to obtain such a film structure, it is preferable that film forming conditions such as sputtering conditions or the like of each of the first and second ground layers 114A and 114B are made to be different from each other.

The average thickness of the first ground layer 114A is preferably 3 nm to 15 nm or less, and more preferably 5 nm to 10 nm. The average thickness of the second ground layer 114B is preferably 7 nm to 40 nm, and more preferably 10 nm to 25 nm.

(Magnetic Layer)

The magnetic layer (also referred to as a recording layer) 115 may be a vertical magnetic recording layer in which a magnetic material is vertically aligned. It is preferable that the magnetic layer 115 is a granular magnetic layer containing a Co-based alloy, in terms of improvement of a recording density. The granular magnetic layer contains ferromagnetic crystal particles containing the Co-based alloy and nonmagnetic grain boundaries (nonmagnetic material) surrounding the ferromagnetic crystal particles. More specifically, the granular magnetic layer contains columns (columnar crystal) containing a Co-based alloy and nonmagnetic grain boundaries (for example, oxides such as $SiO_2$) surrounding the columns and magnetically separating the respective columns from each other. In this structure, the magnetic layer 115 having a structure in which the respective columns are magnetically separated from each other may be configured.

The Co-based alloy has a hexagonal closest-packed (hcp) structure, and a c-axis of the hcp structure is aligned in the direction (film thickness direction) perpendicular to the film surface. As the Co-based alloy, it is preferable to use a CoCrPt-based alloy containing at least Co, Cr, and Pt. The CoCrPt-based alloy may further contain an additive element. Examples of the additive element can include one or more elements selected from the group including Ni and Ta.

The nonmagnetic grain boundaries surrounding the ferromagnetic crystal grains contain a nonmagnetic metallic material. Here, the metal includes a metalloid. As the nonmagnetic metal material, for example, at least one of a metal oxide or a metal nitride can be used, and it is preferable to use the metal oxide, in terms of more stable maintenance of the granular structure. Examples of the metal oxide can include metal oxides containing one or more elements selected from the group including Si, Cr, Co, Al, Ti, Ta, Zr, Ce, Y, Hf, and the like, and the metal oxide is preferably a metal oxide including at least Si oxide (that is, $SiO_2$). Specific examples of the metal oxide can include $SiO_2$, $Cr_2O_3$, CoO, $Al_2O_3$, $TiO_2$, $Ta_2O_5$, $ZrO_2$, $HfO_2$, and the like. Examples of the metal nitride can include metal nitrides containing one or more elements selected from the group including Si, Cr, Co, Al, Ti, Ta, Zr, Ce, Y, Hf, and the like. Specific examples of the metal nitride can include SiN, TiN, AlN, and the like.

It is preferable that the CoCrPt-based alloy contained in the ferromagnetic crystal particle and the Si oxide contained in the nonmagnetic grain boundary have an average composition represented in the following Formula (1). The reason is because a saturation magnetization amount Ms in which an influence of a demagnetizing field can be suppressed and a sufficient reproduction output can be obtained can be realized, resulting in further improvement of recording and reproduction characteristics.

$$(Co_xPt_yCr_{100-x-y})_{100-z}(SiO_2)_z \quad (1)$$

(where in General Formula (1), x, y, and z are values within ranges in which $69 \leq x \leq 75$, $10 \leq y \leq 16$, and $9 \leq Z \leq 12$ are satisfied, respectively).

Note that the above composition can be obtained as follows. An average composition (average atomic ratio) of Co, Pt, Cr, Si, and O in the film thickness direction is obtained by performing the depth direction analysis on the magnetic layer 115 by the AES while ion-milling the magnetic recording medium 110 from the magnetic layer 115 side.

An average thickness $t_m$ [nm] of the magnetic layer 115 is preferably 9 nm $\leq t_m \leq$ 90 nm, more preferably 9 nm $\leq t_m \leq$ 20 nm, and still more preferably 9 nm $\leq t_m \leq$ 15 nm. The average thickness $t_m$ of the magnetic layer 13 is within the above numerical range, so that electromagnetic conversion characteristics can be improved.

(Protective Layer)

The protective layer 116 contains, for example, a carbon material or silicon dioxide (SiO2), and it is preferable that the protective layer 116 contains a carbon material in view of film strength of the protective layer 116. Examples of the carbon material include graphite, diamond-like carbon (DLC), diamond, or the like.

(Lubricating Layer)

The lubricating layer 117 contains at least one lubricant. The lubricating layer 117 may further contain various additives, for example, a rust inhibitor, as necessary. A lubricant has at least two carboxyl groups and one ester bond, and contains at least one of carboxylic acid-based compounds represented by the following General Formula (1). The lubricant may further contain a lubricant other than the carboxylic acid-based compound represented by the following General Formula (1).

General Formula (1):

[Chemical Formula 1]
$$Rf-Es-R-CH-COOH$$
$$\phantom{Rf-Es-R-}|$$
$$\phantom{Rf-Es-R-}CH_2-COOH$$

(where, Rf is an unsubstituted or substituted saturated or unsaturated fluorine-containing hydrocarbon group or a hydrocarbon group, Es is an ester bond, R may be absent, but is an unsubstituted or substituted saturated or unsaturated hydrocarbon group).

It is preferable that the carboxylic acid-based compound is represented by the following General Formula (2) or (3).

General Formula (2):

[Chemical Formula 2]
$$Rf-\underset{\underset{O}{\|}}{C}-O-CH-COOH$$
$$\phantom{Rf-C-O-}|$$
$$\phantom{Rf-C-O-}CH_2-COOH$$

(where, Rf is an unsubstituted or substituted saturated or unsaturated fluorine-containing hydrocarbon group or a hydrocarbon group).

General Formula (3):

[Chemical Formula 3]
$$Rf-O-\underset{\underset{O}{\|}}{C}-CH_2-CH-COOH$$
$$\phantom{Rf-O-C-CH_2-}|$$
$$\phantom{Rf-O-C-CH_2-}CH_2-COOH$$

(where, Rf is an unsubstituted or substituted saturated or unsaturated fluorine-containing hydrocarbon group or a hydrocarbon group).

It is preferable that the lubricant contains one or both of the carboxylic acid-based compound represented by the above General Formulas (2) and (3).

When the lubricant containing the carboxylic acid-based compound represented by General Formula (1) is coated on the magnetic layer 115, the protective layer 116 or the like, a lubricating action is exhibited by cohesion between the fluorine-containing hydrocarbon groups or the hydrocarbon groups Rf, which are hydrophobic groups. In a case where the Rf group is the fluorine-containing hydrocarbon group, it is preferable that a total carbon number is 6 to 50 and a total carbon number of a fluorinated hydrocarbon group is 4 to 20. The Rf group may be, for example, a saturated or unsaturated straight chain, branched chain, or cyclic hydrocarbon group, but may preferably be a saturated straight chain hydrocarbon group.

For example, in a case where the Rf group is the hydrocarbon group, it is preferable that the Rf group is a group represented by the following General Formula (4).

General Formula (4):

[Chemical Formula 4]
$$CH_3-(CH_2)_l-$$

(where in General Formula (4), l is an integer selected from the range of 8 to 30, and more preferably 12 to 20).

Furthermore, in a case where the Rf group is the fluorine-containing hydrocarbon group, it is preferable that the Rf group is group represented by following General Formula (5).

General Formula (5):

[Chemical Formula 5]
$$CF_3-(CF_2)_n-(CH_2)_m-$$

(where in General Formula (5), m and n are, respectively, integers independently selected from each other within the following ranges: m: 2 to 20, n: 3 to 18, and more preferably m: 4 to 13, n: 3 to 10).

The fluorinated hydrocarbon group may be concentrated at one position in the molecule as described above or may be dispersed as in the following General Formula (6), and may be $-CHF_2$, $-CHF-$, or the like, as well as $-CF_3$ or $-CF_2-$.

General Formula (6):

[Chemical Formula 6]
$$CF_3-(CF_2)_{n1}-(CH_2)_{m1}-(CF_2)_{n2}-(CH_2)_{m2}-$$

(where in General Formulas (5) and (6), n1+n2=n and m1+m2=m).

The reason why the number of carbon atoms in General Formulas (4), (5), and (6) is limited as described above is because when the number (l or the sum of m and n) of carbon atoms constituting an alkyl group or a fluorine-containing alkyl group is equal to or more than the above lower limit, a length becomes an appropriate length, so that the cohesion between the hydrophobic groups is effectively exhibited and friction and wear durability is improved. Furthermore, the reason is because when the number of carbon atoms is equal to or less than the above upper limit, solubility in a solvent of a lubricant including the carboxylic acid-based compound is kept good.

In particular, when the Rf group in General Formulas (1), (2) and (3) contains a fluorine atom, there is an effect in reducing a friction coefficient and improving traveling performance. However, it is preferable to provide a hydrocarbon group between the fluorine-containing hydrocarbon group and the ester bond to separate the fluorine-containing hydrocarbon group and the ester bond from each other, thereby securing stability of the ester bond and preventing hydrolysis.

Furthermore, the Rf group may have a fluoroalkyl ether group or a perfluoropolyether group.

An R group in General Formula (1) may be absent, but in a case where the R group in General Formula (1) is present, it is preferably a hydrocarbon chain having a relatively small number of carbon atoms.

Furthermore, the Rf group or R group contains one element or a plurality of elements selected from the group including nitrogen, oxygen, sulfur, phosphorus, and halogen as constituent elements, and may further have a hydroxyl group, a carboxyl group, and a carbonyl group, an amino group, an ester bond, and the like, in addition to the functional group described above.

It is preferable that the carboxylic acid-based compound represented by General Formula (1) is specifically at least one of the compounds shown below. In other words, it is preferable that the lubricant contains at least one of the compounds shown below.

$CF_3(CF_2)_7(CH_2)_{10}COOCH(COOH)CH_2COOH$
$CF_3(CF_2)_3(CH_2)_{10}COOCH(COOH)CH_2COOH$
$C_{17}H_{35}COOCH(COOH)CH_2COOH$
$CF_3(CF_2)_7(CH_2)_2OCOCH_2CH(C_{18}H_{37})COOCH(COOH)CH_2COOH$
$CF_3(CF_2)_7COOCH(COOH)CH_2COOH$
$CHF_2(CF_2)_7COOCH(COOH)CH_2COOH$
$CF_3(CF_2)_7(CH_2)_2OCOCH_2CH(COOH)CH_2COOH$
$CF_3(CF_2)_7(CH_2)_6OCOCH_2CH(COOH)CH_2COOH$
$CF_3(CF_2)_7(CH_2)_{11}OCOCH_2CH(COOH)CH_2COOH$
$CF_3(CF_2)_3(CH_2)_6OCOCH_2CH(COOH)CH_2COOH$
$C_{18}H_{37}OCOCH_2CH(COOH)CH_2COOH$
$CF_3(CF_2)_7(CH_2)_4COOCH(COOH)CH_2COOH$
$CF_3(CF_2)_3(CH_2)_4COOCH(COOH)CH_2COOH$
$CF_3(CF_2)_3(CH_2)_7COOCH(COOH)CH_2COOH$
$CF_3(CF_2)_9(CH_2)_{10}COOCH(COOH)CH_2COOH$
$CF_3(CF_2)_7(CH_2)_{12}COOCH(COOH)CH_2COOH$
$CF_3(CF_2)_5(CH_2)_{10}COOCH(COOH)CH_2COOH$
$CF_3(CF_2)_7CH(C_9H_{19})CH_2CH=CH(CH_2)_7COOCH(COOH)CH_2COOH$
$CF_3(CF_2)_7CH(C_6H_{13})(CH_2)_7COOCH(COOH)CH_2COOH$
$CH_3(CH_2)_3(CH_2CH_2CH(CH_2CH_2(CF_2)_9CF_3))_2(CH_2)_7COOCH(COOH)CH_2COOH$

The carboxylic acid-based compound represented by the General Formula (1) is soluble in a non-fluorinated solvent having a small load on an environment, and has an advantage that an operation such as coating, immersion, spraying, or the like, can be performed using a general-purpose solvent such as, for example, a hydrocarbon-based solvent, a ketone-based solvent, an alcohol-based solvent, an ester-based solvent, and the like. Specifically, examples of the general-purpose solvent can include hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, cyclohexanone, and the like.

In a case where the protective layer 116 contains a carbon material, when the carboxylic acid-based compound is coated on the protective layer 116 as a lubricant, two carboxyl groups and at least one ester bond group, which are polar group parts of lubricant molecules, can be adsorbed on the protective layer 116 to form a particularly durable lubricating layer 117 by cohesion between hydrophobic groups.

Note that the lubricant is held not only on the surface of the magnetic recording medium 110 as the lubricating layer 117 as described above, but may also be contained and held in layers such as the magnetic layer 115, the protective layer 116 and the like constituting the magnetic recording medium 110.

(Back Layer)

The description regarding the back layer 14 in the first embodiment is applied to the back layer 118.

(3) Physical Properties and Structure

All of the descriptions regarding the physical properties and the structure described in the above (3) of 2. are also applied to the second embodiment. For example, an average thickness $t_T$ of the magnetic recording medium 110, a dimensional change amount Δw, a difference between a servo track width of an inner side of winding and a servo track width of an outer side of winding), a deviation amount of the servo track width, a temperature expansion coefficient α, and a humidity expansion coefficient β, a Poisson's ratio ρ, an elastic limit value $\sigma_{MD}$ in a longitudinal direction, a friction coefficient μ between the magnetic surface and the back surface, and a surface roughness $R_{ab}$ of the back layer 118 may be similar to those in the first embodiment. Therefore, a description of the physical properties and the structure of the magnetic recording medium of the second embodiment is omitted.

(4) Configuration of Sputtering Apparatus

Figure 9:
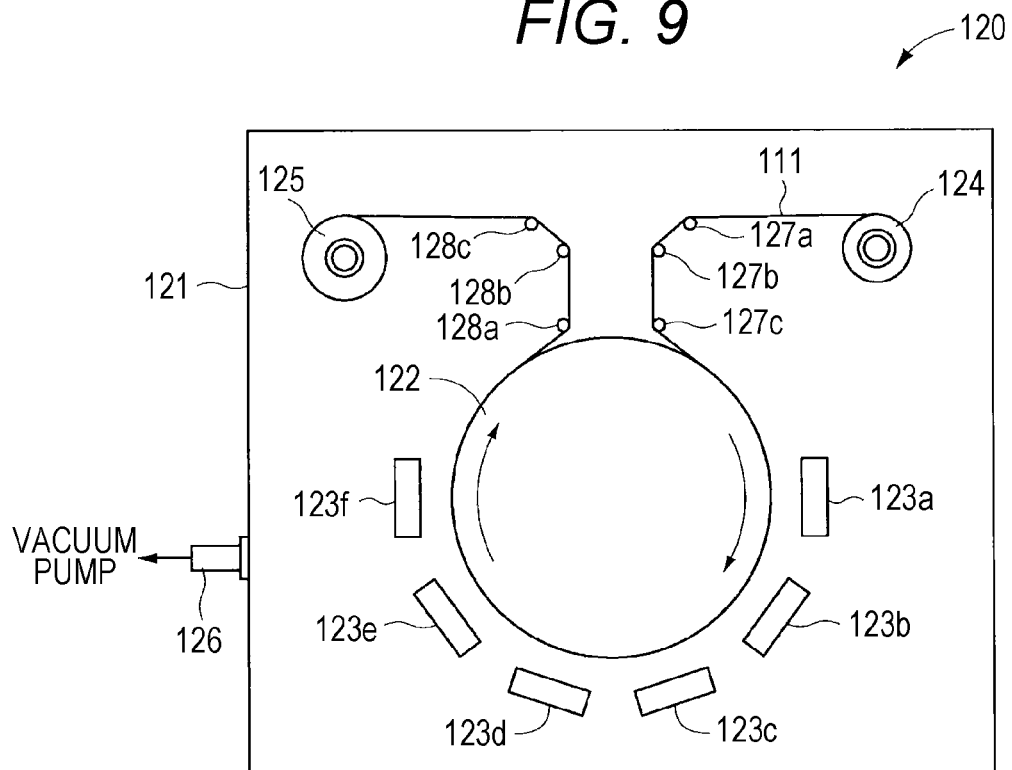
FIG. 9 is a schematic view showing a configuration of a sputtering apparatus.

Hereinafter, an example of a configuration of a sputtering apparatus 120 used for manufacturing the magnetic recording medium 110 will be described with reference to FIG. 9. The sputtering apparatus 120 is a continuous winding type sputtering used for forming the SUL 112, the first seed layer 113A, the second seed layer 113B, the first ground layer 114A, the second ground layer 114B, and the magnetic layer 115, and includes a film forming chamber 121, a drum 122, which is a metal can (rotary body), cathodes 123a to 123f, a supply reel 124, a winding reel 125, and a plurality of guide rollers 127a to 127c and 128a to 128c, as shown in FIG. 9. The sputtering apparatus 120 is, for example, an apparatus using a DC (direct current) magnetron sputtering manner, but the sputtering manner is not limited thereto.

The film forming chamber 121 is connected to a vacuum pump (not shown) through an exhaust port 126, and the atmosphere in the film forming chamber 121 is set to a predetermined degree of vacuum by the vacuum pump. The drum 122 having a rotatable configuration, the supply reel 124, and the winding reel 125 are arranged in the film forming chamber 121. The plurality of guide rollers 127a to 127c for guiding conveyance of the base layer 111 between the supply reel 124 and the drum 122 and the plurality of guide rollers 128a to 128c for guiding conveyance of the base layer 111 between the drum 122 and the winding reel 125 are provided in the film forming chamber 121. At the time of sputtering, the base layer 111 unwound from the supply reel 124 is wound around the winding reel 125 through the guide rollers 127a to 127c, the drum 122, and the guide rollers 128a to 128c. The drum 122 has a cylindrical shape, and the long base layer 111 is conveyed along a circumferential surface of the cylindrical surface of the drum 122. The drum 122 is provided with a cooling mechanism (not shown), and is cooled to, for example, about −20° C. at the time of the sputtering. A plurality of cathodes 123a to 123f is arranged in the film forming chamber 121 so as to face the circumferential surface of the drum 122 Target are set on the cathodes 123a to 123f, respectively. Specifically, targets for forming the SUL 112, the first seed layer 113A, the second seed layer 113B, the first ground layer 114A, the second ground layer 114B, and the magnetic layer 115 are set on the cathodes 123a, 123b, 123c, 123d, 123e, and 123f, respectively. A plurality of types of films, that is, the SUL 112, the first seed layer 113A, the second seed layer 113B, the first ground layer 114A, the second ground layer 114B, and the magnetic layer 115 are simultaneously formed by these cathodes 123a to 123f.

In the sputtering apparatus 120 having the configuration described above, the SUL 112, the first seed layer 113A, the second seed layer 113B, the first ground layer 114A, the second ground layer 114B, and the magnetic layer 115 are continuously formed by a RolltoRoll method.

(5) Method of Manufacturing Magnetic Recording Medium

The magnetic recording medium 110 can be manufactured, for example, as follows.

First, the SUL 112, the first seed layer 113A, the second seed layer 113B, the first ground layer 114A, the second ground layer 114B, and the magnetic layer 115 are sequentially formed on a surface of the base layer 111 using the sputtering apparatus 120 shown in FIG. 9. Specifically, the films are formed as follows. First, the film forming chamber 121 is evacuated to a predetermined pressure. Thereafter, the targets set on the cathodes 123a to 123f are sputtered while a process gas such as an Ar gas or the like is introduced into the film forming chamber 121 Therefore, the SUL 112, the first seed layer 113A, the second seed layer 113B, the first ground layer 114A, the second ground layer 114B, and the magnetic layer 115 are sequentially formed on the surface of the traveling base layer 111.

The atmosphere of the film forming chamber 121 at the time of the sputtering is set to, for example, about $1 \times 10^{-5}$ Pa to $5 \times 10^{-5}$ Pa. Film thicknesses and characteristics of the SUL 112, the first seed layer 113A, the second seed layer 113B, the first ground layer 114A, the second ground layer 114B, and the magnetic layer 115 can be controlled by adjusting a tape line speed at which the base layer 111 is wound, a pressure (sputtering gas pressure) of the process gas such as the Ar gas or the like introduced at the time of the sputtering, supplied power, and the like.

Next, the protective layer 116 is formed on the magnetic layer 115. As a method of forming the protective layer 116, for example, a chemical vapor deposition (CVD) method or a physical vapor deposition (PVD) method can be used.

Next, a binder, inorganic particles, a lubricant, and the like are kneaded and dispersed in a solvent to prepare a coating material for forming a back layer. Next, the back layer 118 is formed on the back surface of the base layer 111 by applying the coating material for forming a back layer on the back surface of the base layer 111 and then drying the coating material.

Next, for example, the lubricant is coated on the protective layer 116 to form the lubricating layer 117. As a method of coating the lubricant, for example, various coating methods such as gravure coating, dip coating and the like can be used. Next, the magnetic recording medium 110 is cut into a predetermined width, as necessary. Thus, the magnetic recording medium 110 shown in FIG. 8 is obtained.

(6) Effect

In the magnetic recording cartridge according to the second embodiment, a recording capacity can be high and a change in the width of the magnetic recording medium 110 can be suppressed by adjusting tension in a longitudinal direction of the magnetic recording medium 110 by the recording and reproducing apparatus, similar to the first embodiment.

Moreover, the magnetic recording medium 110 is accommodated in a state of being wound around a reel and (servo track width inside the magnetic recording medium)−(servo track width outside the magnetic recording medium)>0 is satisfied. As a result, the occurrence of wrinkles on the inner side of winding in the cartridge may be suppressed.

As described above, the magnetic recording cartridge according to the second embodiment has high recording capacity per cartridge, is suitable for use in a recording and reproducing apparatus which adjusts tension in the longitudinal direction of the magnetic recording medium, and suppresses the occurrence of wrinkles that may occur with the tension adjustment.

(7) Modification

The magnetic recording medium 110 may further include a ground layer between the base layer 111 and the SUL 112. Since the SUL 112 has the amorphous state, the SUL 112 does not play a role of promoting epitaxial growth of a layer formed on the SUL 112, but is desired not to disturb the crystal alignment of the first and second ground layers 114A and 114B formed on the SUL 112. For this purpose, it is preferable that the soft magnetic material has a fine structure that does not form a column, but in a case where an influence of the release of a gas such as moisture or the like from the base layer 111 is large, the soft magnetic material may be coarsened to disturb the crystal alignment of the first and second ground layers 114A and 114B formed on the SUL 112. In order to suppress the influence of the release of the gas such as moisture or the like from the base layer 111, it is preferable that the ground layer containing an alloy containing Ti and Cr and an having amorphous state is provided between the base layer 111 and the SUL 112, as described above. As a specific configuration of the ground layer, a configuration similar to that of the first seed layer 113A of the second embodiment can be adopted.

The magnetic recording medium 110 may not include at least one of the second seed layer 113B or the second ground layer 114B. However, it is more preferable that the magnetic recording medium 110 includes both of the second seed layer 113B and the second base layer 114B, in terms of improvement a SNR.

The magnetic recording medium 110 may include an antiparallel coupled SUL (APC-SUL) instead of the single-layer SUL.

(8) Other Examples of Magnetic Recording Media (Configuration of Magnetic Recording Medium)

Figure 10:
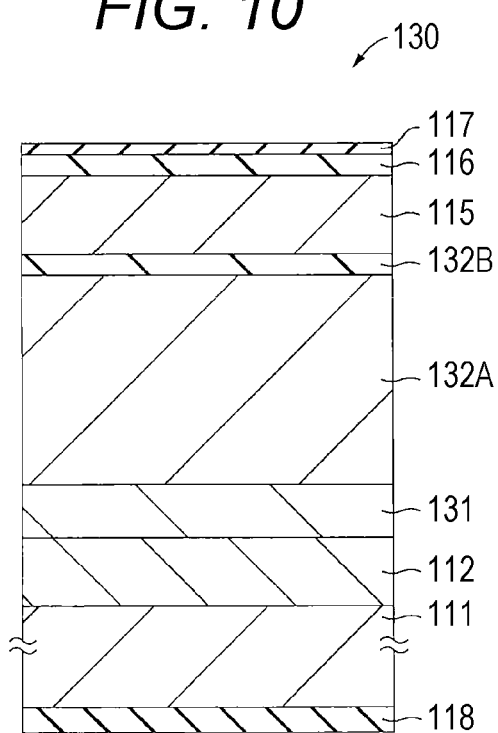
FIG. 10 is a cross-sectional view showing another example of a configuration of a magnetic recording medium included in a magnetic recording cartridge according to an embodiment of the present technology.

The magnetic recording cartridge 1 may include a magnetic recording medium 130 as described later, instead of the magnetic recording medium 110. The magnetic recording medium 130 includes a base layer 111, a SUL 112, a seed layer 131, a first ground layer 132A, a second ground layer 132B, and a magnetic layer 115, as shown in FIG. 10. Note that regarding a description of the magnetic recording medium 130, the same components as those of the magnetic recording medium 110 will be denoted by the same reference numerals, and a description thereof will be omitted.

The SUL 112, the seed layer 131, and the first and second ground layers 132A and 132B are provided between one main surface of the base layer 111 and the magnetic layer 115, and the SUL 112, the seed layer 131, the first ground layer 132A, and the second ground layer 132B are sequentially stacked from the base layer 111 toward the magnetic layer 115.

(Seed Layer)

The seed layer 131 contains Cr, Ni, and Fe, and has a face-centered cubic lattice (fcc) structure, and a (111) plane of the face-centered cubic lattice structure is preferentially aligned so as to be parallel with a surface of the base layer 111. Here, the preferential alignment means a state in which a diffraction peak intensity from the (111) plane of the face-centered cubic lattice structure is larger than diffraction peaks from other crystal planes in a θ-2θ scan of an X-ray diffraction method or a state in which only the diffraction peak intensity from the (111) plane of the face-centered cubic lattice structure is observed in the θ-2θ scan of the X-ray diffraction method.

An intensity ratio of X-ray diffraction of the seed layer 131 is preferably 60 cps/nm or more, more preferably 70 cps/nm or more, and still more preferably 80 cps/nm or more, in terms of improvement of the SNR. Here, the intensity ratio of the X-ray diffraction of the seed layer 131 is a value (I/D)(cps/nm)) obtained by dividing an intensity I(cps) of the X-ray diffraction of the seed layer 131 by an average thickness D (nm) of the seed layer 131.

It is preferable that Cr, Ni, and Fe contained in the seed layer 131 have an average composition represented by the following Formula (2).

$$Cr_X(Ni_YFe_{100-Y})_{100-X} \quad (2)$$

(where in Formula (2), X is in the range in which $10 \leq X \leq 45$ is satisfied, Y is in the range in which $60 \leq Y \leq 90$ is satisfied). When X is in the above range, (111) alignment of a face-centered cubic lattice structure of Cr, Ni, and Fe is improved, so that a better SNR can be obtained. Similarly, when Y is in the above range, the (111) alignment of the face-centered cubic lattice structure of Cr, Ni, and Fe is improved, so that a better SNR can be obtained.

It is preferable that the average thickness of the seed layer 131 is 5 nm or more to 40 nm or less. By setting the average thickness of the seed layer 131 to be in this range, the (111) alignment of the face-centered cubic lattice structure of Cr, Ni, and Fe is improved, so that a better SNR can be obtained. Note that the average thickness of the seed layer 131 is obtained in a manner similar to that of the magnetic layer 13 in the first embodiment. However, a magnification of a TEM image is appropriately adjusted according to the thickness of the seed layer 131.

(First and Second Ground Layers)

The first ground layer 132A contains Co and O having a face-centered cubic lattice structure, and has a column (columnar crystal) structure. In the first ground layer 132A containing Co and O, substantially an effect (function) substantially similar to that of the second ground layer 132B containing Ru is obtained. A concentration ratio of an average atomic concentration of O to an average atomic concentration of Co ((average atomic concentration of O)/(average atomic concentration of Co)) is 1 or more. When the concentration ratio is 1 or more, the effect of providing the first base layer 132A is improved, so that a better SNR can be obtained.

It is preferable that the column structure is inclined in terms of improvement of the SNR. It is preferable that a direction of the inclination is a longitudinal direction of the long-shaped magnetic recording medium 130. The reason why it is preferable that the direction of the inclination is the longitudinal direction is as follows. The magnetic recording medium 130 is a so-called magnetic recording medium for linear recording, and a recording track is parallel with the longitudinal direction of the magnetic recording medium 130. Furthermore, the magnetic recording medium 130 is also a so-called perpendicular magnetic recording medium, and it is preferable that a crystal alignment axis of the magnetic layer 115 is perpendicular in terms of recording characteristics, but an inclination may be generated in the crystal alignment axis of the magnetic layer 115 due to an influence of an inclination of the column structure of the first ground layer 132A. In the magnetic recording medium 130 for linear recording, in a relationship with the head magnetic field at the time of recording, the influence of the inclination of the crystal alignment axis on the recording characteristics can be reduced in a configuration in which the crystal alignment axis of the magnetic layer 115 is inclined in the longitudinal direction of the magnetic recording medium 130 as compared with a configuration in which the crystal alignment axis of the magnetic layer 115 is inclined in the width direction of the magnetic recording medium 130. In order to incline the crystal alignment axis of the magnetic layer 115 in the longitudinal direction of the magnetic recording medium 130, it is preferable that the inclination direction of the column structure of the first ground layer 132A is the longitudinal direction of the magnetic recording medium 130 as described above.

It is preferable that the inclination angle of the column structure is larger than 0° and is 60° or less. In the range in which the inclination angle is large than 0° and is 60° or less, a change in a tip shape of the column contained in the first ground layer 132A is large, so that the tip shape becomes substantially a triangular shape. Therefore, an effect of the granular structure tends to be improved, noise tends to be reduced, and the SNR tends to be improved. On the other hand, when the inclination angle exceeds 60°, the change in the tip shape of the column contained in the first foundation layer 132A is small, so that it is difficult for the tip shape to become substantially a triangular shape. Therefore, a noise reduction effect tends to be degraded.

An average particle diameter of the column structure is 3 nm or more to 13 nm or less. when the average particle size is less than 3 nm, the average particle size of the column structure included in the magnetic layer 115 is reduced, and thus, there is a possibility that an ability to hold a record with a current magnetic material will be deteriorated. On the other hand, when the average particle size is 13 nm or less, the noise is suppressed, so that a better SNR can be obtained.

An average thickness of the first ground layer 132A is preferably 10 nm or more to 150 nm or less. When the average thickness of the first ground layer 132A is 10 nm or more, (111) alignment of the face-centered cubic lattice structure of the first ground layer 132A is improved, so that a better SNR can be obtained. On the other hand, when the average thickness of the first ground layer 132A is 150 nm or less, an increase in a particle diameter of the column can be suppressed. Therefore, the noise is suppressed, so that a better SNR can be obtained. Note that the average thickness of the first ground layer 132A is obtained in a manner similar to the magnetic layer 13 in the first embodiment. However, a magnification of a TEM image is appropriately adjusted according to the thickness of the first ground layer 132A.

It is preferable that the second ground layer 132B has a crystal structure similar to that of the magnetic layer 115. In a case where the magnetic layer 115 contains a Co-based alloy, the second ground layer 132B contains a material having a hexagonal closest-packed (hcp) structure similar to that of the Co-based alloy, and it is preferable that a c-axis of the hcp structure is aligned in a direction (that is, a film thickness direction) perpendicular to a film surface. The reason is because alignment of the magnetic layer 115 can be improved and matching in a lattice constant between the second ground layer 132B and the magnetic layer 115 can be made relatively good. As the material having the hexagonal closest-packed structure, it is preferable to use a material containing Ru, and specifically, it is preferable to use Ru alone or use a Ru alloy. Examples of the Ru alloy can include an Ru alloy oxide such as Ru—$SiO_2$, Ru—$TiO_2$, Ru—$ZrO_2$, or the like.

An average thickness of the second ground layer 132B may be thinner than that of a ground layer (for example, a ground layer containing Ru) in a general magnetic recording medium, and can be, for example, 1 nm or more to 5 nm or less. Since the seed layer 131 and the first ground layer 132A having the configurations described above are provided under the second ground layer 132B, even though the average thickness of the second ground layer 132B is thin as described above, a good SNR is obtained. Note that the average thickness of the second ground layer 132B is obtained in a manner similar to the magnetic layer 13 in the first embodiment. However, a magnification of a TEM image is appropriately adjusted according to the thickness of the second ground layer 132B.

(Effect)

In the magnetic recording cartridge according to the second embodiment, even in a case of using the magnetic recording medium 130 instead of the magnetic recording medium 110, a recording capacity can be high and a change in the width of the magnetic recording medium 130 can be suppressed by adjusting tension in a longitudinal direction of the magnetic recording medium 130 by the recording and reproducing apparatus, similar to the first embodiment.

The magnetic recording medium 130 includes the seed layer 131 and the first ground layer 132A between the base layer 111 and the second ground layer 132B. The seed layer 131 contains Cr, Ni, and Fe, and has a face-centered cubic lattice structure, and a (111) plane of the face-centered cubic structure is preferentially aligned so as to be parallel with a surface of the base layer 111. The first ground layer 132A has a column structure in which it contains Co and O, a ratio of an average atomic concentration of O to an average atomic concentration of Co is 1 or more, and an average particle diameter is 3 nm or more to 13 nm or less. Therefore, it is possible to realize the magnetic layer 115 having a good crystal alignment and a high coercive force without using Ru, which is an expensive material, as thin as possible by reducing the thickness of the second ground layer 132B.

Ru contained in the second ground layer 132B has the same hexagonal closest-packed lattice structure as that of Co, which is a main component of the magnetic layer 115. Therefore, Ru has an effect of improving the crystal alignment of the magnetic layer 115 and promoting a granular property. Furthermore, in order to further improve the crystal alignment of Ru contained in the second ground layer 132B, the first ground layer 132A and the seed layer 131 are provided under the second ground layer 132B. In the magnetic recording medium 130, an effect (function) substantially similar to that of the second ground layer 132B containing Ru is realized by the first ground layer 132A containing cheap CoO having the face-centered cubic lattice structure. Therefore, the thickness of the second ground layer 132B can be reduced. Furthermore, in order to improve the crystal alignment of the first ground layer 132A, the seed layer 131 containing Cr, Ni, and Fe is provided.

4. EXAMPLE

Hereinafter, the present technology will be specifically described by Examples, but the present technology is not limited to only these Examples.

In the following Examples and Comparative Examples, an average thickness $t_T$ of a magnetic tape, a dimensional change amount $\Delta w$ in a width direction of the magnetic tape to a tension change in a longitudinal direction of the magnetic tape, a temperature expansion coefficient $\alpha$ of the magnetic tape, a humidity expansion coefficient $\beta$ of the magnetic tape, a Poisson's ratio $\rho$ of the magnetic tape, an elastic limit value $\alpha_{MD}$ in the longitudinal direction of the magnetic tape, an average thickness $t_m$ of a magnetic layer, a squareness ratio S2, an average thickness $t_b$ of a back layer, a surface roughness $R_{ab}$ of the back layer, an interlayer friction coefficient $\mu$ between a magnetic surface and a back surface, an amount of deviation of a servo track width of an inner side of winding (an amount of a deviation with a reproducing servo read head width) $T_{in}W$, an amount of deviation of a servo track width of an outer side of the winding (an amount of a deviation with a reproducing servo read head width) $T_{out}W$, and a difference in a servo track width between the inner side and the outer side of the winding ($T_{in}W-T_{out}W$) are values obtained by a measurement method described in the first embodiment. However, as described later, in Example 11, a speed Vat the time of measuring an elastic limit value $\sigma_{MD}$ in a longitudinal direction was set to a value different from the measurement method described in the first embodiment.

Example 1

(Process of Preparing Magnetic Layer-Forming Coating Material)

A magnetic layer-forming coating material was prepared as follows. First, a first composition of the following mixture was kneaded with an extruder. Next, the kneaded first composition and a second composition of the following mixture were added to a stirring tank equipped with a disperser and preliminary mixing was carried out. Subsequently, sand mill mixing was performed again and subjected to filtering to prepare a magnetic layer-forming coating material.

(First Composition)

Powder of ε iron oxide nanoparticles (ε-$Fe_2O_3$ crystal particles): 100 parts by mass Vinyl chloride resin (30% by mass of a cyclohexanone solution): 10 parts by mass (containing a polymerization degree of 300, Mn=10000, $OSO_3K$=0.07 mmol/g as a polar group, and secondary OH=0.3 mmol/g)

Aluminum oxide powder: 5 parts by mass ($\alpha$-$Al_2O_3$, average particle size 0.2 μm)

Carbon black: 2 parts by mass (Manufactured by TOKAI CARBON CO., LTD, trade name: SEAST TA)

(Second Composition)

Vinyl chloride resin: 1.1 parts by mass (Resin solution: 30% by mass of resin, 70% by mass of cyclohexanone)

n-Butyl stearate: 2 parts by mass

Methyl ethyl ketone: 121.3 parts by mass

Toluene: 121.3 parts by mass

Cyclohexanone: 60.7 parts by mass

Finally, 4 parts by mass of polyisocyanate (trade name: Coronate L, manufactured by Nippon Polyurethane Co., Ltd.) and 2 parts by mass of myristic acid were added as a curing agent to the magnetic layer-forming coating material prepared as described above.

(Process of Preparing Ground Layer-Forming Coating Material)

A ground layer-forming coating material was prepared as follows. First, a third composition of the following mixture was kneaded by an extruder. Next, the kneaded third composition and a fourth composition of the following mixture were added to a stirring tank equipped with a disper and preliminary mixing was carried out. Subsequently, sand mill mixing was further performed and the mixture was subjected to filtering to prepare a ground layer-forming coating material.

(Third Composition)
Needle-like iron oxide powder: 100 parts by mass ($\alpha$-$Fe_2O_3$, average major axis length 0.15 μm)
Vinyl chloride resin: 55.6 parts by mass
(Resin solution: 30% by mass of resin, 70% by mass of cyclohexanone)
Carbon black: 10 parts by mass
(Average particle size 20 nm)
(Fourth Composition)
Polyurethane resin UR8200 (manufactured by TOYO BOSEKI): 18.5 parts by mass
n-Butyl stearate: 2 parts by mass
Methyl ethyl ketone: 108.2 parts by mass
Toluene: 108.2 parts by mass
Cyclohexanone: 18.5 parts by mass Finally, 4 parts by mass of polyisocyanate (trade name: Coronate L, manufactured by Nippon Polyurethane Co., Ltd.) and 2 parts by mass of myristic acid were added as a curing agent to the ground layer-forming coating material prepared as described above.

(Process of Preparing Back Layer-Forming Coating Material)

A back layer-forming coating material was prepared as follows. The following raw materials were mixed in a stirring tank equipped with a disper and subjected to filtering to prepare a back layer-forming coating material.
Carbon black (manufactured by Asahi Carbon Co., Ltd., trade name: #80): 100 parts by mass
Polyester polyurethane: 100 parts by mass
(Nippon Polyurethane Co., Ltd., trade name: N-2304)
Methyl ethyl ketone: 500 parts by mass
Toluene: 400 parts by mass
Cyclohexanone: 100 parts by mass (Film Formation Process)

Using the coating material prepared as described above, a ground layer having an average thickness of 1.0 μm and a magnetic layer having an average thickness tm of 90 nm were formed on a long polyethylene naphthalate film (hereinafter referred to as "PEN film") which is a nonmagnetic support in the following manner. First, the ground layer-forming coating material was applied to the film and dried to form a ground layer on the film. Next, a magnetic layer-forming coating material was applied to the ground layer and dried to form a magnetic layer on the ground layer. Note that, when the magnetic layer-forming coating material was dried, the magnetic powder was magnetically aligned in a thickness direction of the film by a solenoid coil. Furthermore, the squareness ratio S2 in the thickness direction (vertical direction) of the magnetic tape was set to 65% by adjusting an application time of the magnetic field to the magnetic layer-forming coating material.

Subsequently, a back layer having an average thickness $t_b$ of 0.6 μm was applied to the film, on which the ground layer and the magnetic layer were formed, and dried. Then, the film, on which the ground layer, the magnetic layer, and the back layer were formed, was subjected to a curing treatment. Subsequently, calendering was performed to smooth the surface of the magnetic layer. Here, conditions (temperature) for calendering were adjusted so that an interlayer friction coefficient μ of a magnetic surface and a back surface was about 0.5 and re-curing was subsequently performed to obtain a magnetic tape having an average thickness $t_T$ of 5.5 μm.

(Cutting Process)

The magnetic tape obtained as described above was cut into a ½ inch (12.65 mm) width and wound around a core to obtain a pancake.

The magnetic tape obtained as described above had the characteristics shown in Table 1. For example, a dimensional change amount Δw of the magnetic tape was 707 ppm/N.

The ½ inch-wide magnetic tape was wound around a reel prepared in the cartridge case to obtain a magnetic recording cartridge. A servo signal was recorded on the magnetic tape. The servo signal includes a series of inverted V-shaped magnetic patterns, and the magnetic patterns are pre-recorded in parallel in the longitudinal direction at two or more lines at known intervals (hereinafter referred to as "standard servo track width").

Example 2

A magnetic tape was obtained in the same manner as in Example 1 except that the thickness of the PEN film was made thinner than in Example 1 so that the dimensional change amount Δw was 750 ppm/N. The average thickness $t_T$ of the magnetic tape was 5 μm. As in Example 1, a magnetic recording cartridge was manufactured using the magnetic tape and a servo signal was then recorded on the magnetic tape.

Example 3

A magnetic tape was obtained in the same manner as in Example 1 except that the thickness of the PEN film was thinner than Example 1 and the average thickness of the back layer and the ground layer was thinner so that the dimensional change amount Δw was 800 ppm/N. The average thickness $t_T$ of the magnetic tape was 4.5 μm. As in Example 1, a magnetic recording cartridge was manufactured using the magnetic tape and a servo signal was then recorded on the magnetic tape.

Example 4

A magnetic tape was obtained in the same manner as in Example 1 except that the thickness of the PEN film was thinner than Example 1, the average thickness of the back layer and the ground layer was thinner, and the curing treatment conditions of the film on which the ground layer, the magnetic layer, and the back layer were formed were adjusted so that the dimensional change amount Δw was 800 ppm/N. As in Example 1, a magnetic recording cartridge was manufactured using the magnetic tape and a servo signal was then recorded on the magnetic tape.

Example 5

A magnetic tape was obtained in the same manner as in Example 4 except that the composition of the ground layer-forming coating material was changed so that the thermal expansion coefficient α was 8.0 ppm/° C. As in Example 1, a magnetic recording cartridge was manufactured using the magnetic tape and a servo signal was then recorded on the magnetic tape.

Example 6

A magnetic tape was obtained in the same manner as in Example 4 except that a thin barrier layer was formed on one side of the PEN film so that the humidity expansion coefficient β was 3.0 ppm/% RH. As in Example 1, a magnetic recording cartridge was manufactured using the magnetic tape and a servo signal was then recorded on the magnetic tape.

Example 7

A magnetic tape was obtained in the same manner as in Example 4 except that longitudinal and transverse stretching strengths of the base film were changed so that the Poisson's ratio ρ was 0.31. As in Example 1, a magnetic recording cartridge was manufactured using the magnetic tape and a servo signal was then recorded on the magnetic tape.

Example 8

A magnetic tape was obtained in the same manner as in Example 4 except that the longitudinal and transverse stretching strengths of the base film were changed so that the Poisson's ratio ρ was 0.35. As in Example 1, a magnetic recording cartridge was manufactured using the magnetic tape and a servo signal was then recorded on the magnetic tape.

Example 9

A magnetic tape was obtained in the same manner as in Example 7 except that the curing conditions of the film on which the ground layer, the magnetic layer, and the back layer were formed were adjusted so that the elastic limit value $\sigma_{MD}$ in the longitudinal direction was 0.8 N. As in Example 1, a magnetic recording cartridge was manufactured using the magnetic tape and a servo signal was then recorded on the magnetic tape.

Example 10

A magnetic tape was obtained in the same manner as in Example 7 except that the curing conditions and re-curing conditions of the film on which the ground layer, the magnetic layer, and back layer were formed were adjusted so that the elastic limit value $\sigma_{MD}$ in the longitudinal direction was 3.5 N. As in Example 1, a magnetic recording cartridge was manufactured using the magnetic tape and a servo signal was then recorded on the magnetic tape.

Example 11

A magnetic tape was obtained in a manner similar to that of Example 9. Then, the elastic limit value $\sigma_{MD}$ of the obtained magnetic tape was measured by changing the speed V when measuring the elastic limit value $\sigma_{MD}$ in the longitudinal direction to 5 mm/min. As a result, the elastic limit value $\sigma_{MD}$ in the longitudinal direction was 0.8, without any change as compared with the elastic limit value $\sigma_{MD}$ in the longitudinal direction at a speed V of 0.5 mm/min (Example 9). As in Example 1, a magnetic recording cartridge was manufactured using the magnetic tape and a servo signal was then recorded on the magnetic tape.

Example 12

A magnetic tape was obtained in the same manner as in Example 7 except that a coating thickness of the magnetic layer-forming coating material was changed so that the average thickness $t_m$ of the magnetic layer was 40 nm. As in Example 1, a magnetic recording cartridge was manufactured using the magnetic tape and a servo signal was then recorded on the magnetic tape.

Example 13

Film Formation Process of SUL

First, a CoZrNb layer (SUL) having an average thickness of 10 nm was formed on a surface of a long polymer film as a nonmagnetic support under the following film formation conditions. Note that a PEN film was used as the polymer film.
Film formation method: DC magnetron sputtering method
Target: CoZrNb target
Gas type: Ar
Gas pressure: 0.1 Pa
(Process of Forming First Seed Layer)
Next, a TiCr layer (first seed layer) having an average thickness of 5 nm was formed on the CoZrNb layer under the following film formation conditions.
Sputtering method: DC magnetron sputtering method
Target: TiCr target
Achieved vacuum: $5 \times 10^{-5}$ Pa
Gas type: Ar
Gas pressure: 0.5 Pa
(Process of Forming Second Seed Layer)
Next, a NiW layer (second seed layer) having an average thickness of 10 nm was formed on the TiCr layer under the following film formation conditions.
Sputtering method: DC magnetron sputtering method
Target: NiW target
Achieved vacuum: $5 \times 10^{-5}$ Pa
Gas type: Ar
Gas pressure: 0.5 Pa
(Process of Forming First Ground Layer)
Next, a Ru layer (first ground layer) having an average thickness of 10 nm was formed on the NiW layer under the following film formation conditions.
Sputtering method: DC magnetron sputtering method
Target: Ru target
Gas type: Ar
Gas pressure: 0.5 Pa
(Process of Forming Second Ground Layer)
Next, a Ru layer (second ground layer) having an average thickness of 20 nm was formed on the Ru layer under the following film formation conditions.
Sputtering method: DC magnetron sputtering method
Target: Ru target
Gas type: Ar
Gas pressure: 1.5 Pa
(Process of Forming Magnetic Layer)
Next, a (CoCrPt)—(SiO₂) layer (magnetic layer) having an average thickness of 9 nm was formed on the Ru layer under the following film formation conditions.
Film formation method: DC magnetron sputtering method
Target: (CoCrPt)—(SiO₂)target Gas type: Ar
Gas pressure: 1.5 Pa
(Process of Forming Protective Layer)
Next, a carbon layer (protective layer) having an average thickness of 5 nm was formed on the magnetic layer under the following film formation conditions.
Film formation method: DC magnetron sputtering method
Target: carbon target
Gas type: Ar
Gas pressure: 1.0 Pa
(Process of Forming Lubricating Layer)
Next, a lubricant was applied to the protective layer to form a lubricating layer.
(Process of Forming Back Layer)
Next, a back layer-forming coating material was applied to a surface opposite to the magnetic layer and dried to form a back layer having an average thickness $t_b$ of 0.3 µm. As a result, a magnetic tape having an average thickness $t_T$ of 4.0 µm was obtained.
(Cutting Process)
The magnetic tape obtained as described above was cut into a ½ inch (12.65 mm) width.

The magnetic tape obtained as described above had the characteristics shown in Table 1. For example, the dimensional change amount Δw of the magnetic tape was 800 ppm/N. As in Example 1, a magnetic recording cartridge was manufactured using the magnetic tape and a servo signal was then recorded on the magnetic tape.

Example 14

A magnetic tape was obtained in the same manner as in Example 7 except that the thickness of the back layer was changed to 0.2 µm. An average thickness of the magnetic tape was 4.4 µm. As in Example 1, a magnetic recording cartridge was manufactured using the magnetic tape and a servo signal was then recorded on the magnetic tape.

Example 15

A magnetic tape was obtained in the same manner as in Example 7 except that the composition of the back layer-forming coating material was changed so that the surface roughness $R_{ab}$ of the back layer was 3 nm. As in Example 1, a magnetic recording cartridge was manufactured using the magnetic tape and a servo signal was then recorded on the magnetic tape.

Example 16

A magnetic tape was obtained in the same manner as in Example 7 except that the conditions (temperature) of calendering were adjusted so that the friction coefficient µ was 0.20. As in Example 1, a magnetic recording cartridge was manufactured using the magnetic tape and a servo signal was then recorded on the magnetic tape.

Example 17

A magnetic tape was obtained in the same manner as in Example 7 except that the composition of the back layer-forming coating material was changed so that the surface roughness $R_{ab}$ of the back layer was 3 nm and the conditions (temperature) of the calendering were adjusted so that the friction coefficient µ was 0.80. As in Example 1, a magnetic recording cartridge was manufactured using the magnetic tape and a servo signal was then recorded on the magnetic tape.

Example 18

A magnetic tape was obtained in the same manner as in Example 7, except that the coating thickness of the magnetic layer-forming coating material was changed so that the average thickness $t_m$ of the magnetic layer was 110 nm. As in Example 1, a magnetic recording cartridge was manufactured using the magnetic tape and a servo signal was then recorded on the magnetic tape.

Example 19

A magnetic tape was obtained in the same manner as in Example 7, except that the composition of the back layer-forming coating material was changed so that the surface roughness $R_{ab}$ of the back layer was 7 nm. As in Example 1, a magnetic recording cartridge was manufactured using the magnetic tape and a servo signal was then recorded on the magnetic tape.

Example 20

A magnetic tape was obtained in the same manner as in Example 7, except that the conditions (temperature) for calendering were adjusted so that the friction coefficient µ was 0.18. As in Example 1, a magnetic recording cartridge was manufactured using the magnetic tape and a servo signal was then recorded on the magnetic tape.

Example 21

A magnetic tape was obtained in the same manner as in Example 7, except that the conditions (temperature) for calendering were adjusted so that the friction coefficient µ was 0.82. As in Example 1, a magnetic recording cartridge was manufactured using the magnetic tape and a servo signal was then recorded on the magnetic tape.

Example 22

A magnetic tape was obtained in the same manner as in Example 7, except that the squareness ratio S2 in the thickness direction (vertical direction) of the magnetic tape was set to 73% by adjusting the application time of the magnetic field to the magnetic layer-forming coating material. As in Example 1, a magnetic recording cartridge was manufactured using the magnetic tape and a servo signal was then recorded on the magnetic tape.

Example 23

A magnetic tape was obtained in the same manner as in Example 7, except that the squareness ratio S2 in the thickness direction (vertical direction) of the magnetic tape was set to 80% by adjusting the application time of the magnetic field to the magnetic layer-forming coating material. As in Example 1, a magnetic recording cartridge was manufactured using the magnetic tape and a servo signal was then recorded on the magnetic tape.

Example 24

A magnetic tape was obtained in the same manner as in Example 7 except that the curing conditions and re-curing conditions of the film on which the ground layer, the magnetic layer, and the back layer were formed were adjusted so that the elastic limit value $\sigma_{MD}$ in the longitudinal direction was 5 N. As in Example 1, a magnetic recording cartridge was manufactured using the magnetic tape and a servo signal was then recorded on the magnetic tape.

Example 25

A magnetic tape was obtained in the same manner as in Example 7, except that barium ferrite ($BaFe_{12}O_{19}$) nanoparticles were used instead of ε iron oxide nanoparticles. As in Example 1, a magnetic recording cartridge was manufactured using the magnetic tape and a servo signal was then recorded on the magnetic tape.

Example 26

A magnetic tape was manufactured in the same manner as in Example 1 except that the servo signal was recorded while running at a low tension. As in Example 1, a magnetic recording cartridge was manufactured using the magnetic tape and a servo signal was then recorded on the magnetic tape.

Comparative Example 1

A magnetic tape was obtained in the same manner as in Example 1 except that the stretching treatment of the PEN film was changed so that the dimensional change amount Δw was 650[ppm/N] and the winding tension in the coating process was increased. As in Example 1, a magnetic recording cartridge was manufactured using the magnetic tape and a servo signal was then recorded on the magnetic tape.

Comparative Example 2

A magnetic tape was manufactured in the same manner as Example 2, except that a thicker base film was used and the servo signal was recorded, while adjusting tension. As in Example 1, a magnetic recording cartridge was manufactured using the magnetic tape and a servo signal was then recorded on the magnetic tape.

Comparative Example 3

A magnetic tape was manufactured in the same manner as Example 2, except that a thicker base film was used and the servo signal was recorded, while adjusting tension. As in Example 1, a magnetic recording cartridge was manufactured using the magnetic tape and a servo signal was then recorded on the magnetic tape.

Comparative Example 4

A magnetic tape was obtained in the same manner as in Example 7 except that vertical alignment was not performed. As in Example 1, a magnetic recording cartridge was manufactured using the magnetic tape and a servo signal was then recorded on the magnetic tape.

(Determination of Change Amount of Tape Width)

As described above, on the magnetic tape included in the magnetic recording cartridge, two or more rows of inverted V-shaped magnetic patterns are previously recorded in parallel in the longitudinal direction at a known interval ("standard servo track width"). The magnetic recording tape in each magnetic recording cartridge was reciprocated in the recording and reproducing apparatus. Then, at the time of reciprocation running, two or more rows of the above-mentioned inverted V-shaped magnetic pattern rows were simultaneously reproduced, and the interval between the magnetic pattern rows during running was continuously measured from a shape of a reproduction waveform of each row. Note that at the time of running, rotational driving of the spindle driving device and the reel driving device was controlled on the basis of the measured interval information of the magnetic pattern row to automatically adjust tension in the longitudinal direction of the magnetic tape so that the interval between the magnetic pattern rows becomes a prescribed width or substantially a prescribed width. A simple average of all measured values for one reciprocation running of the interval between the magnetic pattern rows is determined as a "measured interval between magnetic pattern rows", and a difference between this and the "standard servo track width" is a "change in tape width".

Furthermore, the reciprocation running by the recording and reproducing apparatus was performed in a constant temperature and humidity chamber. A speed of the reciprocation was 5 m/sec. A temperature and humidity during the reciprocation running were gradually and repeatedly changed according to a predetermined environmental change program in a temperature range of 10° C. to 45° C. and the relative humidity range of 10% to 80%, independent of the reciprocation running described above (for example, the predetermined environmental change program may be, for example, that 10° C. and 10%→29° C. and 80%→10° C. and 10% are repeated twice, in this case, the temperature and humidity are changed from 10° C. and 10% to 29° C. and 80% in two hours and from 29° C. and 80% to 10° C. and 10% in two hours).

This evaluation was repeated until the "predetermined environmental change program" was finished. After the evaluation, an average value (simple average) was calculated using all the absolute values of each of the "change in tape width" obtained at each reciprocation, and the value was determined as an "effective change amount of tape width" of the tape. A determination was made on each tape according to deviation (the smaller the better) from an ideal of the "effective change amount of tape width", and eight-stage determination values were respectively given. Note that evaluation "8" indicated the most desirable determination result and evaluation "1" indicated the most undesirable determination result. The magnetic tape has certain evaluation of the 8 stages, and the following states are observed when the magnetic tape runs.

8: No abnormality occurred
7: A slight increase in error speed is observed when running
6: A serious increase in error speed is observed when running
5: During running, the magnetic tape may not read a servo signal and slight (one or two) reloading is performed
4: During running, the magnetic tape may not read a servo signal and medium (up to 10 times) reloading is performed
3: During running, the magnetic tape may not read a servo signal and heavy (more than 10 times) reloading is performed
2: The magnetic tape may not read servo and occasionally stops due to a system error
1: The magnetic tape may not read servo and immediately stops due to a system error (Evaluation of Electromagnetic Conversion Characteristic)

First, a reproduction signal of the magnetic tape was acquired using a loop tester (manufactured by Microphysics). The conditions for acquiring the reproduction signal are described below.

Head: GMR
Headspeed: 2 m/s
Signal: single recording frequency (10 MHz)
Recording current: Optimal recording current Next, the reproduction signal was adopted by a spectrum analyzer at a span (SPAN) of 0 to 20 MHz (resolution band width=100 kHz, VBW=30 kHz). Next, a peak of the adopted spectrum was taken as a signal amount S, floor noise without the peak was integrated to obtain a noise amount N, and a ratio S/N of the signal amount S to the noise amount N was obtained as a signal-to-noise ratio (SNR). Next, the obtained SNR was converted into a relative value (dB) based on the SNR of Comparative Example 1 as a reference medium. Next, using the SNR (dB) obtained as described above, quality of an electromagnetic conversion characteristic was determined as follows.

Better: The SNR of the magnetic tape is 1 dB or much better than the SNR (=0 (dB)) of the evaluation reference sample (Comparative Example 1).

Good: The SNR of the magnetic tape is equal to or exceeds the SNR (=0 (dB)) of the evaluation reference sample (Comparative Example 1)

Almost good: There is a portion where the SNR of the magnetic tape is less than the SNR (=0 (dB)) of the evaluation reference sample (Comparative Example 1).

Bad: The SNR of the magnetic tape is less than the SNR (=0 (dB)) of the evaluation reference sample (Comparative Example 1) over the entire area.

(Evaluation of Winding Deviation)

First, a magnetic recording cartridge after the above-mentioned "determination of change amount of tape width" was prepared. Next, the reel around which the tape was wound was taken out from the magnetic recording cartridge, and an end face of the wound tape was visually observed. Note that the reel has a flange, and at least one flange is transparent or translucent so that the internal tape winding can be observed over the flange.

According to results of observation, in a case where the end face of the tape is not flat and there is a step or protrusion of the tape, the tape was determined to have winding deviation. Furthermore, the "winding deviation" is considered to be worse as a plurality of steps and protrusions are observed. The above determination was made for each sample. The winding deviation state of each sample was compared with the winding deviation state of Comparative Example 1 as a reference medium, and the quality was determined as follows.

Good: In a case where the winding deviation state of the sample is equal to or less than the winding deviation state of the reference sample (comparative example 1)

Bad: In a case where the winding deviation state of the sample is larger than the winding deviation state of the reference sample (comparative example 1)

(Evaluation of Winding State (Evaluation of the Presence or Absence of Wrinkles))

First, a magnetic recording cartridge after the above-mentioned "determination of change amount of tape width" was prepared. By visually observing the winding state of the magnetic recording medium in the magnetic recording cartridge from the side with naked eyes, the presence or absence of disorder of the winding state due to the occurrence of wrinkles may be checked. In the observation, the winding state was determined according to the following criteria.

Good: There is no disorder of the winding state caused by wrinkles.

Bad: There is disorder of the winding state caused by wrinkles.

Table 1 shows the configurations and evaluation results of the magnetic tapes of Examples 1 to 26 and Comparative Examples 1 to 4.

TABLE 1

| | Magnetic Material | Base Thickness [μm] | tT [μm] | Δw [ppm/N] | α [ppm/° C.] | β [ppm/% RH] | ρ | $\sigma_{MD}$ [M] | V [mm/min] | $t_m$ [nm] | Alignment Degree |
|---|---|---|---|---|---|---|---|---|---|---|---|
| Example 1 | ε Iron Oxide | 3.8 | 5.5 | 707 | 5.9 | 5.2 | 0.29 | 0.75 | 0.5 | 90 | Substantially Vertical |
| Example 2 | ε Iron Oxide | 3.3 | 5.0 | 750 | 5.9 | 5.2 | 0.29 | 0.75 | 0.5 | 90 | Substantially Vertical |
| Example 3 | ε Iron Oxide | 3.2 | 4.5 | 800 | 5.9 | 5.2 | 0.29 | 0.75 | 0.5 | 90 | Substantially Vertical |
| Example 4 | ε Iron Oxide | 3.2 | 4.5 | 800 | 6 | 5 | 0.29 | 0.75 | 0.5 | 90 | Substantially Vertical |
| Example 5 | ε Iron Oxide | 3.2 | 4.5 | 800 | 8 | 5 | 0.29 | 0.75 | 0.5 | 90 | Substantially Vertical |
| Example 6 | ε Iron Oxide | 3.2 | 4.6 | 800 | 6 | 3 | 0.29 | 0.75 | 0.5 | 90 | Substantially Vertical |
| Example 7 | ε Iron Oxide | 3.2 | 4.5 | 800 | 6 | 5 | 0.31 | 0.75 | 0.5 | 90 | Substantially Vertical |
| Example 8 | ε Iron Oxide | 3.2 | 4.5 | 800 | 6 | 5 | 0.35 | 0.75 | 0.5 | 90 | Substantially Vertical |
| Example 9 | ε Iron Oxide | 3.2 | 4.5 | 800 | 6 | 5 | 0.31 | 0.8 | 0.5 | 90 | Substantially Vertical |
| Example 10 | ε Iron Oxide | 3.2 | 4.5 | 800 | 6 | 5 | 0.31 | 3.5 | 0.5 | 90 | Substantially Vertical |
| Example 11 | ε Iron Oxide | 3.2 | 4.5 | 800 | 6 | 5 | 0.31 | 0.8 | 5 | 90 | Substantially Vertical |
| Example 12 | ε Iron Oxide | 3.2 | 4.4 | 800 | 6 | 5 | 0.31 | 0.75 | 0.5 | 40 | Substantially Vertical |
| Example 13 | CrPtCoSiO2 | 3.6 | 4.0 | 800 | 6 | 5 | 0.31 | 0.75 | 0.5 | 9 | Vertical |
| Example 14 | ε Iron Oxide | 3.2 | 4.4 | 800 | 6 | 5 | 0.31 | 0.75 | 0.5 | 90 | Substantially Vertical |
| Example 15 | ε Iron Oxide | 3.2 | 4.5 | 800 | 6 | 5 | 0.31 | 0.75 | 0.5 | 90 | Substantially Vertical |
| Example 16 | ε Iron Oxide | 3.2 | 4.5 | 800 | 6 | 5 | 0.31 | 0.75 | 0.5 | 90 | Substantially Vertical |
| Example 17 | ε Iron Oxide | 3.2 | 4.5 | 800 | 6 | 5 | 0.31 | 0.75 | 0.5 | 90 | Substantially Vertical |
| Example 18 | ε Iron Oxide | 3.2 | 4.5 | 800 | 6 | 5 | 0.31 | 0.75 | 0.5 | 110 | Substantially Vertical |
| Example 19 | ε Iron Oxide | 3.2 | 4.5 | 800 | 6 | 5 | 0.31 | 0.75 | 0.5 | 90 | Substantially Vertical |
| Example 20 | ε Iron Oxide | 3.2 | 4.5 | 800 | 6 | 5 | 0.31 | 0.75 | 0.5 | 90 | Substantially Vertical |
| Example 21 | ε Iron Oxide | 3.2 | 4.5 | 800 | 6 | 5 | 0.31 | 0.75 | 0.5 | 90 | Substantially Vertical |
| Example 22 | ε Iron Oxide | 3.2 | 4.5 | 800 | 6 | 5 | 0.31 | 0.75 | 0.5 | 90 | Substantially Vertical |
| Example 23 | ε Iron Oxide | 3.2 | 4.5 | 800 | 6 | 5 | 0.31 | 0.75 | 0.5 | 90 | Substantially Vertical |
| Example 24 | ε Iron Oxide | 3.2 | 4.5 | 800 | 6 | 5 | 0.31 | 5.0 | 0.5 | 90 | Substantially Vertical |
| Example 25 | Banum Ferrite | 3.2 | 4.5 | 800 | 6 | 5 | 0.31 | 0.75 | 0.5 | 90 | Substantially Vertical |
| Example 26 | ε Iron Oxide | 3.8 | 5.5 | 700 | 6 | 5 | 0.29 | 0.75 | 0.5 | 90 | Substantially Vertical |

TABLE 1-continued

| | | | | | | | | | | |
|---|---|---|---|---|---|---|---|---|---|---|
| Comparative Example 1 | ε Iron Oxide | 3.8 | 5.5 | 650 | 5.9 | 5.2 | 0.29 | 0.75 | 0.5 | 90 | Substantially Vertical |
| Comparative Example 2 | ε Iron Oxide | 3.6 | 5 | 800 | 5.9 | 5.2 | 0.29 | 0.75 | 0.5 | 90 | Substantially Vertical |
| Comparative Example 3 | ε Iron Oxide | 3.6 | 5 | 800 | 5.9 | 5.2 | 0.29 | 0.75 | 0.5 | 90 | Substantially Vertical |
| Comparative Example 4 | ε Iron Oxide | 3.2 | 4.5 | 800 | 6 | 5 | 0.29 | 0.75 | 0.5 | 90 | Non-aligned |

| | S2 [%] | $t_b$ [μm] | $R_{ab}$ [nm] | μ | $T_{out}W$ [um] | $T_{in}W$ [um] | $T_{in}W - T_{out}W$ [um] | Determination | Electromagnetic Conversion Characteristic | Winding Deviation | State (Occurrence of Wrinkles) |
|---|---|---|---|---|---|---|---|---|---|---|---|
| Example 1 | 65 | 0.6 | 6 | 0.50 | 0.13 | 0.20 | 0.07 | 4 | Good | Good | Good |
| Example 2 | 65 | 0.6 | 6 | 0.50 | 0.22 | 0.46 | 0.24 | 5 | Good | Good | Good |
| Example 3 | 65 | 0.3 | 6 | 0.50 | 0.25 | 0.50 | 0.25 | 6 | Good | Good | Good |
| Example 4 | 65 | 0.3 | 6 | 0.50 | 0.25 | 0.50 | 0.25 | 7 | Good | Good | Good |
| Example 5 | 65 | 0.3 | 6 | 0.50 | 0.25 | 0.50 | 0.25 | 7 | Good | Good | Good |
| Example 6 | 65 | 0.3 | 6 | 0.50 | 0.25 | 0.50 | 0.25 | 8 | Good | Good | Good |
| Example 7 | 65 | 0.3 | 6 | 0.50 | 0.25 | 0.50 | 0.25 | 7 | Good | Good | Good |
| Example 8 | 65 | 0.3 | 6 | 0.50 | 0.25 | 0.50 | 0.25 | 7 | Good | Good | Good |
| Example 9 | 65 | 0.3 | 6 | 0.50 | 0.25 | 0.50 | 0.25 | 8 | Good | Good | Good |
| Example 10 | 65 | 0.3 | 6 | 0.50 | 0.25 | 0.50 | 0.25 | 8 | Good | Good | Good |
| Example 11 | 65 | 0.3 | 6 | 0.50 | 0.25 | 0.50 | 0.25 | 8 | Good | Good | Good |
| Example 12 | 65 | 0.3 | 6 | 0.50 | 0.22 | 0.42 | 0.20 | 7 | Good | Good | Good |
| Example 13 | 98 | 0.3 | 6 | 0.50 | 0.15 | 0.20 | 0.05 | 7 | Good | Good | Good |
| Example 14 | 65 | 0.2 | 6 | 0.50 | 0.25 | 0.50 | 0.25 | 7 | Good | Good | Good |
| Example 15 | 65 | 0.3 | 3 | 0.50 | 0.25 | 0.50 | 0.25 | 7 | Good | Good | Good |
| Example 16 | 65 | 0.3 | 6 | 0.20 | 0.25 | 0.50 | 0.25 | 7 | Good | Good | Good |
| Example 17 | 65 | 0.3 | 3 | 0.80 | 0.25 | 0.50 | 0.25 | 7 | Good | Good | Good |
| Example 18 | 65 | 0.3 | 6 | 0.50 | 0.25 | 0.50 | 0.25 | 7 | Approximately Good | Good | Good |
| Example 19 | 65 | 0.3 | 7 | 0.50 | 0.25 | 0.50 | 0.25 | 7 | Approximately Good | Good | Good |
| Example 20 | 65 | 0.3 | 6 | 0.18 | 0.25 | 0.50 | 0.25 | 7 | Good | Bad | Good |
| Example 21 | 65 | 0.3 | 6 | 0.82 | 0.25 | 0.50 | 0.25 | 7 | Good | Bad | Good |
| Example 22 | 73 | 0.3 | 6 | 0.50 | 0.25 | 0.50 | 0.25 | 8 | Good | Good | Good |
| Example 23 | 80 | 0.3 | 6 | 0.50 | 0.25 | 0.50 | 0.25 | 8 | Better | Good | Good |
| Example 24 | 65 | 0.3 | 6 | 0.50 | 0.25 | 0.50 | 0.25 | 8 | Good | Good | Good |
| Example 25 | 65 | 0.3 | 6 | 0.50 | 0.25 | 0.50 | 0.25 | 7 | Good | Good | Good |
| Example 26 | 65 | 0.6 | 6 | 0.50 | −0.03 | −0.02 | 0.01 | 7 | Good | Bad | Good |
| Comparative Example 1 | 65 | 0.6 | 6 | 0.50 | 0.14 | 0.22 | 0.08 | 1 | Good | Good | Good |
| Comparative Example 2 | 65 | 0.6 | 6 | 0.50 | 0.25 | 0.22 | −0.03 | 5 | Good | Good | Bad |
| Comparative Example 3 | 65 | 0.6 | 6 | 0.50 | −0.03 | −0.03 | 0.00 | 1 | Good | Good | Bad |
| Comparative Example 4 | 60 | 0.3 | 6 | 0.50 | 0.25 | 0.50 | 0.25 | 7 | Bad | Good | Good |

Note that each symbol in Table 1 refers to the following measurement values.

tT: Thickness of magnetic tape (unit: μm)

Δw: Dimension change amount in the width direction of the magnetic tape with respect to a change in tension in the longitudinal direction of the magnetic tape (unit: ppm/N)

α: Thermal expansion coefficient of magnetic tape (unit: ppm/° C.)

β: Humidity expansion coefficient of magnetic tape (unit: ppm/% RH)

ρ: Poisson's ratio of magnetic tape $\sigma_{MD}$: Elastic limit value in the longitudinal direction of magnetic tape (unit: N)

V: Speed for measuring elastic limit (unit: mm/min)

$t_m$: Average thickness of magnetic layer (unit: nm)

S2: Squareness ratio (unit: %) in the thickness direction (vertical direction) of the magnetic tape (unit: %)

tb: Average thickness of back layer (unit: μm)

Rab: Surface roughness of back layer (unit: nm)

μ: friction coefficient between magnetic surface and back surface $T_{in}W$: Deviation amount of servo track width on the inner side of the winding (unit: μm)

$T_{out}W$: Deviation amount of servo track width on the outer side of the winding (unit: μm)

$T_{in}W - T_{out}W$: (Deviation amount of servo track width on inner side of winding)−(Deviation amount of servo track width on outer side of winding) (unit: μm). The difference between the servo track widths on the inner side of the winding and the outer side of the winding.

From the results shown in Table 1, the following can be seen.

In all of the magnetic tapes of Examples 1 to 26, the determination results of the change amount in tape width before and after storage was 4 or more. (In other words, the deviation from the ideal of the "effective change amount of tape width" is small). Therefore, it can be seen that the magnetic recording cartridge according to the embodiment of the present technology is suitable for use in a recording and reproducing apparatus for adjusting tension in the longitudinal direction.

From the results of the determination of the change amounts of tape widths of Examples 1 to 26 and Comparative Example 1, it can be seen that the dimensional change amount Δw of the magnetic recording tape is 660 ppm/N or more, more preferably 700 ppm/N or more, even more preferably 750 ppm/N, still more preferably 800 ppm/N or more, and thus, the magnetic recording tape is more suitable for use in the recording and reproducing apparatus for adjusting tension in the longitudinal direction (in particular, adjustment of the tape width by adjusting tension).

From the comparison of Examples 1 to 26 and Comparative Examples 2 and 3, it can be seen that the difference in the servo track width between the inner side and outer side of the winding is greater than 0.00 preferably 0.01 μm or more, more preferably 0.02 μm or more, still more preferably 0.05 and thus, the winding state is good (wrinkles do not occur in a case where the magnetic recording tape is wound around the reel in the cartridge).

From the comparison of the evaluation results of Examples 3 to 6 and the like, the thermal expansion coefficient α is preferably 5.9 ppm/° C.≤α≤8 ppm/° C. from the viewpoint of suppressing the deviation from the ideal of the "effective change amount of tape width". Furthermore, from the comparison of the evaluation results of Examples 3 to 6 and the like, it can be seen that the humidity expansion coefficient β is preferably β≤5 ppm/% RH from the viewpoint of suppressing the deviation from the ideal of the "effective change amount of tape width".

From the comparison of the evaluation results of Examples 7, 9, 10, and the like, it can be seen that the elastic limit value $\sigma_{MD}$ in the longitudinal direction is 0.8 N≤$\sigma_{MD}$ from the viewpoint of suppressing the deviation from the ideal of the "effective change amount of tape width".

From the comparison of Examples 9 and 11, it can be seen that the elastic limit value GMD does not depend on the speed V when the elastic limit measurement is performed.

From the comparison of the evaluation results of Examples 7 and 18, it can be seen that the thickness of the magnetic layer is preferably 100 nm or less, particularly 90 nm or less, from the viewpoint of improving electromagnetic conversion characteristic.

From the comparison of the evaluation results of Examples 7, 15, 17 and 19, it can be seen that the surface roughness $R_{ab}$ of the back layer is preferably 3.0 nm≤$R_{ab}$≤7.5 nm from the viewpoint of improving electromagnetic conversion characteristic.

When the evaluation results of Examples 7, 16, 17, 20, and 21 are compared with each other, the friction coefficient μ is 0.18<μ<0.82, particularly 0.20≤μ≤0.80, more particularly, 0.20≤μ≤0.78, and still more particularly, 0.25≤μ≤0.75, from the viewpoint of suppressing winding deviation.

When Examples 1 to 26 and Comparative Example 4 are compared with each other, it is preferable that the magnetic layer is aligned vertically or substantially vertically, from the viewpoint of improving the electromagnetic conversion characteristic. Furthermore, from the comparison of the evaluation results of Examples 7, 22, and 23, it can be seen that the squareness ratio S2 of the magnetic tape in the vertical direction is preferably 73% or more, and particularly 80% or more, from the viewpoint of improving electromagnetic conversion characteristic.

From the comparison of the evaluation results of Examples 7 and 25 or the like, it can be seen that evaluation results similar to those obtained using ε iron oxide nanoparticles as magnetic particles can be obtained even in a case where the barium ferrite nanoparticles are used as magnetic particles.

From the comparison of the results of Example 13 and other Examples, it can be seen that evaluation results similar to those of the coating type magnetic recording tape can be obtained even with the vacuum thin film type (sputter type) magnetic recording tape is used.

From the comparison of Example 1 and Example 26, it is considered that the occurrence of winding deviation is prevented because both the servo track width on the inner side of the winding and the servo track width on the outer side of the winding are wider than the servo lead head width. The magnetic tape in which both the servo track width on the inner side of the winding and the servo track width on the outer side of the winding is wider than the servo lead head width has a servo track width larger than a servo lead head width over the entire length. Therefore, it is considered that the winding state is better because the servo rack width is larger than the servo lead head width over the entire length of the magnetic tape.

Although the embodiments and examples of the present technology have been specifically described above, the present technology is not limited to the above-described embodiments and examples, and various modifications may be made on the basis of the technical idea of the present technology.

For example, the configurations, methods, steps, shapes, materials, and numerical values or the like in the above embodiments and examples are merely examples, and a configuration, a method, a step, a shape, a material and a numerical value or the like different therefrom may also be used. Furthermore, the chemical formulas of the compounds and the like are typical, and are not limited to the mentioned valences in case of the generic name of the same compound.

Furthermore, the configurations, methods, steps, shapes, materials, and numerical values or the like of the above-described embodiments and examples may be combined without departing from the spirit of the present technology.

Furthermore, in this specification, the numerical value range indicated by "to" indicates the range including the numerical values mentioned before and after "to" as the minimum value and the maximum value, respectively. In the numerical range mentioned stepwise in this specification, the upper or lower limit of the numerical range of a certain stage may be replaced with the upper or lower limit of the numerical range of the other stage. The materials exemplified in this specification can be used alone or in combination of two or more, unless otherwise specified.

Note that the present technology can have the following configuration.

[1] A magnetic recording cartridge including
a magnetic recording medium of which
an average thickness $t_T$ is $t_T$≤5.6 μm,
a dimensional change amount Δw in a width direction with respect to a tension change in a longitudinal direction is 660 ppm/N≤Δw, and
a squareness ratio in a vertical direction is 65% or more,
in which the magnetic recording medium is accommodated in a state of being wound around a reel and (a servo track width on an inner side of winding of the magnetic recording medium)−(a servo track width on an outer side of winding of the magnetic recording medium)>0 is satisfied.

[2] The magnetic recording cartridge described in [1], in which the magnetic recording medium has a servo track width larger than a servo read head width of a magnetic recording and reproducing apparatus in which the magnetic recording cartridge is loaded.

[3] The magnetic recording cartridge described in [2], in which the magnetic recording and reproducing apparatus is a timing servo type magnetic recording and reproducing apparatus.

[4] The magnetic recording cartridge described in any one of [1] to [3], in which the dimensional change amount Δw is 700 ppm/N≤Δw.

[5] The magnetic recording cartridge described in any one of [1] to [3], in which the dimensional change amount Δw is 750 ppm/N≤Δw.

[6] The magnetic recording cartridge described in any one of [1] to [3], in which the dimensional change amount Δw is 800 ppm/N≤Δw.

[7] The magnetic recording cartridge described in any one of [1] to [6], in which the magnetic recording medium includes a back layer, and a surface roughness $R_{ab}$ of the back layer is 3.0 nm≤$R_{ab}$≤7.5 nm.

[8] The magnetic recording cartridge described in any one of [1] to [7], in which the magnetic recording medium includes a magnetic layer and a back layer, and a friction coefficient μ between a surface on a side of the magnetic layer and a surface on a side of the back layer is 0.20≤μ≤0.80.

[9] The magnetic recording cartridge described in any one of [1] to [8], in which a thermal expansion coefficient α of the magnetic recording medium is 5.5 ppm/° C.≤α≤9 ppm/° C. and a humidity expansion coefficient β of the magnetic recording medium is β≤5.5 ppm/% RH.

[10] The magnetic recording cartridge described in any one of [1] to [9], in which a Poisson's ratio ρ of the magnetic recording medium is 0.25≤ρ.

[11] The magnetic recording cartridge described in any one of [1] to [10], in which an elastic limit value $α_{MD}$ of the magnetic recording medium in the longitudinal direction is 0.7≤≤$σ_{MD}$.

[12] The magnetic recording cartridge described in [11], in which the elastic limit value $σ_{MD}$ does not depend on a speed V when elastic limit is measured.

[13] The magnetic recording cartridge described in any one of [1] to [12], in which the magnetic recording medium includes a magnetic layer, and the magnetic layer is vertically aligned.

[14] The magnetic recording cartridge described in any one of [1] to [13], in which the magnetic recording medium includes the back layer and an average thickness $t_b$ of a back layer is $t_b$≤0.6 μm.

[15] The magnetic recording cartridge described in any one of [1] to [14], in which the magnetic recording medium includes a magnetic layer, and the magnetic layer is a sputtered layer.

[16] The magnetic recording cartridge described in [15], in which an average thickness $t_m$ of the magnetic layer is 9 nm≤$t_m$≤90 nm.

[17] The magnetic recording cartridge described in any one of [1] to [16], in which the magnetic recording medium includes a magnetic layer, and the magnetic layer contain magnetic powder.

[18] The magnetic recording cartridge described in [17], in which the average thickness $t_m$ of the magnetic layer is 35 nm≤$t_m$≤120 nm.

[19] The magnetic recording cartridge described in [17] or [18], in which the magnetic powder includes ε iron oxide magnetic powder, barium ferrite magnetic powder, cobalt ferrite magnetic powder, or strontium ferrite magnetic powder.

[20] A magnetic recording cartridge including
a magnetic recording medium of which
an average thickness $t_T$ is $t_T$≤5.6 μm,
a dimensional change amount Δw in a width direction with respect to a change in tension in a longitudinal direction is 660 ppm/N≤Δw, and
a squareness ratio in a vertical direction is 65% or more,
in which the magnetic recording medium has a servo track width larger than a servo read head width of a magnetic recording and reproducing apparatus in which the magnetic recording cartridge is loaded.

REFERENCE SIGNS LIST

1 Magnetic recording cartridge
3 Reel
10 Magnetic recording medium
11 Base layer
12 Ground layer
13 Magnetic layer
14 Back layer

The invention claimed is:

1. A magnetic recording cartridge comprising:
a cartridge case,
a reel, and
a magnetic recording medium having a magnetic layer, a non-magnetic layer, a base layer and a back layer,
wherein an average thickness of the magnetic recording medium $t_T$ is 3.5 μm≤$t_T$≤5.6 μm,
a dimensional change amount Δw in a width direction of the magnetic recording medium with respect to a tension change in a longitudinal direction of the magnetic recording medium is 700 ppm/N≤Δw≤20000 ppm, and
the magnetic recording medium is accommodated in a state of being wound around the reel in the cartridge case and (a servo track width on an inner side of winding of the magnetic recording medium)−(a servo track width on an outer side of winding of the magnetic recording medium)>0 is satisfied.

2. The magnetic recording cartridge according to claim 1, wherein the dimensional change amount Δw in the width direction of the magnetic recording medium with respect to the tension change in the longitudinal direction of the magnetic recording medium is 750 ppm/N≤Δw≤20000 ppm.

3. The magnetic recording cartridge according to claim 1, wherein the dimensional change amount Δw in the width direction of the magnetic recording medium with respect to the tension change in the longitudinal direction of the magnetic recording medium is 800 ppm/N≤Δw≤20000 ppm.

4. The magnetic recording cartridge according to claim 1, wherein the average thickness of the magnetic recording medium $t_T$ is 3.5 μm≤$t_T$≤5.3 μm.

5. The magnetic recording cartridge according to claim 1, wherein the average thickness of the magnetic recording medium $t_T$ is 3.5 μm≤$t_T$≤5.2 μm.

6. The magnetic recording cartridge according to claim 1, wherein an average thickness of the magnetic layer $t_m$ is 35 nm≤tm≤120 nm.

7. The magnetic recording cartridge according to claim 1, wherein an average thickness of the non-magnetic layer is 0.6 μm to 2.0 μm.

8. The magnetic recording cartridge according to claim 1, wherein an average thickness of the base layer is 2.5 μm to 6 μm.

9. The magnetic recording cartridge according to claim 1, wherein an average thickness of the base layer is 2.6 μm to 5 μm.

10. The magnetic recording cartridge according to claim 1, wherein an average thickness of the back layer $t_b$ is $t_b$≤0.6 μm.

11. The magnetic recording cartridge according to claim 1, wherein 0.01 μm≤(the servo track width on an inner side of winding of the magnetic recording medium)−(the servo track width on an outer side of winding of the magnetic recording medium)≤2.5 μm is satisfied.

12. The magnetic recording cartridge according to claim 1, wherein the magnetic layer has magnetic powder and a binder, and the magnetic powder includes one or more of ε iron oxide magnetic powder, barium ferrite magnetic powder, cobalt ferrite magnetic powder, and strontium ferrite magnetic powder.

13. The magnetic recording cartridge according to claim 12, wherein the magnetic powder includes the ε iron oxide magnetic powder, and
a peak ratio X/Y of a main peak height X and a height Y of a sub peak in the vicinity of magnetic field zero in a switching field distribution (SFD) curve of the magnetic recording medium is no less than 3.0 and no more than 100.

14. The magnetic recording cartridge according to claim 13, wherein an average particle size of the magnetic powder is no less than 8 nm and no more than 22 nm.

15. The magnetic recording cartridge according to claim 12, wherein the magnetic powder includes the barium ferrite magnetic powder,
an average thickness of the magnetic layer $t_m$ is 35 nm≤$t_m$≤100 nm, and
a coercive force Hc of the magnetic recording medium measured in a vertical direction of the magnetic recording medium is 160 kA/m to 280 kA/m.

16. The magnetic recording cartridge according to claim 15, wherein an average particle size of the magnetic powder is no less than 12 nm and no more than 25 nm.

17. The magnetic recording cartridge according to claim 1, wherein a thermal expansion coefficient α of the magnetic recording medium is 5.5 ppm/° C.≤α≤9 ppm/° C. and a humidity expansion coefficient β of the magnetic recording medium is β≤5.5 ppm/% RH.

18. The magnetic recording cartridge according to claim 1, wherein a surface roughness $R_{ab}$ of the back layer is 3.0 nm≤$R_{ab}$≤7.5 nm.

19. The magnetic recording cartridge according to claim 1, wherein a friction coefficient μ between a surface on a side of the magnetic layer and a surface on a side of the back layer is 0.20≤μ≤0.80.

20. The magnetic recording cartridge according to claim 1, wherein a Poisson's ratio ρ of the magnetic recording medium is 0.25≤ρ.

21. The magnetic recording cartridge according to claim 1, wherein an elastic limit value $\sigma_{MD}$ of the magnetic recording medium in the longitudinal direction of the magnetic recording medium is 0.7 N≤$\sigma_{MD}$.

22. The magnetic recording cartridge according to claim 21, wherein the elastic limit value $\sigma_{MD}$ does not depend on a speed V when an elastic limit is measured.

23. The magnetic recording cartridge according to claim 1, wherein the magnetic layer is vertically aligned.

24. The magnetic recording cartridge according to claim 1, wherein a plurality of servo bands are formed in the magnetic layer and a number of the servo bands is 3 to 11.

25. The magnetic recording cartridge according to claim 1, wherein the base layer includes a polyester resin.

26. The magnetic recording cartridge according to claim 1, wherein a squareness ratio measured in a vertical direction of the magnetic recording medium is 65% or more.

27. The magnetic recording cartridge according to claim 1, wherein a squareness ratio measured in the vertical direction of the magnetic recording medium is 70% or more.

28. The magnetic recording cartridge according to claim 1, wherein a squareness ratio measured in the vertical direction of the magnetic recording medium is 73% or more.

29. The magnetic recording cartridge according to claim 1, wherein a coercive force Hc of the magnetic recording medium measured in a vertical direction of the magnetic recording medium is 220 kA/m to 310 kA/m.

30. The magnetic recording cartridge according to claim 1, wherein the magnetic layer has a barium ferrite magnetic powder and a binder,
the base layer includes a polyester resin,
an average particle size of the barium ferrite magnetic powder is 12 nm to 25 nm,
an average thickness of the magnetic layer $t_m$ is 35 nm≤$t_m$≤100 nm,
an average thickness of the non-magnetic layer is 0.6 μm to 2.0 μm,
an average thickness of the base layer is 2.5 μm to 6 μm,
an average thickness of the back layer $t_b$ is $t_b$≤0.6 μm,
a surface roughness $R_{ab}$ of the back layer is 3.0 nm≤$R_{ab}$≤7.5 nm,
a coercive force Hc of the magnetic recording medium measured in a vertical direction of the magnetic recording medium is 160 kA/m to 280 kA/m, and
a squareness ratio measured in a vertical direction of the magnetic recording medium is 65% or more.

* * * * *